United States Patent
Blake et al.

(10) Patent No.: US 7,381,373 B2
(45) Date of Patent: *Jun. 3, 2008

(54) SYSTEM AND METHOD FOR PREPARATIVE MASS SPECTROMETRY

(75) Inventors: Thomas Blake, Lafayette, IN (US); Zheng Ouyang, West Lafayette, IN (US); Robert G. Cooks, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/228,826

(22) Filed: Sep. 16, 2005

(65) Prior Publication Data

US 2006/0071665 A1 Apr. 6, 2006

Related U.S. Application Data

(63) Continuation-in-part of application No. 10/943,365, filed on Sep. 17, 2004, now abandoned, which is a continuation-in-part of application No. 10/335,007, filed on Dec. 31, 2002.

(60) Provisional application No. 60/387,241, filed on Jun. 7, 2002.

(51) Int. Cl.
| | |
|---|---|
| *B01L 3/02* | (2006.01) |
| *B01L 11/00* | (2006.01) |
| *B01D 59/44* | (2006.01) |
| *H01J 49/00* | (2006.01) |
| *G01N 1/00* | (2006.01) |
| *G01N 1/18* | (2006.01) |
| *G01N 1/22* | (2006.01) |

(52) U.S. Cl. ............. 422/100; 422/101; 250/283; 250/284; 250/287; 250/299; 436/174; 436/177; 436/181

(58) Field of Classification Search ............ 422/100, 422/101; 250/283, 284, 287, 299; 436/174, 436/177, 181
See application file for complete search history.

(56) References Cited

U.S. PATENT DOCUMENTS 6,177,668 B1 * 1/2001 Hager ................. 250/282

(Continued)

FOREIGN PATENT DOCUMENTS

EP   P77723EP00   8/2007

(Continued)

OTHER PUBLICATIONS

Analytical Properties of the Nanoelectrospray Ion Surface, M. Wilm, M. Mann, Anal. Chem., vol. 68, No. 1, Jan. 1, 1996, pp. 1-8.

(Continued)

*Primary Examiner*—Jill Warden
*Assistant Examiner*—Keri A Moss
(74) *Attorney, Agent, or Firm*—Lawson & Weitzen, LLP.; Sonia K. Guterman; Adam M. Schoen

(57) ABSTRACT

A preparative mass spectrometer system includes an ionizer which converts the mixture into gas phase ions of the molecules in the mixture, and a separator which separates the ions according to their mass to charge ratio or mobility. The separator is a linear ion trap mass analyzer that accumulates the ions based on their mass to charge ratio. A surface is in cooperative relationship with the separator so that the separated molecules are soft landed onto the surface at different locations such that the collected molecules can be stored or further processed/analyzed.

8 Claims, 30 Drawing Sheets

U.S. PATENT DOCUMENTS

| | | | |
|---|---|---|---|
| 6,204,500 B1 | 3/2001 | Whitehouse | |
| 6,600,155 B1* | 7/2003 | Andrien et al. | 250/287 |
| 6,750,448 B2* | 6/2004 | Turecek et al. | 250/281 |
| 6,852,971 B2* | 2/2005 | Baba et al. | 250/292 |
| 2003/0226963 A1 | 12/2003 | Cooks et al. | |

FOREIGN PATENT DOCUMENTS

| | | | |
|---|---|---|---|
| WO | WO 00/55636 | * | 9/2000 |

OTHER PUBLICATIONS

Electrospray Deposition as a Method for Mass Fabrication of Mono-and Multicomponent Microarrays of Biological and Biologically Active Substances, V. N. Morozov, T. Ya. Morozova, Anal. Chem. vol. 71, No. 15, Aug. 1, 1999, pp. 3110-3117.

Development of Multichannel Devices with an Array of Electrospray Tips for High-Throughput Mass Spectrometry, H. Liu, C.I Felten, Q. Xue, B. Zhang, P. Jedrzejewski, B. L. Karger, F. Foret, Anal. Chem., vol. 72, No. 14, Jul. 15, 2000, pp. 3303-3310.

Surface-Induced Dissociation on a MALDI-Ion Mobility-Orthogonal Time-of-Flight Mass Spectrometer: Sequencing Peptides from an "In-Solution" Protein Digest, E. Stone, K. J. Gillig, B. Ruotolo, K. Fuhrer, M. Gonin, A. Schultz, D. H. Russell, Anal. Chem., vol. 73, No. 10, May 15, 2001, pp. 2233-2238.

Coupling Ion Mobility Separations, Collisional Activation Techniqued, and Multiple Stages of MS for Analysis of Complex Peptide Mixtures, C. S. Hoaglung-Hyzer, Y.J. Lee, A.E. Counterman, D. E. Clemmer, Anal. Chem., vol. 74, No. 5, Mar. 1, 2002, pp. 992-1006.

Incorporation of a Venturi Device in Electrospray Ionization, L. Zhou, B. Yue, D. V. Dearden, E. D. Lee, A. L. Rockwood, M.L. Lee, Anal. Chem., Vo. 75, No. 21, Nov. 1, 2003, pp. 5978-5983.

Analytical Performance of a Venturi Device Integrated Into an Electrospray Ionization Fourier Transform Ion Cyclotron Resonance Mass Spectrometer for Analysis of Nucleic Acids, A.M. Hawkridge, L.Zhou, M.L. Lee, D.C. Muddiman, Anal. Chem., vol. 76, No. 14, Jul. 15, 2004, pp. 4118-4122.

Novel Techniques for Studying Ion-Surface Interactions in FT-ICR MS, J. Laskin, J. Alvarez, R.G. Cooks, S.E. Barlow, J.H. Futrell, Proceedings of the 52nd ASMS Conference, Nashville, TN, May 23-27, 2004, pp. 1-2.

Modifications to an analytical mass spectrometer for the soft-landing experiment, R.J. Geiger, M.C. Melnyk, K.L. Busch, M.G. Bartlett, International Journal of Mass Spectrometry 182/183, 1999, pp. 415-422.

Differentiation of isomeric oxygenated adsorbates using low-energy ion/surface collisions, N.Wade, S.C. Jo, B. Gologan, R.G. Cooks, International Journal of Mass Spectrometry 230, 2003, pp. 151-159.

A Two Dimensional Quadrupole Ion Trap Mass Spectrometer, J.C. Schwarts, M.W. Senko, J.E.P. Syka, J. Am. Soc. Mass Spectrom. 2002, 13, pp. 659-669.

Chemical Consequences of Electron Impact, Neutral $C_4H_8$ Fragments Expelled from Molecular Ions in the Gas Phase, F.B. Burns, T.H. Morton, Journal of the American Chemical Society, 98:23, Nov. 10, 1976, pp. 7308-7313.

Shattering of Peptide Ions on Self-Assembled Monolayer Surfaces, J. Laskin, T.H. Bailey, J.H. Futrell, J. Am. Chem. Soc. 2003, 125, pp. 1625-1632.

Design and development of a silicon microfabricated flow-through dispenser for on-line picolitre sample handling, T. Laurell, L. Wallman, J. Nilsson, J. Micromech. Microeng., 9, 1999, pp. 369-376.

Preparative Mass Spectrometry with Electrospray Ionization, G. Siuzdak, T. Hollenback, B. Bothner, J. Mass. Spectrom., 34, 1999, pp. 1087-1088.

Direct Protein Microarray Fabrication Using a Hydrogel "Stamper", B.D. Martin, B.P. Gaber, C.H. Patterson, D.C. Turner, Langmuir, vol. 14, No. 15, Jul. 21, 1998, pp. 3971-3975.

Soft-Landing of Polyatomic Ions at Fluorinated Self-Assembled Monolayer Surfaces, S.A. Miller, H. Luo, S.J. Pachuta, R.G. Cooks, Science, vol. 275, Mar. 7, 1997, pp. 1447-1450.

Preparing Protein Microarrays by Soft-Landing of Mass-Selected Ions, Z. Ouyang, Z. Takats, T.A. Blake, B. Gologan, A.J. Guymon, J.M. Wiseman, J.C. Oliver, V. Jo Davisson, R.G. Cooks, Science, vol. 301, Sep. 5, 2003, pp. 1351-1354.

The growth and medication of materials via ion-surface processing, L. Hanley, S.B. Sinnott, Surface Science 500, 2002, pp. 500-522.

Printing Proteins as Microarrays for High-Throughput Function Determination, G. MacBeath, S.L. Schreiber, Science, vol. 289, Sep. 8, 2000, pp. 1760-1763.

Peptide and protein sequence analysis by electron transfer dissociation mass spectrometry, J.E.P. Syka, J.J. Coon, M.J. Schroeder, J. Shabanowitz, D.F. Hunt, PNAS, vol. 101, No. 26, Jun. 29, 2004, pp. 9528-9533.

Chemical Functionality in Self-Assembled Monolayers: Structural and Electrochemical Properties, C.E.D. Chidsey, D.N. Loiacono, Langmuir, vol. 6, No. 3, 1990, pp. 682-691.

Surface Polymerization by Ion-Assisted Deposition for Polythiophene Film Growth, S. Tepavcevic, Y. Choi, L. Hanley, J. Am. Chem. Soc., vol. 125, No. 9, 2003, pp. 2396-2397.

Retrieval of DNA Using Soft-Landing after Mass Analysis by ESI-FTICR for Enzmatic Manipulation, B. Feng, D.S.Wunschel, C.D. Masselon, L. Pasa-Tolic, R.D. Smith, J. Am. Chem. Soc., vol. 121, No. 38, 1999, pp. 8961-8962.

Energy transfer in collisions of peptide ions with surfaces, J. Laskin, J.H. Futrell, Journal of Chemical Physics, vol. 119, No. 6, Aug. 8, 2003, pp. 3413-3420.

Mass Selective Axial Ion Ejection from a Linear Quadrupole Ion Trap, F.A. Londry, J.W. Hager, J. Am. Soc. Mass Spectrom., 2003, 14, pp. 1130-1147.

Surface-Induced Dissociation of Peptide Ions in Fourier-Tranform Mass Spectrometry, E.R. Williams, K.D. Henry, F.W. McLafferty, J.Shabanowitz, D.F. Hunt, J. Am. Soc. Mass Spectrom., 1990, 1, pp. 413-416.

Mass spectrometry and viral analysis, G. Siuzdak, B. Bothner, M. Yeager, C. Brugidou, C.M. Fauquet, K. Hoey, C.M. Chang, Chemistry and Biology, Jan. 1996, vol. 3, No. 1, pp. 45-48.

Preparative Separation of Mixtures by Mass Spectrometry, P.S. Mayer, F. Turecek, H.N. Lee, A.A. Scheidemann, T.A. Olney, F. Schumacher, P. Strop, M. Smrcina, M. Patek, D. Schirlin, Proceedings of the 51st ASMS Conf. on Mass Spectrometry and Allied Topics, Jun. 8-12, 2003, pp. 1-2.

Electrosonic Spray Ionization. A Gentle Technique for Generating Folded Proteins and Protein Complexes in the Gas Phase and for Studying Ion-Molecule Reactions at Atmospheric Pressure, Z. Takats, J.M. Wiseman, B. Gologan, R.G. Cooks, Anal. Chem., vol. 76, No. 14, Jul. 15, 2004, pp. 4050-4058.

Coupling Capillary Electrochromatography with Electrospray Fourier Transform Mass Spectrometry for Characterizing Complex Oligosaccharide Pools, A.H. Que, Y. Mechref, Y. Huang, J.A. Taraszka, D.E. Clemmer, M.C. Novotny, Anal. Chem., vol. 75, No. 7, Apr. 1, 2003, pp. 1684-1690.

Improved Ion Transmission from Atmospheric Pressure to High Vacuum Using a Multicapillary Inlet and Electrodynamic Ion Funnel Interface, T. Kim, H.R. Udseth, R.D. Smith, Anal. Chem., vol. 72, No. 20, Oct. 14, 2000, pp. 5014-5019.

Design and Implementation of a New Electrodynamic Ion Funnel, T. Kim, A.C. Tolmachev, R. Harkewicz, D.C. Prior, G. Anderson, H.R. Udseth, R.D.Smith, Anal. Chem., vol. 72, No. 10, May 15, 2000, pp. 2247-2255.

A Quadrupole Ion Trap with Cylindrical Geometry Operated in the Mass-Selective Instability Mode, J.M. Wells, E.R. Badman, R.G. Cooks, Anal. Chem., vol. 70, No. 3, Feb. 1, 1998, pp. 438-444.

Molecular Imaging of Biological Samples: Localization of Peptides and Proteins Using MALDI-TOF MS, R.M. Caprioli, T.B. Farmer, J. Gile, Anal. Chem. vol. 69, No. 23, Dec. 1, 1997, pp. 4751-4760.

Role of Accurate Mass Measurement (±10 ppm) in Protein Identification Strategies Employing MS or MS/MS and Database Searching, K.R. Clauser, P. Baker, A.L. Burlingame, Anal. Chem., vol. 71, No. 14, Jul. 15, 1999, pp. 2871-2882.

Development of Multichannel Devices with an Array of Electrospray Tips for High-Throughput Mass Spectrometry, H. Liu, C. Felten, Q. Xue, B. Zhang, P. Jedrzejewski, B.L. Karger, F. Foret, Anal. Chem., vol. 72, No. 14, Jul. 15, 2000, pp. 3303-3310.

Supercharged Protein and Peptide Ions Formed By Electrospray Ionization, A.T. Iavarone, J.C. Jurchen, E.R. Williams, Anal. Chem., vol. 73, No. 7, Apr. 1, 2001, pp. 1455-1460.

Preparative Linear Ion Trap Mass Spectrometer for Separation and Collection of Purified Proteins and Peptides in Arrays Using Ion Soft Landing, T.A. Blake, Z. Ouyang, J.M. Wiseman, Z. Takats, A.J. Guymon, S. Kothari, R.G. Cooks, Anal. Chem., vol. 76, No. 21, No. 1, 2004, pp. 6293-6305.

Laser Desorption Ionization of Proteins with Molecular Masses Exceeding 10000 Daltons, M. Karas, F. Hillenkamp, Anal. Chem., vol. 60, No. 20, Oct. 15, 1988, pp. 2299-2301.

Liquid Sample Introduction for Matrix-Assisted Laser Desorption Ionization, K.K. Murray, D.H. Russell, Anal. Chem., vol. 65, No. 18, Sep. 15, 1993, pp. 2534-2537.

Liquid Mixtures for Matrix-Assisted Laser Desorption, D.S. Cornett, M.A. Duncan, I.J. Amster, Anal. Chem., vol. 65, No. 19, Oct. 1, 1993, pp. 2608-2613.

Surface-Induced Dissociation of Multiply-Protonated Proteins, R.A. Chorush, D.P. Little, S.C. Beu, T.D. Wood, F.W. McLafferty, Anal. Chem., vol. 67, No. 6, Mar. 15, 1995, pp. 1042-1046.

Whole Virus Mass Spectrometry, S.D. Fuerstenau, W.H. Benner, J.J. Thomas, C. Brugidou, B. Bothner, G. Siuzdak., Angew. Chem. Int. Ed. 2001, 40, No. 3, pp. 541-544.

Prospects for imaging TOF-SIMS: from fundamentals to biotechnology, N. Winograd, Applied Surface Science, 203-204, 2003, pp. 13-19.

Increased Thermal Stability of Proteins in the Presence of Sugars and Polyols, J.F. Back, D. Oakenfull, M.B. Smith, Amer. Chem. Soc., vol. 18, No. 23, 1979, pp. 5191-5196.

p-Nitroaniline/glycerol: a binary liquid matrix for matrix-assisted laser desorption/ionization analysis, T.L. Williams, C. Fenselau, Eur. Mass. Spectrom., 4, 1998, pp. 379-383.

Chemical Aspects of Fast Atom Bombardment, C. Fenselau, R.J. Cotter, Chem. Rev., vol. 87, No. 3, 1987, pp. 501-512.

Mechanisms in Molecular SIMS, S.J. Pachuta, R.G. Cooks, Chem. Rev. vol. 87, No. 3, 1987, pp. 647-669.

Mass spectrometry and viral analysis G. Sluzdak, B. Bothner, M. Yeager, C. Brugidou, C.M. Fauquet, K. Hoey, C.M. Chang, Chemistry & Biology, vol. 3, No. 1, 1996, pp. 45-48.

Supercharging in electrospray ionization: effects on signal and charge, A.T. Iavarone, E.R. Williams, International Journal of Mass Spectrometry, 219, 2002, pp. 63-72.

Formulation of Matrix Solutions for use in Matrix-Assisted Laser Desorption/Ionization of Biomolecules, E.T.P. Sze, T-W.D. Chan, G.Wang, Am. Soc. Mass Spectrom, 1998, 9, pp. 166-174.

A Two-Dimensional Quadrupole Ion Trap Mass Spectrometer, J.C. Schwartz, M.W. Senko, J.E.P. Syka, J. Am. Soc. Mass Spectrom., 2002, 13, 659-669.

Artifact-free matrix-assisted laser desorption ionization time-of-flight mass spectra of *tert*.-butyldimethylsilyl ether derivatives of cyclodextrins used for the synthesis of single-isomer, chiral resolving agents for capillary electrophoresis, W.K. Russell, D.H. Russell, M.B. Busby, A. Kolberg, S. Li, D.K. Maynard, S. Sanchez-Vindas, W. Zhu, Gy, Vigh, Journal of Chromatography A, 914, 2001, pp. 325-330.

Effects of Sugar Solutions on the Activity Coefficients of Aromatic Amino Acids and Their *N*-Acetyl Ethyl Esters, T.S. Lakshmi, P.K. Nandi, The Journal of Physical Chem., vol. 80, No. 3, 1976, pp. 249-252.

Retrieval of DNA Using Soft-Landing after Mass Analysis by ESI-FTICR for Enzymatic Manipulation, B. Feng, D.S. Wunschel, C.D. Masselon, L. Pasa-Tolic, R.D. Smith, J. Am. Chem. Soc., 1999, 121, pp. 8961-8962.

Mechanism of Charging and Supercharging Molecules in Electrospray Ionization, A.T. Iavarone, E.R. Williams, J. Am. Chem. Soc., 2003, 125, pp. 2319-2327.

Fast Atom Bombardment of Solids (F.A.B.): A New Ion Source for Mass Spectrometry, M. Barber, R.S. Bordoli, R.D. Sedgwick, A.N. Tyler, J.C.S. Chem. Comm., 1981, pp. 325-327.

Organic ion imaging of biological tissue with secondary ion mass spectrometry and matrix-assisted laser desorption/ionization, P.J. Todd, T.G. Schaaff, P. Chaurand, R.M. Caprioli, J. Mass. Spectrom, 2001, 36, pp. 355-369.

Internal Energy Effects in Mass Spectrometry, K. Vekey, J. Mass. Spectrom., vol. 31, 1996, pp. 445-463.

Characterization of Intact Microorganisms by Maldi Mass Spectrometry, C. Fenselau, P.A. Demirev, Mass Spectrometry Reviews, 2001, 20, pp. 157-171.

Amorphous Water-Ice Relaxations Measured with Soft-Landed Ions, A.A. Tsekouras, M.J. Iedema, J.P. Cowin, The American Physical Society, Vo. 80, No. 26, 1998, pp. 5798-5801.

Development of an electrospray approach to deposit complex molecules on plasma modified surfaces, K.J. Kitching, H-N. Lee, W.T. Elam, E.E. Johnston, H. MacGregor, R.J. Miller, F. Turecek, B.D. Ratner, Review of Scientific Instruments, vol. 74, No. 11, Nov. 2003, pp. 4832-4839.

Soft-Landing of Polyatomic Ions at Fluorinated Self-Assembled Monolayer Surfaces, S.A. Miller, H. Luo. S.J. Pachuta, R.G. Cooks, Science, vol. 275, Mar. 7, 1997, pp. 1447-1450.

R. Wimmer, M. Olsson, M.T.N. Peterson, R. Hattikaul, S. B. Peterson, N. Muller, Journal of Biotechnology, 1997, 55, pp. 85-100.

S.A. Trauger, T. Junker, G. Siuzdak, Topics in Current Chemistry, Modern Mass Spectrometry, 2003, 225, pp. 265-282.

MS/MS Spectra of Organic Ions Generated by Secondary Ion Mass Spectrometry, G.L. Glish, P.J. Todd, K.L. Busch, R.G. Cooks, International Journal of Mass Spectrometry and Ion Processes, 1984, 56, pp. 177-192.

Chemical Analysis of Inorganic and Organic Surfaces and Thin Films by Static Time-of-Flight Secondary Ion Mass Spectrometry (TOF-SIMS), A. Benninghoven, Reviews, 1023-1043.

Soft-landing of polyatomic ions for selective modification of fluorinated self-assembled monolayer surfaces, H. Luo, S.A. Miller, R.G. Cooks, S.J. Pachuta, International Journal of Mass Spectrometry and Ion Processes, 1998, 174, pp. 193-217.

Soft landing of ions onto self-assembled hydrocarbon and fluorocarbon monolayer surfaces, J. Shen, Y.H. Yim. B. Feng, V. Grill, C. Evans, R.G. Cooks, International Journal of Mass Spectrometry, 182/183, 1999, pp. 423-435.

A Multicapillary Inlet Jet Disruption Electrodynamic Ion Fnnel Interface for Improved Sensitivity Using Atmospheric Pressure Ion Sources, T. Kim, K. Tang, H.R. Udseth, R.D. Smith, Anal. Chem., vol. 73, No. 17, Sep. 1, 2001, pp. 4162-4170.

Applications of 1.06-μm IR Laser Desorption on a Fourier Transform Mass Spectrometer, Y.P. Ho, C. Fenselau, Anal. Chem. vol. 70, No. 23, Dec. 1, 1998, pp. 4890-4895.

Preparation and in Situ Characterization of Surfaces Using Soft Landing in a Fourier Transform Ion Cyclotron Resonance Mass Spectrometer, J. Alvarez, R.G. Cooks, S.E. Barlow, D.J. Gaspar, J.H. Futress, J. Laskin, Anal. Chem., vol. 77, No. 11, Jun. 1, 2005, pp. 3452-3460.

P. Roepstroff, J. Fohlman, Biomed Mass Spectrom., 1984, 11, pp. 601.

Ion Soft-Landing into Liquids: Protein Identification, Separation, and Purification with Retention of Biological Activity, B. Gologan, Z. Takats, J. Alvarez, J.M. Wiseman, N. Talaty, Z. Ouyang, R.G. Cooks, Am. Soc. For Mass Spectrometry, 2004, 15, pp. 1874-1884.

Surface-induced Dissociation: An Effective Tool to Probe Structure, Energetics and Fragmentation Mechanisms of Protonated Peptides, A.R. Dongre, A. Somogyi, V.H. Wysocki, Journal of Mass Spectrometry, vol. 31, 1996, pp. 339-350.

Soft-landed ions: a route to ionic solution studies, A.A. Tsekouras, M.J. Iedema, G.B. Ellison, .P. Cowin, International Journal of Mass Spectrometry and Ion Processes, 1998, 184, pp. 219-230.

Desorption Ionization Mass Spectrometry, K.L. Busch, John Wiley & Sons, Ltd., 1995, pp. 233-240.

Protein and Polymer Analyses up to $m/z$ 100 000 by Laser Ionization Time-of-Flight Mass Spectrometry, K. Tanaka, J. Waki, Y. Ido, S. Akita, Y. Yoshida, T. Yoshida, Rapid Communications in Mass Spectrometry, vol. 2, No. 8, 1988, pp. 151-153.

Soft Landing of Ions as a Means of Surface Modification, V. Franchetti, B.H. Solka, W.E. Baltinger, J.W. Amy, R.G. Cooks, International Journal of Mass Spectrometry and Ion Physics, 23, 1977, pp. 29-35.

Controlled Deposition of Size-Selected Silver Nanoclusters, K. Bromann, C. Felix, H. Brune, W. Harbich, R. Monot, J. Buttet, K. Kern, Sciece, vol. 274, No. 8, 1996, pp. 956-958.

The "Thomson" A Suggested Unit for Mass Spectroscopists, R.G. Cooks, A.L. Rockwood, Letter to the Editor, vol. 5, Jan. 7, 1991, p. 93.

Protein Microdeposition Using a Conventional Ink-Jet Printer, A. Roda, M. Guardigli, C. Russo, P. Pasini, M. Baraldini, BioTechniques, vol. 28, No. 3, Mar. 2000, pp. 492-496.

Miliotis et al., 2001, J.ournal of Chromatography B, 752: 323-334.

* cited by examiner

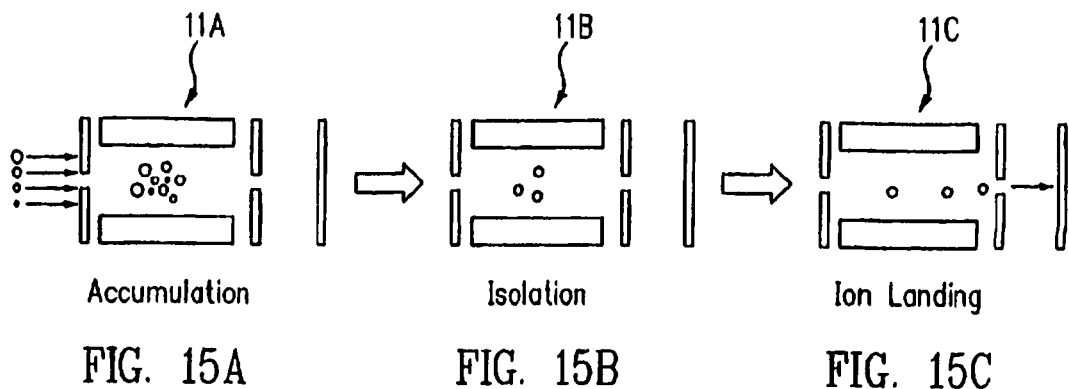
Accumulation
FIG. 15A
Isolation
FIG. 15B
Ion Landing
FIG. 15C
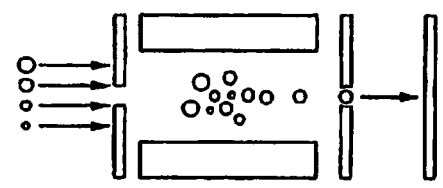
Simultaneous operations:
Accumulation + Selective Ejection/Ion Landing
FIG. 16
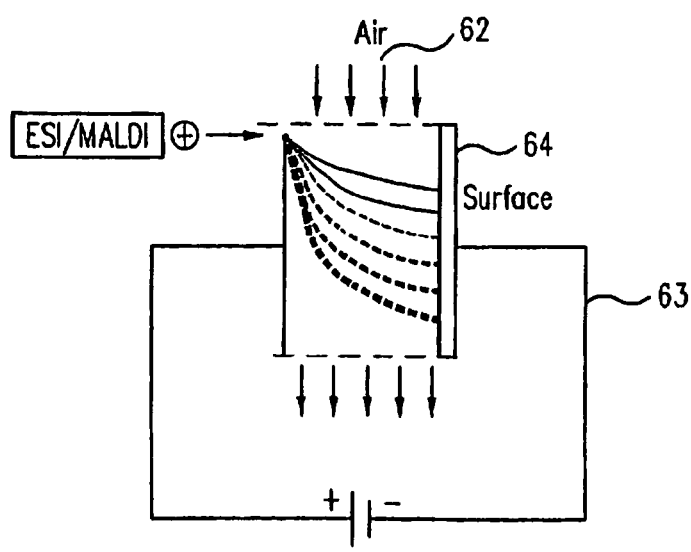
FIG. 17

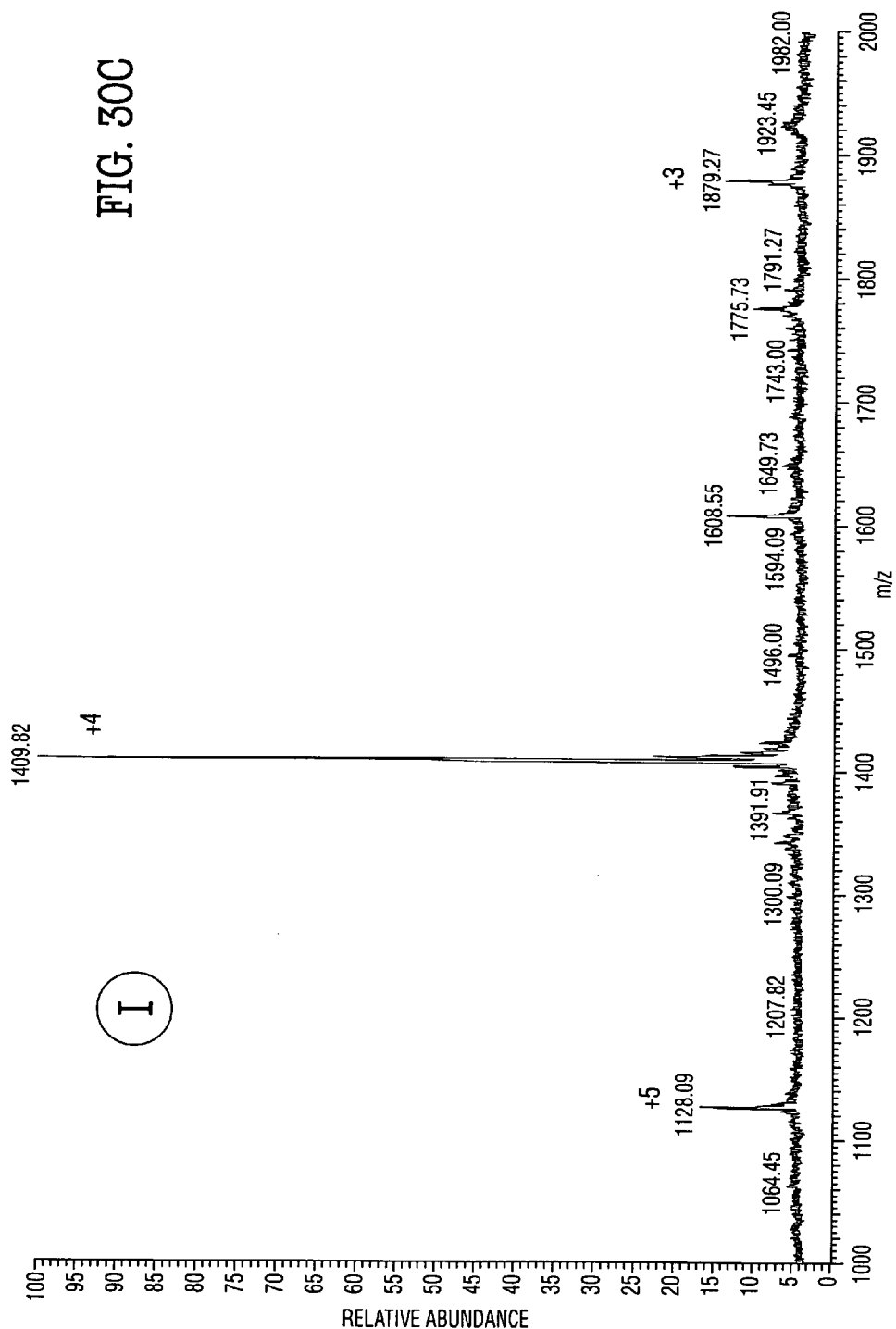

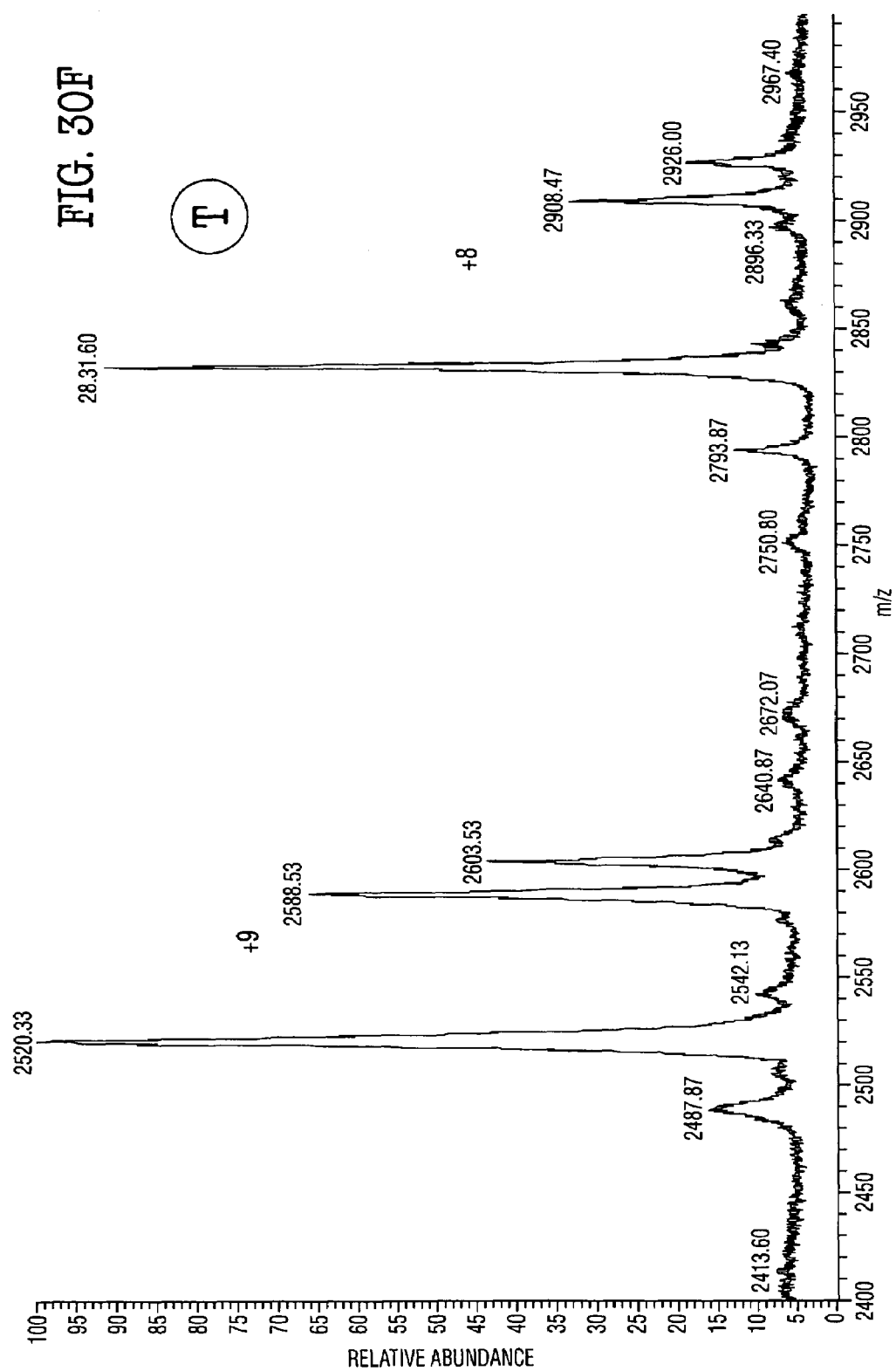

SYSTEM AND METHOD FOR PREPARATIVE MASS SPECTROMETRY

RELATED APPLICATIONS

This application is a continuation-in-part U.S. patent application Ser. No. 10/943,365, filed Sep. 17, 2004 now abandoned, which is a continuation-in-part of U.S. patent application Ser. No. 10/335,007, filed Dec. 31, 2002, which claims the benefit of U.S. Provisional Application 60/387,241, filed Jun. 7, 2002.

The entire contents of the above applications are incorporated herein by reference.

BACKGROUND

This invention relates generally to a system and method for the preparation of arrays of separated molecules from a mixture of molecules.

Micro arrays having a matrix of positionally defined reagent target spots for performing chemical tests are known. Known reagents are deposited by spotting techniques well known in the art. In analyzing a sample, it is reacted with the array and separate chemical tests are performed with the reagent at each spot.

Mass spectrometers of various types have been used to identify molecules including proteins by mass analysis. The molecules are ionized and then introduced into the mass spectrometer for mass analysis. In recent years, mass spectrometers have been used by biochemists to identify both small and large molecules including proteins and to determine the molecular structure of the molecules including proteins.

Mixtures of biological compounds are normally separated by chromatographic techniques before the components of the mixture are mass analyzed. In some instances, chromatographically separated components of the mixture are used to create chips or arrays.

In proteomics the aim is to quantify the expression levels for the complete protein complement, the proteome, in a cell at any given time. The proteome is individual, environment and time dependent, and has an enormous dynamic range of concentration. Separation by two dimensional electrophoresis or electrophoresis and creation of spots on an array is cumbersome and slow. Modern analytical methods such as mass spectrometry are used for final analysis of the separated components of the protein complement.

Soft-landing of ions onto surfaces was proposed in 1977 [4] and successfully demonstrated two decades later [5]. Intact polyatomic ions were mass-selected in a mass spectrometer and deposited onto a surface at low kinetic energies (typically 5-10 eV). SIMS analysis was used to confirm the presence of a soft-landed species, $C_3H_{10}Si_2O^{35}Cl^+$, on a fluorinated SAM surface. Evidence suggests that ions with sterically bulky groups have better deposition efficiencies than small ions [6]. Organic cations [7] and a 160-mer double-stranded DNA [8] (mass ca. 10 kDa) have also been soft-landed intact onto surfaces as have metal clusters [9]. In some of these cases there is evidence that the molecular entity on the surface is the ion, in others that it is the corresponding neutral molecule. There is even evidence [11] that intact viruses can be ionized, passed through a mass spectrometer under vacuum and collected and remain viable.

Separations are an inherent aspect of mass spectrometry; however, after mass separation of ions in vacuum, the resulting highly purified ionic materials are destroyed at the detector. Separations utilizing mass/charge ratios of gaseous ions have a different physical basis to those used in chromatography which are typically based upon chemical properties such as hydrophobicity, ionic strength in solution, and chemical functionality. This inherent difference indicates that mass spectrometric separation may be complementary to other forms of separation as a preparative technique, but previously developed mass spectrometry has not become a widespread method of collecting highly purified molecular species for preparation because of the overall inefficiency inherent in the ionization, ion transport, mass analysis, and ion collection processes.

The collection of materials from the mass spectrometer has been observed in a variety of experiments over several decades. Neutral species produced during electron impact of organic molecules [12] have been collected and characterized and used to examine mechanisms of fragmentation pathways. The collection of atomic ions as a result of collisions of mass-selected ions with surfaces is well-known from uranium isotope separations carried out during the Manhattan project. The collection of molecular ions at surfaces requires gentler conditions and ion soft landing was introduced for this purpose [13] (a variety of other phenomena [14] occur upon collision of molecular ions with surfaces, the best studied being surface induced dissociation [15-20]). Low kinetic energy (5-10 eV) beams of mass-selected organic ion beams can be collected at polyfluorinated self-assembled monolayer (SAM) surfaces [21]. Surface analysis confirmed the presence of deposited organic ion, such as the sterically bulky N,N-dimethylisothiocyanate cation. Organic cations [21,22], monomer cations to induce surface polymerization [24], polymers [25], and 160-mer double-stranded DNA [26] have also been soft-landed intact onto surfaces, as have metal clusters [27], and, in some experiments, virus particles have shown evidence of activity after in-vacuum deposition onto a collector plate following a gas-phase mass-selection [28]. In some of these cases there is evidence that the molecular entity on the surface is the selected ion [21], while in others it is the corresponding neutral molecule.

Growing demands from the proteomics and biotechnology fields for increased throughput of biological analyses have produced a rising interest in the production of protein microarrays from biological materials. Typically, fabrication of these arrays involves sample purification using various chromatographic techniques and micro-drop deposition methods [29-33]. The complementary separatory power of mass spectrometry to that of chromatography might allow experiments to address a broad range of problems in proteomics and related areas. Mass spectrometry using ion soft landing therefore appears to be a possible technology for the separation of biological compounds from mixtures and their storage in the array format for convenience of later analysis [34].

There is, therefore, a need for a new type of preparative mass spectrometer.

SUMMARY

In a general aspect of the invention, sample molecules in a mixture of molecules are ionized, separated in the gas phase as ions of different masses, and deposited or soft landed on a substrate where they are stored for later processing or analysis. More particularly, the molecules are ionized by, for example, electrospray ionization, matrix assisted laser desorption ionization or other ionizing means. The ionized molecules of the mixture are separated according to mass, charge and mobility or a combination of these parameters as ions or the corresponding neutrals, and then soft-landed at separate positions on a substrate to form an array.

In particular embodiments, a preparative mass spectrometer systems for microarray fabrication includes an ionization source, a separator, and a surface that is positioned in cooperative relationship with the separator. The ionization source converts a mixture of molecules into gas phase ions and the separator separates the ions according to their mass to charge ratio or mobility. In certain embodiments, the separator is a linear ion trap mass analyzer that accumulates and then separates the ions based on their mass to charge ratio. The separated molecules are soft landed onto the surface at different locations.

In some embodiments, small micro arrays can be prepared by isolating and soft landing individual protein or peptide ions after electrospray ionization of mixtures so that bioactivity in the mass-selected and collected biomolecules is retained.

Further features and advantages of this invention will be apparent from the following description, and from the claims.

BRIEF DESCRIPTION OF THE DRAWINGS

The invention will be more clearly understood from the following description when read in conjunction with the accompanying drawings in which:

FIGS. 15A-C illustrates accumulation followed by isolation followed by soft landing.

FIG. 16 illustrates simultaneous operation of accumulation and selective ejection and soft landing.

FIG. 17 illustrates separation of ions based on mobility.

DETAILED DESCRIPTION

Figure 1:
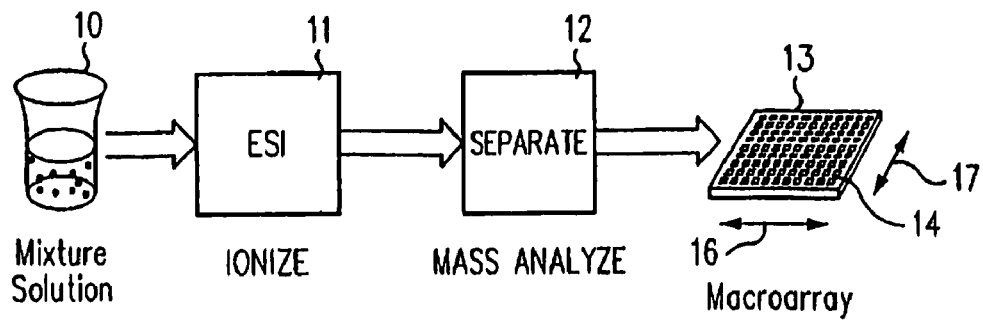
FIG. 1 is a flow chart showing the steps in one example for carrying out an embodiment of the present invention.

The preparation of microchips with biomolecule arrays is schematically illustrated in FIG. 1. The first step is the ionization 11 of the proteins or biomolecules contained in the sample mixture liquid solution 10 (or in other cases, the solid materials). The molecules can be ionized by electrospray ionization (ESI), matrix-assisted laser desorption ionization (MALDI) or other well known ionization methods. The ions are then separated 12 based on their mass/charge ratio or their mobility or both their mass/charge ratio and mobility. For example, the ions can be accumulated in an ion storage device such as a quadrupole ion trap (Paul trap, including the variants known as the cylindrical ion trap [2] and the linear ion trap [3]) or an ion cyclotron resonance (ICR) trap. Either within this device or using a separate mass analyzer (such as a quadrupole mass filter or magnetic sector or time of flight), the stored ions are separated based on mass/charge ratios. Additional separation might be based on mobility using ion drift devices or the two processes can be integrated. The separated ions are then deposited on a microchip or substrate 13 at individual spots or locations 14 in accordance with their mass/charge ratio or their mobility to form a microarray. To achieve this, the microchip or substrate is moved or scanned in the x-y directions 16 and 17, and stopped at each spot location for a predetermined time to permit the deposit of a sufficient number of biomolecules to form a spot having a predetermined density. Alternatively, the gas phase ions can be directed electronically or magnetically to different spots on the surface of a stationary chip or substrate. The molecules are preferably deposited on the surface with preservation of their structure, that is, they are soft landed. Two facts make it likely that dissociation or denaturation on landing can be avoided. First, large ions are much less likely to dissociate or undergo isomerization (denaturation) than smaller ions because of their lower velocities and greater numbers of degrees of freedom, and, second, prior evidence exists that gentle deposition can be achieved (Feng, B, et al., J. Am. Chem. Soc. 121 (1999) 8961-8962). Suitable surfaces for soft landing are chemically inert surfaces which can efficiently remove vibrational energy during landing, but which will allow spectroscopic identification. Surfaces which promote neutralization, rehydration or having other special characteristics might also be used for protein soft landing.

Figure 2:
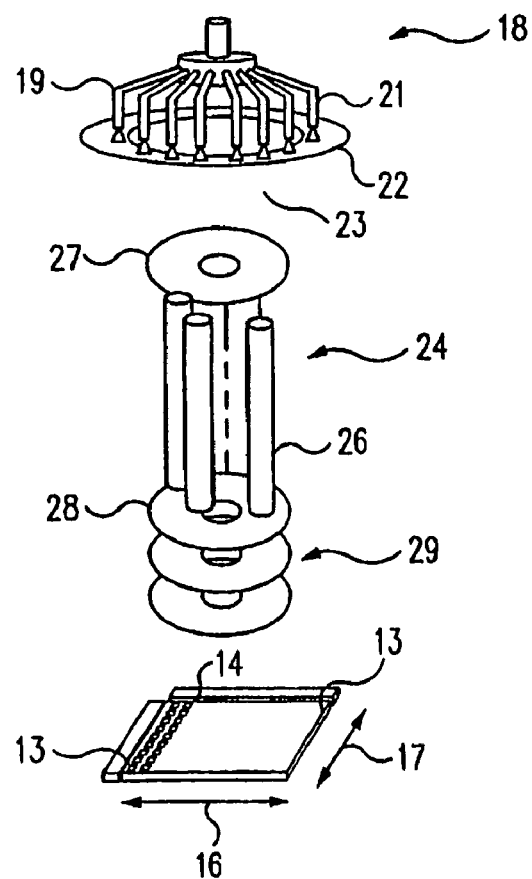
FIG. 2 is a schematic view of a mass analyzer system for carrying out an embodiment of the present invention.

As briefly described above, a mass spectrometer can be used to separate the sample ions according to their mass/charge ratio. A system 18 in accordance with the invention is schematically illustrated in FIG. 2. The sample is applied to a multiplexed electrospray ion source 19 [1]. The biomecules leaving the nanospray nozzles 21 are ionized by a voltage applied between the nanospray nozzles and the atmospheric interface 22. The streams 23 of ionized biomolecules are fed into a single high ion capacity linear ion trap 24. The ion trap includes spaced rods 26 and end electrodes 27 and 28. As known, the ion trap can be operated to accumulate ions within the trap and then selectively excite them so they exit the trap in accordance with their mass/charge ratio. A focusing lens assembly 29 focuses the ejected biomolecule ions onto a spot 14 on the microchip 13. The lens assembly can control the ions' velocity and thus the landing energy for soft-landing. As will be presently described in greater detail, other types of mass spectrometers or analyzers can be used to separate and deposit the biomolecule ions onto the microchip. The use of multiplexed ion spray shortens the time required to accumulate a sufficient number of ions to form a spot of desired quality.

Figure 3:
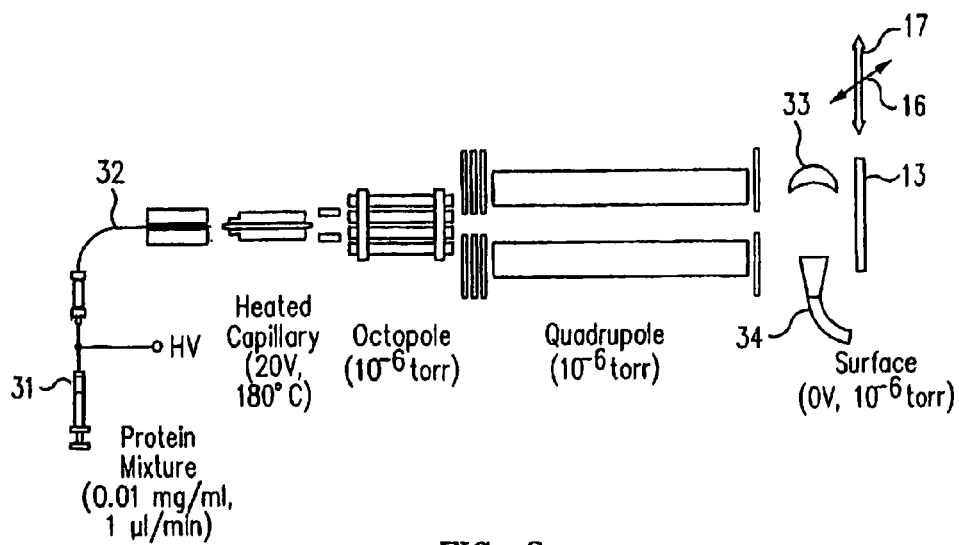
FIG. 3 is a schematic view of a mass spectrometer instrument used in soft landing components of a protein mixture.

In one example proteins and biomolecules were soft-landed using a linear quadrupole mass filter. A commercial Thermo Finnigan (San Jose, Calif.) SSQ 710C, FIG. 3, was modified by adding an electrospray ionization (ESI) source. The source included a syringe 31 which introduced the protein mixture into the capillary 32. A high voltage (HV) was applied between the capillary 32 and the ionization chamber (not shown) for electrospray ionization. The various chambers (not shown) and elements of the instrument and their pressures are schematically shown and identified in FIG. 3. The microarray plate 13 was mounted for x-y movement in the last evacuated chamber. An x-y microarray plate drive is not shown since its construction is well within the skill of those practicing the art. In one example a flow rate of 0.5 µl/min was used throughout the experiments. The surface for ion landing was located behind the detector assembly. In the ion detection mode, the high voltages on the conversion dynode 33 and the multiplier 34 were turned on and the ions were detected to allow the overall spectral qualities, signal-to-noise ratio and mass resolution over the full mass range to be examined. In the ion-landing mode, the voltages on the conversion dynode and the multiplier were turned off and the ions were allowed to pass through the hole in the detection assembly to reach the gold surface of the plate 13. The surface was grounded and the potential difference between the source and the surface was 0 volts.

To demonstrate preparative separation using mass spectrometry, a mixture of three proteins, cytochrome c. lysozyme, and apomyoglobin, was subjected to electrospray ionization (ESI). Individual ions were isolated using the SSQ-710C (ThermoFinnigan, San Jose, Calif.) mass spectrometer. The pure proteins were collected via ion soft-landing. In each case, the mass selection window was 5 mass/charge units; the unit of mass to charge ratio will be reported using the Thomson (Th) where 1 Th=1 mass unit/unit charge [10]. The landed proteins were re-dissolved by rinsing the surface with a 1:1 methanol:$H_2O$ (v/v) solution. The rinse solutions were examined using an LCQ Classic (ThermoFinnigan, San Jose, Calif.) mass spectrometer.

Solutions were prepared by mixing 100 µL 0.02 mg/mL cytochrome c (Sigma-Aldrich, St. Louis, Mo.) in 1:1 methanol: $H_2O$ (v/v), 200 µL 0.01 mg/mL lysozyme (Sigma-Aldrich, St. Louis, Mo.) in 1:1 methanol: $H_2O$ (v/v), 200 µL 0.05 mg/mL apomyoglbin (Sigma-Aldrich, St. Louis, Mo.) in $H_2O$.

A gold substrate (20 mm×50 mm, International Wafer Service) was used for the ion soft-landing. This substrate consisted of a Si wafer with 5 nm chromium adhesion layer and 200 nm of polycrystalline vapor deposited gold. Before it was used for ion landing, the substrate was cleaned with a mixture of $H_2SO_4$ and $H_2O_2$ in a ratio of 2:1, washed thoroughly with deionized water and absolute ethanol, and then dried at 150° C. A Teflon mask, 24 mm×71 mm with a hole of 8 mm diameter in the center, was used to cover the gold surface so that only a circular area with a diameter of 8 mm on the gold surface was exposed to the ion beam for ion soft-landing of each mass-selected ion beam. The Teflon mask was also cleaned with 1:1 MeOH:$H_2O$ (v/v) and dried at elevated temperature before use. The surface and the mask were fixed on a holder and the exposed surface area was aligned with the center of the ion optical axis.

For each protein, an ion soft-landing period of 90 minutes was used. Between each ion-landing, the instrument was vented, the Teflon mask was moved to expose a fresh surface area, and the surface holder was relocated to align the target area with the ion optical axis. The syringe was reloaded with the protein mixture solution and the ESI conditions were adjusted before ion landing by monitoring the spectral qualities in the detection mode. The voltage applied on the syringe tip varied: 7 kV was used for cytochrome C, 4.9 kV was used for lysozyme, and 5.2 kV was used for apomyoglbin.

Figure 4:
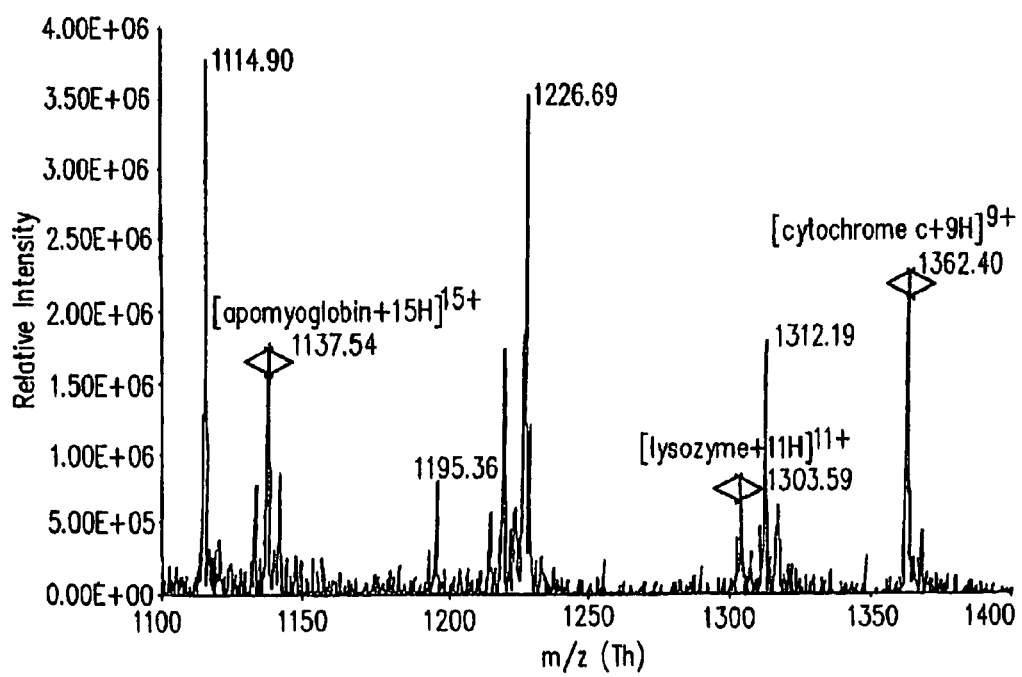
FIG. 4 is the mass spectrum of a mixture of cytochrome c, lysozyme, and apomyoglobin showing ions of various charge states; diamonds were selected for deposition.

FIG. 4 shows the ESI mass spectrum of the mixture of cytochrome c, lysozyme, and apomyoglobin. The ions of +9 charge state of cytochrome c (1360 Th), +11 charge state of lysozyme (1301 Th), and +15 charge state of apomyoglobin (1131 Th) were selected individually for ion soft-landing. A mass isolation window of 5 Th centered at the mass-to-charge ratio of the isolated ion was used. The mass ranges selected on the SSQ 710C (Thermo Finnigan, San Jose, Calif.) for the three proteins were as follows: 1360-1365 Th for cytochrome c; 1300.5-1305.5 Th for lysozyme; and 1135-1140 Th for apomyogolbin.

After soft-landing, the Teflon mask was removed from the surface and the three exposed areas were rinsed with 1:1 methanol/$H_2O$ (v/v) solution. Each area was rinsed twice with 50 µl solution. The rinse solutions were analyzed using a LCQ Classic with loop injection (5 µl). The apomyoglobin solution was acidified before analysis.

Figure 5A:
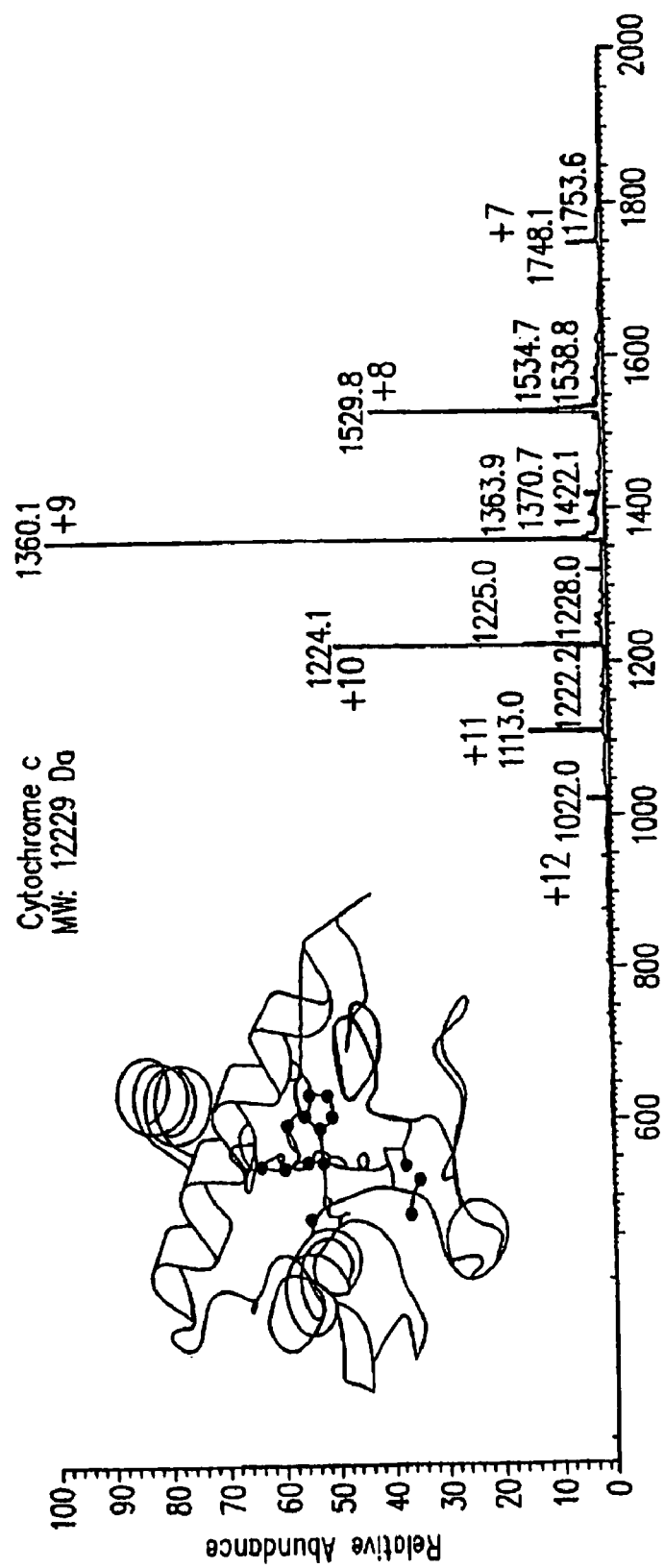
(FIG. 5A); lysozyme +11 (FIG. 5B) and apomyoglbin +15 (FIG. 5C).
Figure 5B:
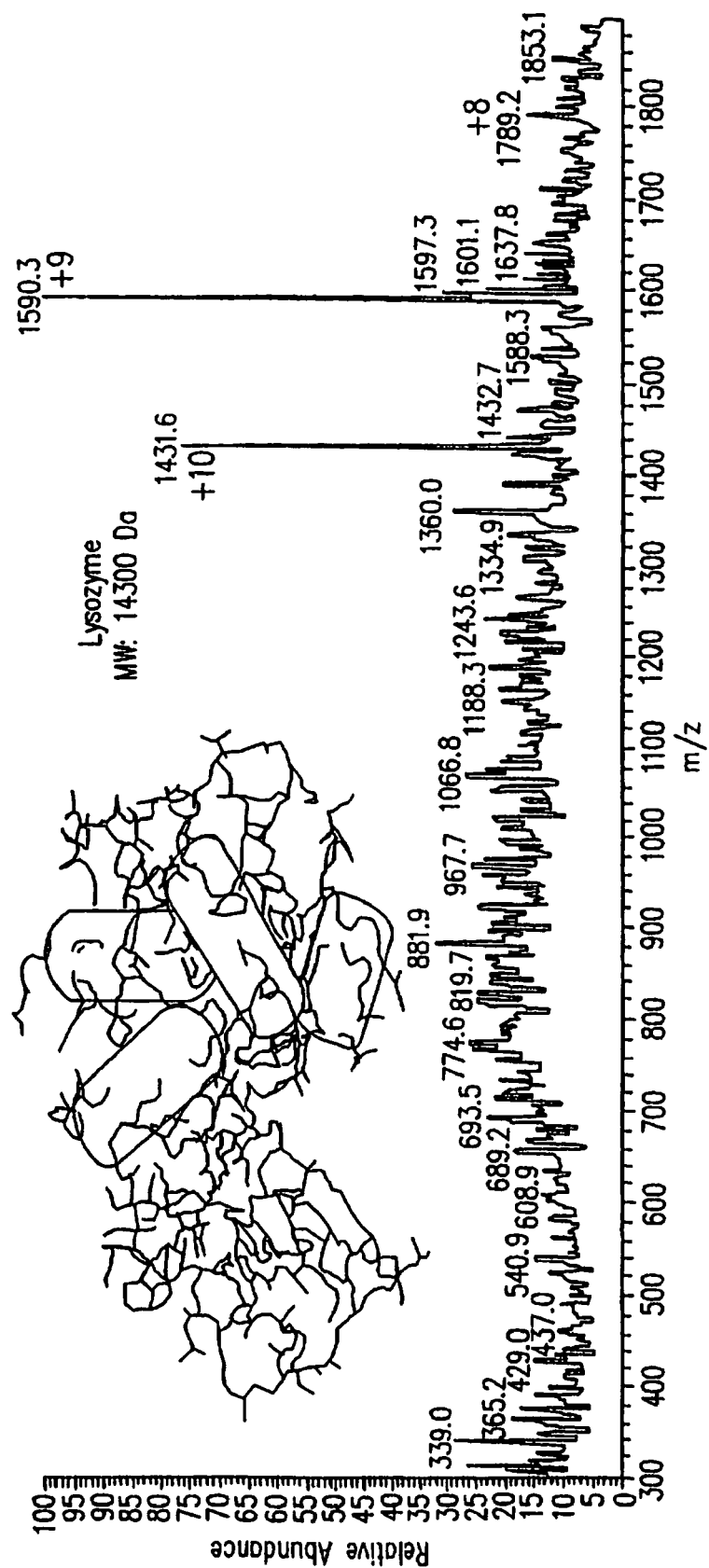
FIG. 5 shows the spectra of rinse solutions from surface areas exposed to cytochrome c +9.
Figure 5C:
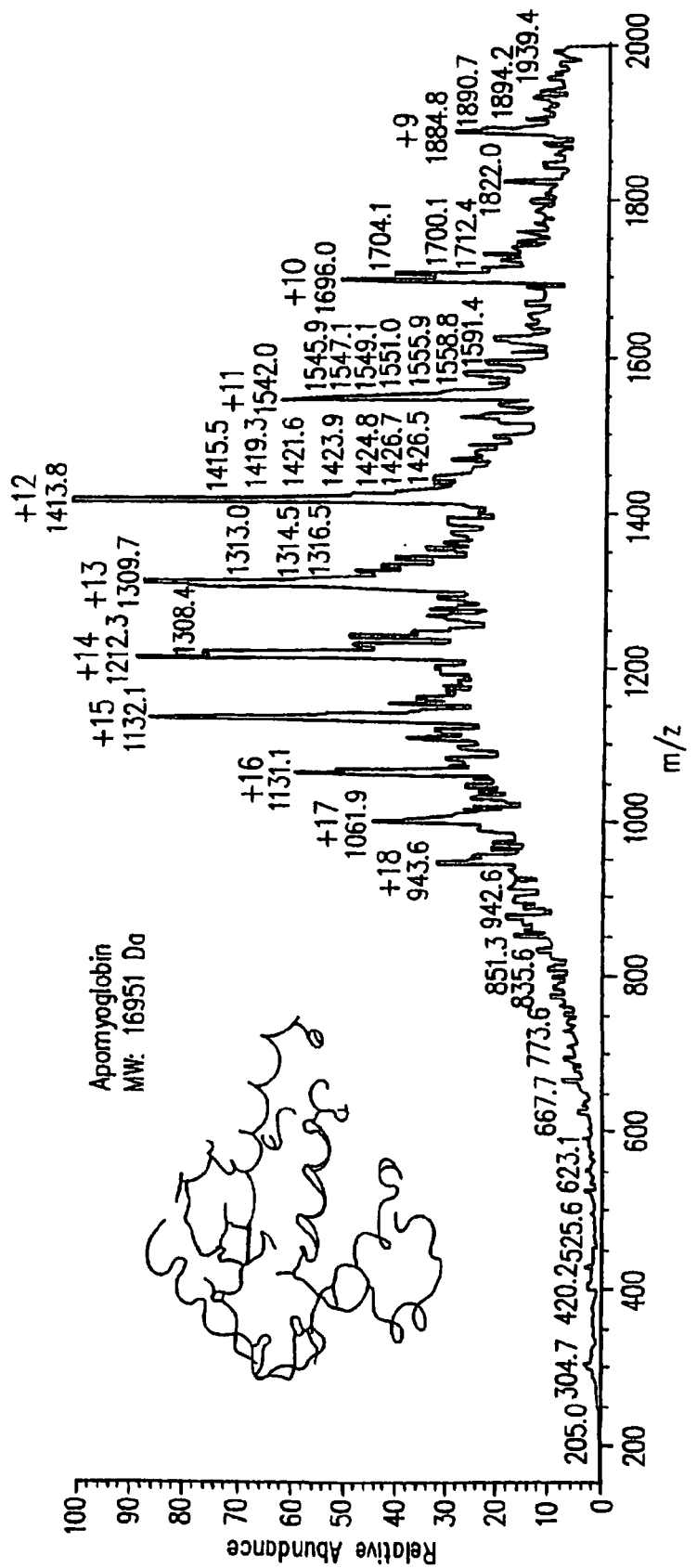

FIG. 5 shows the spectra recorded from the analysis of the rinse solutions. From the solutions obtained by rinsing the surface area exposed to cytochrome c +9, the ions corresponding to cytochrome c charge states of +7 to +12 were observed (FIG. 5a); the ions corresponding to lysozyme charge states +8 to +10 were found in the rinse solutions for the surface area exposed to lysozyme +11 (FIG. 5b); and the ions corresponding to apomyoglobin charge states +9 to +18 were observed in the rinse solutions for the surface area exposed to apomyoglobin +15 (FIG. 5c).

Four conclusions can be drawn from this experiment: 1. Proteins can be collected on surfaces by ion soft-landing using mass-selected ions; 2. Each rinse solution contained only the protein which was selected and landed on the surface, indicating that the ions have been well separated from other ionic or neutral species in the gas phase; 3. Only molecular ions were observed in the rinse solution, which means the ion soft-landing is capable of retaining the intact protein molecular structure; and 4. The fact that the mass spectra show a distribution of charge states, not just the particular state soft-landed, indicates that the protein is neutralized on landing on the surface or after re-solvation.

Figure 6A:
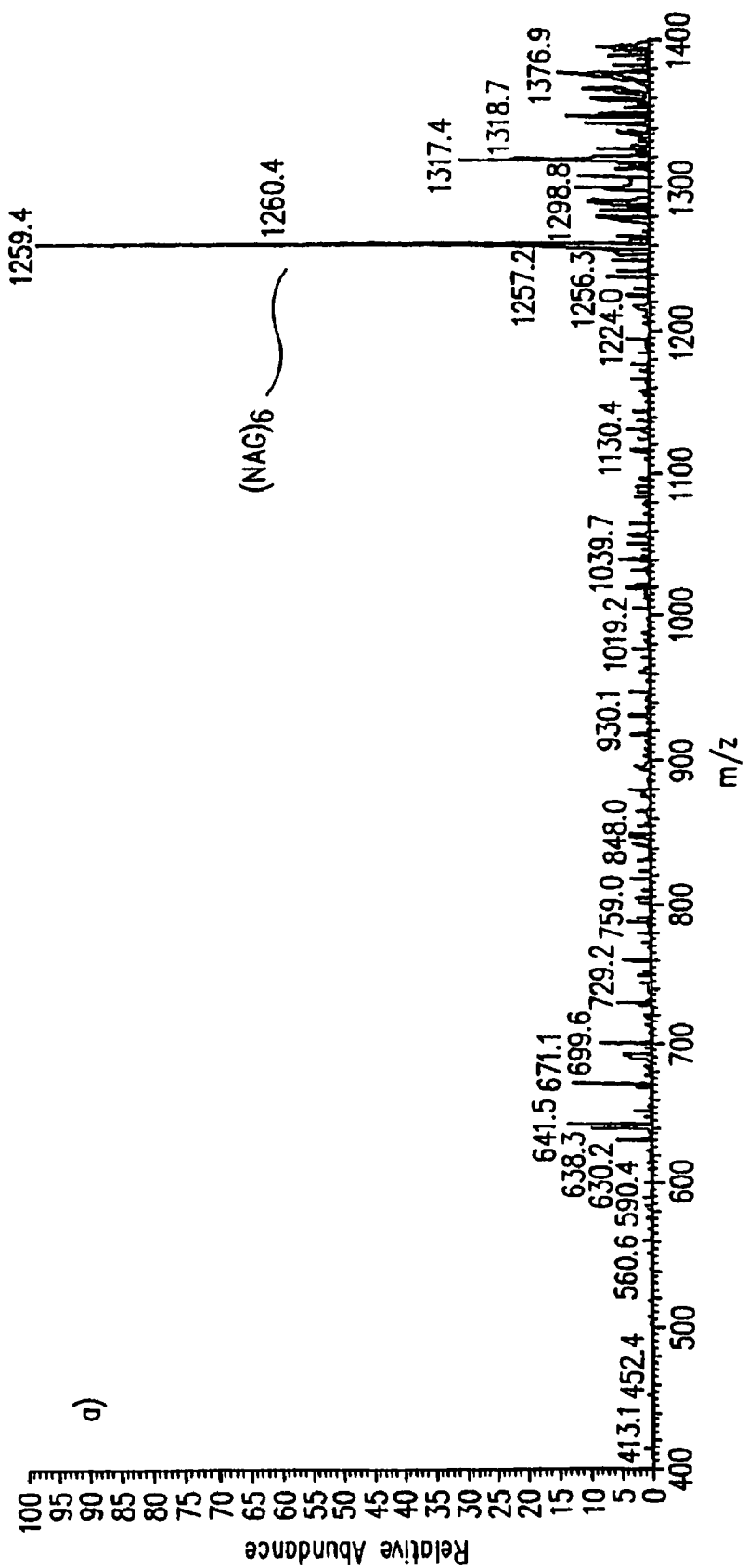
FIGS. 6A and 6B show the spectrum of rinse solutions containing hexa-N-acetyl chitohexaose, and spectrum of digested product of hexa-n-actylchitohexaose by soft-landed lysozme.
Figure 6B:
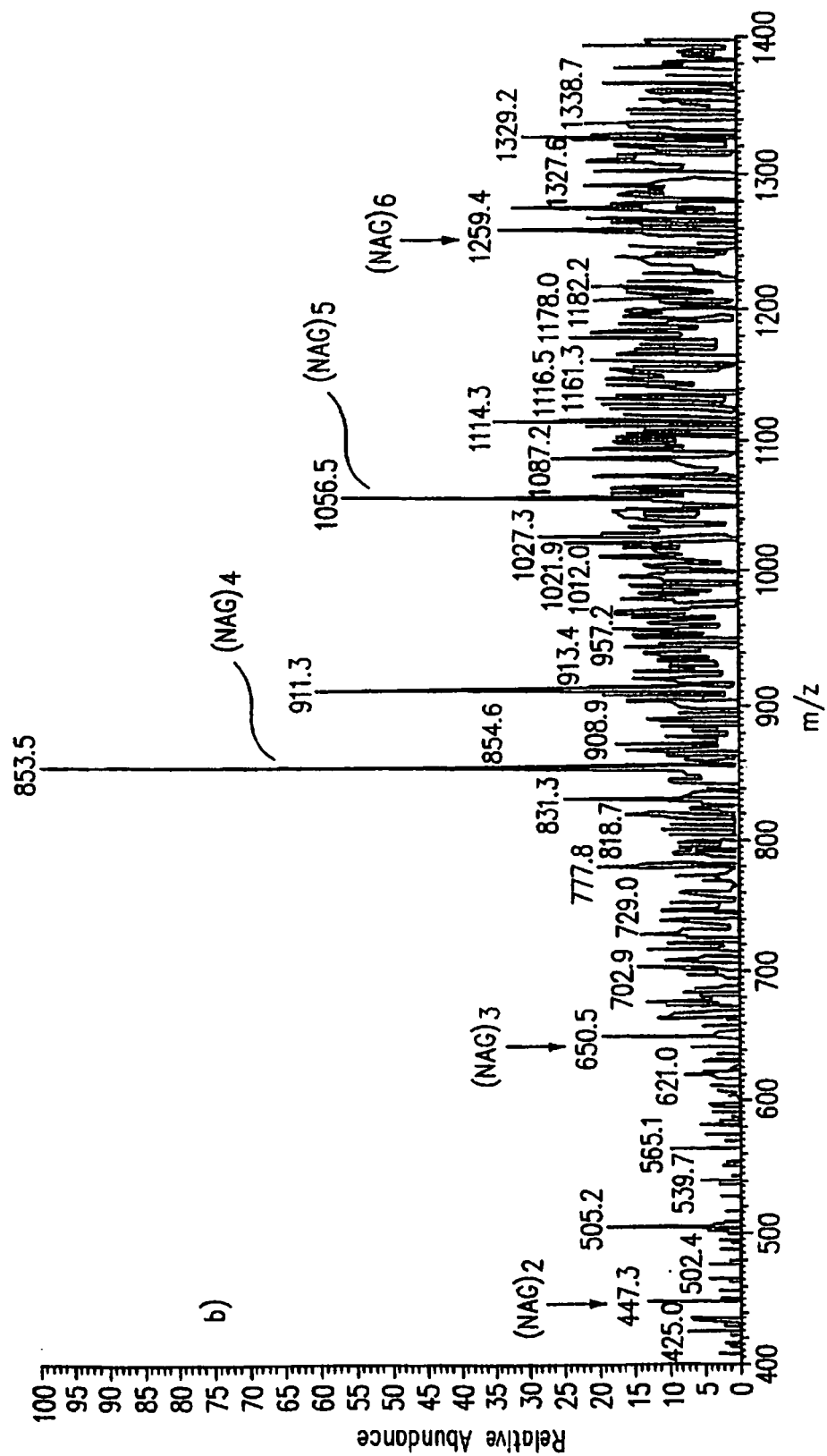

Bioactivity of the landed lysozyme was tested by using hexa-N-actyl chitohexoase as substrate. $[Lysozyme+8H]^{8+}$ was landed for 4 hours on a Au target using the same experimental conditions described above. The surface was rinsed using 1 µM hexa-N-acetyl chitohexaose solution containing 2 mM Na+ at a pH of 7.8. The solution was incubated at 38° C. for 2.5 h and was analyzed using the LCQ instrument in the positive ion ESI mode. Spectra of the original solution and the digestion product are shown on FIGS. 6A and 6B.

While the spectrum of the original substrate solution shows only the presence of the hexa-N-acetyl-chitohexaose, the spectrum of the digestion product shows an intense sodiated molecular ion of the tetra-N-acetyl-chitotetraose and other N-acetyl-glucosamine oligomers which are the cleveage products from the enzymatic digestion of substrate. Four conclusions can be drawn from these experiments: 1) The protein ions mass selected by the mass analyzer have been collected through ion soft-landing on the surface; 2) each rinse solution contained only the protein corresponding to the ions selected to land on the surface, which indicates that the ions have been well separated from other ionic or neutral species in the gas phase; 3) only intact molecular ions were observed in the rinse solution, which means the ion soft-landing is capable for retaining the protein molecular structures; and 4) soft-landed lysozyme was able to cleave hexa-N-acetyl-chitohexaose producing tetra-N-acetyl-chitotetraose indicating normal enzymatic activity of this protein.

To provide further experimental evidence that soft-landed proteins retain bioactivity, a mixture of two enzymes, trypsin and lysozyme, were separated in a SSQ-710C (ThermoFinnigan, San Jose, Calif.) mass spectrometer and the pure proteins were collected via ion soft-landing. Two blank samples were generated by landing ions in the mass/charge region from 200 Th to 210 Th, a region that does not contain protein ions. The same instrumental parameters were used as in the case of the experiments described above. A mixture solution was prepared by mixing 200 µL 0.1 mg/mL lysozyme (Sigma-Aldrich, St. Louis, Mo.) in 1:1 MeOH:$H_2O$ (v/v) and 0.01 mg/mL trypsin in 1:1 MeOH:$H_2O$ containing 1% AcOH.

Figure 7A:
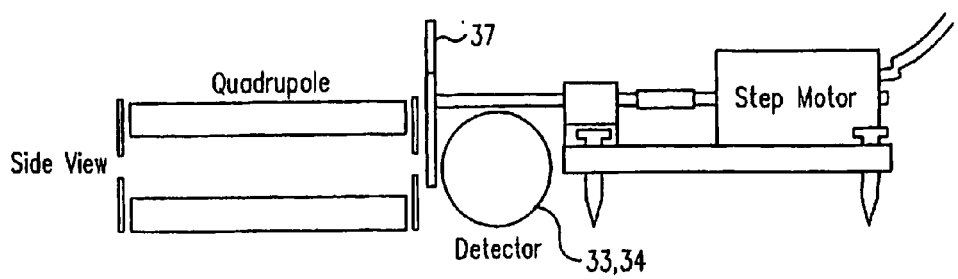
FIGS. 7A and 7B show a rotable disk for monitoring surfaces for receiving soft-landed ions and a drive motor.
Figure 7B:
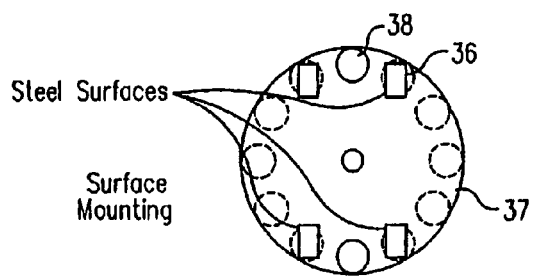

Four 10 mm×5 mm steel plates 36 were mounted on a rotatable steel disk 37 having openings 38 which was connected to a step motor 39, as it is shown on FIGS. 7A and 7B. The detector 33, 34 was mounted behind the disk and detected ions traveling through the openings 38.

Figure 8A:
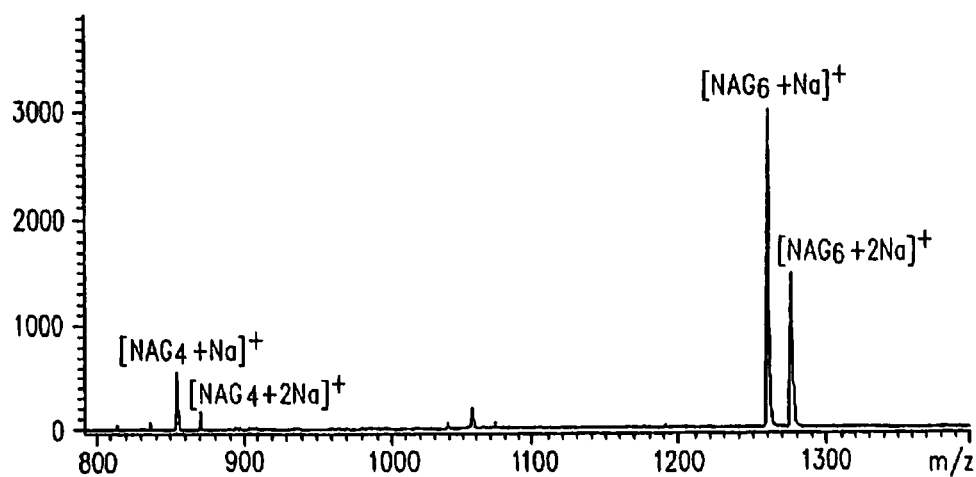
FIG. 8A shows the spectrum for the substrate hex-N-acetyl chitohexaose ($NAG_6$) and its lysozyme cleavage product, tetra-N acetyl-chitotetraose detected by MALDI-TOF on the surface carrying soft-landed lysozme.
Figure 8B:
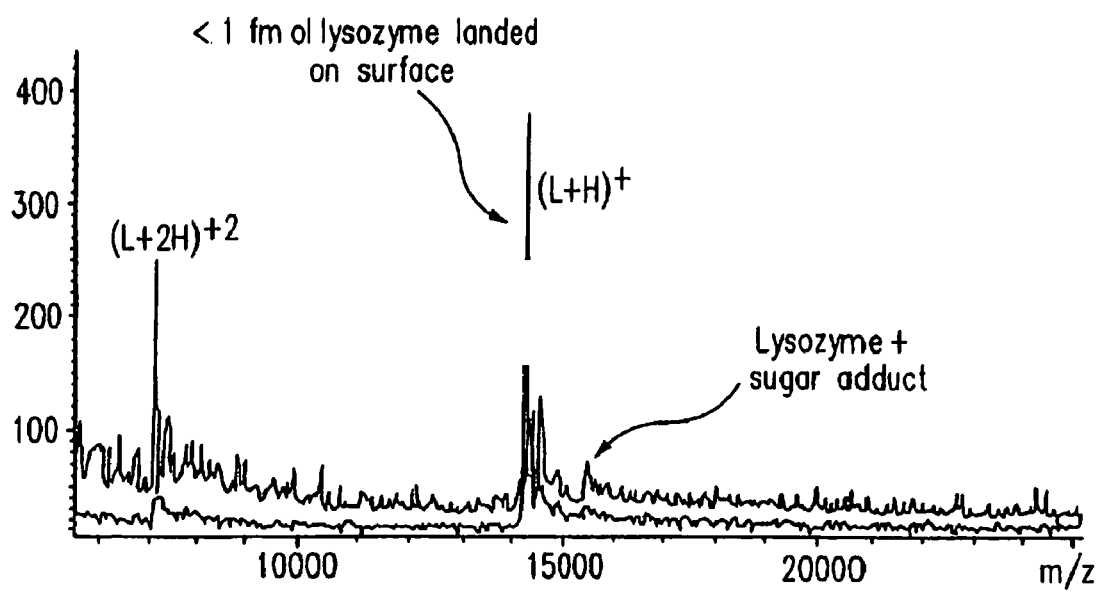
FIG. 8B shows the spectrum for soft-landed lysozme on the surface detected by MALDI-TOF.

$[Lysozyme+8H]^{8+}$, $[Trypsin+12H]^{12+}$ ions and two blanks were landed on four separate steel plates by changing the mass window and rotating the disk between the landing sessions. Each session was 3 hours long. The instrument was not vented between depositions. Bioactivity of landed lysozyme was tested by pipetting 10 µL 1 µM hexa-N-acetyl chitohexaose solution containing 2 mM Na+ at pH of 7.8 onto the plate carrying landed lysozyme and one of the blank plates. The system was incubated at 37° C. for 4 hours. The evaporated solvent was supplemented continuously. After 4 hours, 2 µL 3% 2,5-dihydroxy benzoic acid in MeOH:$H_2O$ 1:2 was added and the solvent was evaporated to dryness. The plate was transferred into a Bruker Reflex III MALDI-TOF mass spectrometer and MALDI data was collected in the reflectron mode (FIG. 8A) in the low mass range, and in the linear mode in the high mass range. (FIG. 8B) The low-mass MALDI spectra show both the sodiated molecular ion of the substrate and the cleavage product. The high mass MALDI spectrum shows the singly and doubly charged ions of intact enzyme and the enzyme-substrate complex.

Figure 9:
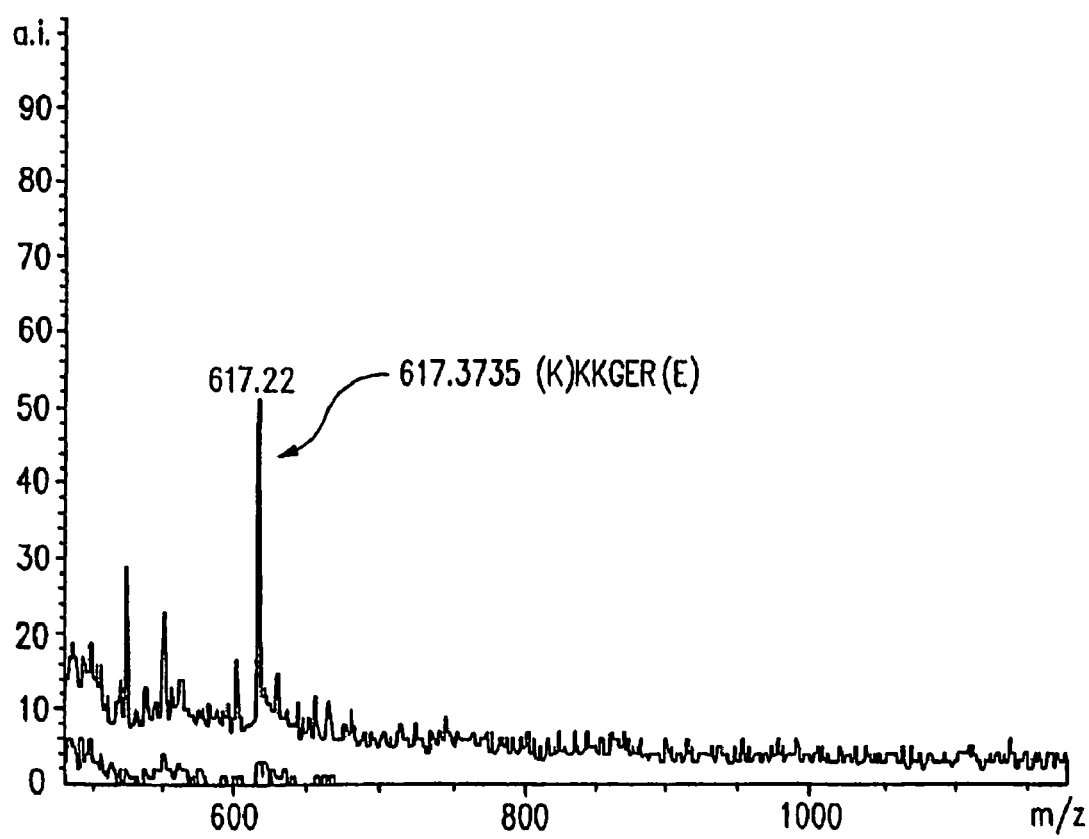
FIG. 9 shows the spectrum of characteristic tryptic digest fragment of cytochrome C detected on a surface carrying soft-landed trypsin.

The bioactivity of landed trypsin was tested by pipetting 10 µL 1 µM cytochrome C solution in 10 mM aqueous $NH_4CO_3$ onto the plate carrying the landed trypsin and onto the blank. The system was incubated at 37° C. for 4 hours. The evaporated solvent was supplemented continuously. After 4 hours 2 µL saturated .alpha.-cyano-3-hydroxy-cinnamic acid in ACN:$H_2O$ 1:2 (containing 0.1% TFA) was added and the solvent was evaporated to dryness. The plate was transferred into a Bruker Reflex III MALDI-TOF mass spectrometer and MALDI data was collected in reflectron mode (FIG. 9.). Characteristic tryptic fragments of cytochrome C were detected.

Figure 10:
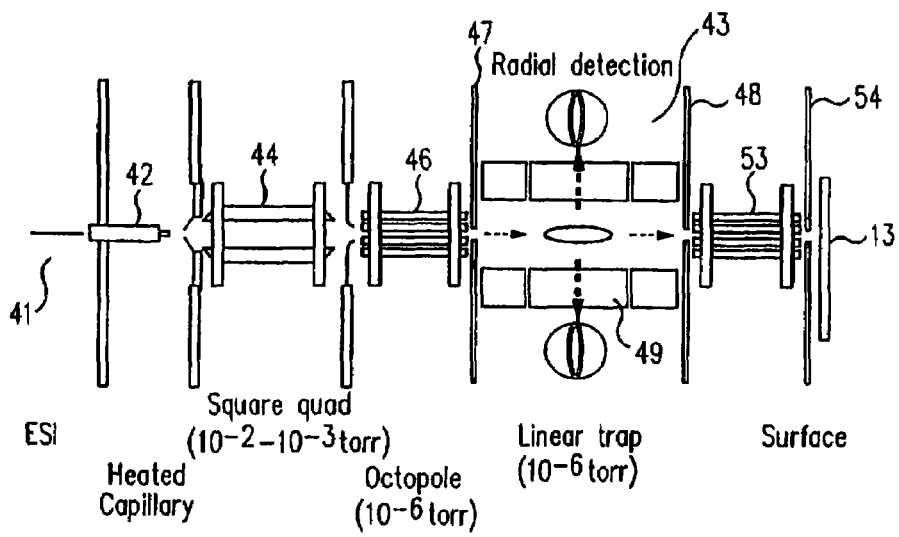
FIG. 10 is a schematic of another instrument which includes a linear ion trap.
Figure 11A:
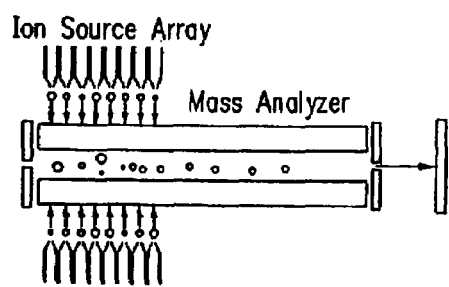
FIGS. 11A-D show configurations of multi-source ionization with linear ion traps.
Figure 11B:
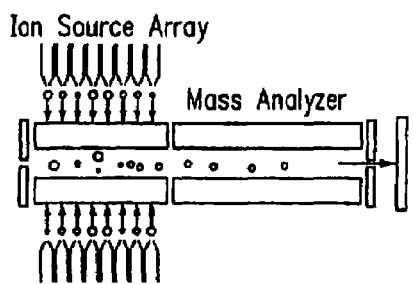
Figure 11C:
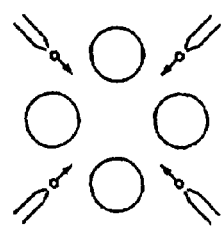
Figure 11D:
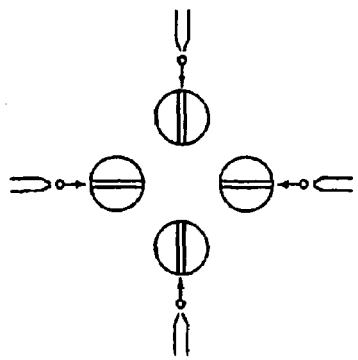

In another embodiment, a linear ion trap can be used as a component of a soft-landing instrument. A Schematic representation of a soft-landing instrument is presented in FIG. 10. The instrument includes an ion source 41 such as an ESI source at atmospheric pressure. Ions travel through a heated capillary 42 into a second chamber via ion guides 44, 46 in chambers of increasing vacuum (decreasing pressure). The ions are captured in the linear ion trap 43 by applying suitable voltages to the electrodes 47 and 48 and RF and DC voltages to the segments of the ion trap rods 49. The stored ions can be radially ejected for detection. Alternatively, the ion trap can be operated to eject the ions of selected mass through the ion guide 53, through plate 54 onto the microarray plate 13. The plate can be inserted through a mechanical gate valve system, not shown, without venting the entire instrument.

The advantages of the linear quadrupole ion trap over a standard Paul ion trap include increased ion storage capacity and the ability to eject ions both axially and radially. Linear ion traps give unit resolution to at least 2000 Th and have capabilities to isolate ions of a single mass/charge ratio and then perform subsequent excitation and dissociation in order to record a product ion MS/MS spectrum. Mass analysis will be performed using resonant waveform methods. The mass range of the linear trap (2000 Th or 4000 Th but adjustable to 20,000 Th) will allow mass analysis and soft-landing of most biomolecules of interest.

In the soft-landing instrument described above the ions are introduced axially into the mass filter rods or ion trap rods. FIG. 2 illustrates a suitable axial multiplexed electrospray ion source. The ions can also be radially introduced into the linear ion trap.

A multiplexed nano-electrospray ion source with each of the tips feeding radially into a single high ion capacity linear ion trap is illustrated in FIGS. 11A, 11B, 11C and 11D. This arrangement is selected because nanospray ionization is highly efficient, much more so than the higher flow microelectrospray method. The figures show two possible source/analyzer arrangements. In one, FIG. 11A, the source is simply a part of the linear ion trap analyzer into which ions are injected. In the other, FIG. 11B, the source is a separate device but it is operated using the same RF ion trapping voltage as the analyzer and its DC potential is set so as to provide axial trapping. Two methods of introducing ions are also shown, one (FIG. 11C) involves spraying ions between the electrodes and the other (FIG. 11D) involves cutting slits into the electrodes and spraying ions through the slits.

Figure 12:
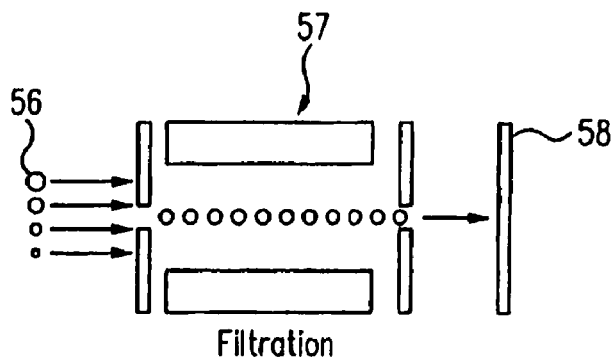
FIG. 12 illustrates separation by filtering for ions of particular mass/charge ratios.

Methods of operating the above described soft-landing instruments and other types of mass analyzers to soft land ions of different masses at different spots on a microarray are now described. Referring to the schematic diagram of FIG. 12 which illustrates the rods of an instrument such as that shown in FIGS. 2 and 3 operated as a mass filter. The ions 56 of the protein mixture are introduced into the mass filter 57. Ions of selected mass-to-charge ratio will be mass-filtered and soft landed on the substrate 58 for a period of time. The mass-filter settings then will be scanned or stepped and corresponding movements in the position of the substrate will allow deposition of the ions at defined positions on the substrate 58.

Figure 13:
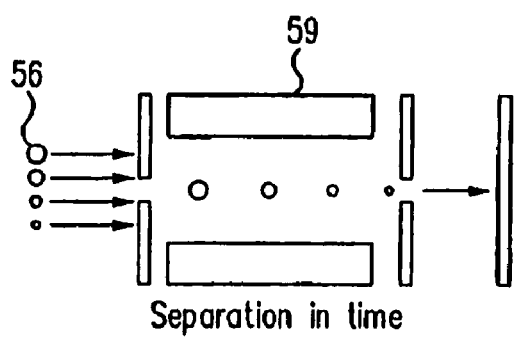
FIG. 13 illustrates separation by time in which ions of different mass/charge ratios all pass through the analyzer.

The ions 56 can be separated in time so that they arrive and land on the surface at different times. While this is being done the substrate is being moved to allow the separated ions to be deposited at different positions. A spinning disk is applicable, especially when the spinning period matches the duty cycle of the device. The applicable devices include the time-of-flight and the linear ion mobility drift tube 59 schematically illustrated in FIG. 13. The ions can also be directed to different spots on a fixed surface by a scanning electric or magnetic fields.

Figures 14A, 14B:
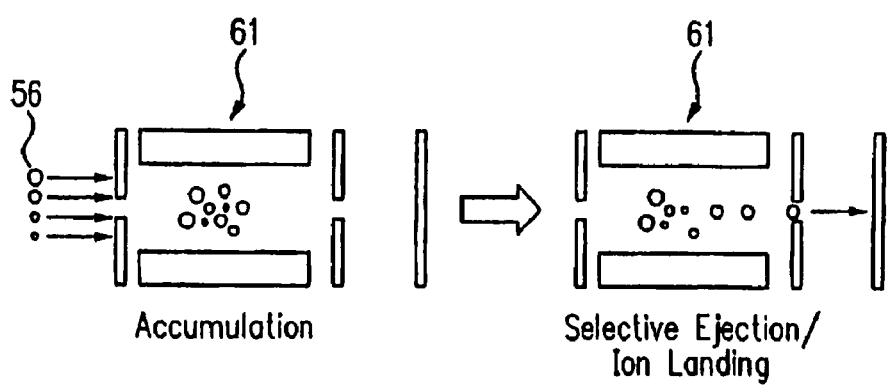
FIGS. 14A and 14B illustrates accumulation followed by separation with selective ejection.

In another embodiment, FIG. 14, the ions 56 can be accumulated and separated using a single device 61 that acts both as an ion storage device and mass analyzer. Applicable devices are ion traps (Paul, cylindrical ion trap, linear trap, or ICR). The ions are accumulated followed by selective ejection of the ions for soft landing, FIGS. 14A and 14B respectively. The ions 56 can be accumulated, isolated as ions of selected mass-to-charge ratio, and then soft landed onto the substrate 58. This is illustrated in FIGS. 15A, 15B and 15C. Ions can be accumulated and landed simultaneously. In another example, FIG. 16, ions of various mass-to-charge ratios are continuously accumulated in the ion trap while at the same time ions of a selected mass-to-charge ratio can be ejected using SWIFT and soft-landed on the substrate 58.

In a further embodiment of the soft-landing instrument, ion mobility is used as an additional (or alternative) separation parameter. As before, ions are generated by a suitable ionization source such as an ESI or MALDI source. The ions are then subjected to pneumatic separation using a transverse gas flow and electric field. A soft-landing instrument is shown in FIG. 17. The ions move through a gas in a direction established by the combined forces of the gas flow 62 and the force applied by the electric field 63. Ions are separated in time and space. The ions with the higher mobility arrive at the surface 64 earlier and those with the lower mobility arrive at the surface later at spaces or locations on the surface.

The instrument can include a combination of the described devices for the separation and soft-landing of ions of different masses at different locations. Two such combinations include ion storage (ion traps) plus separation in time (TOF or ion mobility drift tube) and ion storage (ion traps) plus separation in space (sectors or ion mobility separator).

It is desirable that protein conformation and bio-activity be retained. A combination of strategies may be employed. One is to keep the deposition energy low to avoid dissociation or transformation of the biological ions when they land. This needs to be done while at the same time minimizing the spot size. Two facts make it likely that dissociation on landing can be avoided: first, large ions are much less likely to dissociate or undergo isomerization (e.g. protein denaturation) than smaller ions because of their lower velocities and the greater numbers of degrees of freedom into which energy can be partitioned, and second, prior evidence exists that gentle deposition can be achieved. Another strategy is to mass select and soft land an incompletely desolvated form of the ionized biomolecule. Extensive hydration is not necessary for biomolecules to keep their solution-phase properties in the gas-phase. Hydrated biomolecular ions can be formed by electrospray and separated while still "wet" for soft landing. The substrate surface can be a "wet" surface for protein soft landing; this would include a surface with as little as one monolayer of water. Alternatively, it can be a surface such as dextran in which proteins are stabilized by hydroxyl functional groups. Another strategy is to hydrate the protein immediately after mass-separation and prior to soft landing. Several types of mass spectrometers, including the linear ion trap, allow ion/molecule reactions including hydration reactions. It might be possible to control the number of water molecules of hydration. Still further strategies are to deprotonate the mass-selected ions using ion/molecule or ion/ion reactions after separation but before soft landing to avoid undesired ion/surface reactions or protonate at a sacrificial derivatizing group which is subsequently lost.

Figure 18:
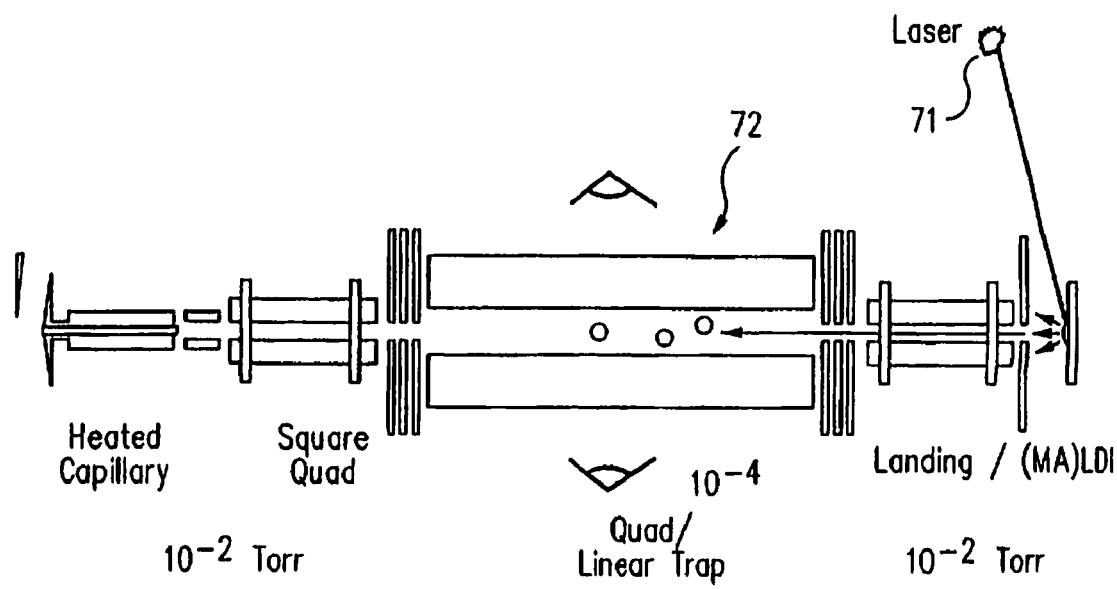
FIG. 18 is a schematic diagram of an instrument showing the collected samples on the surface being ionized by a laser with the released ions being injected back into the mass spectrometer for analysis.
Figure 19:
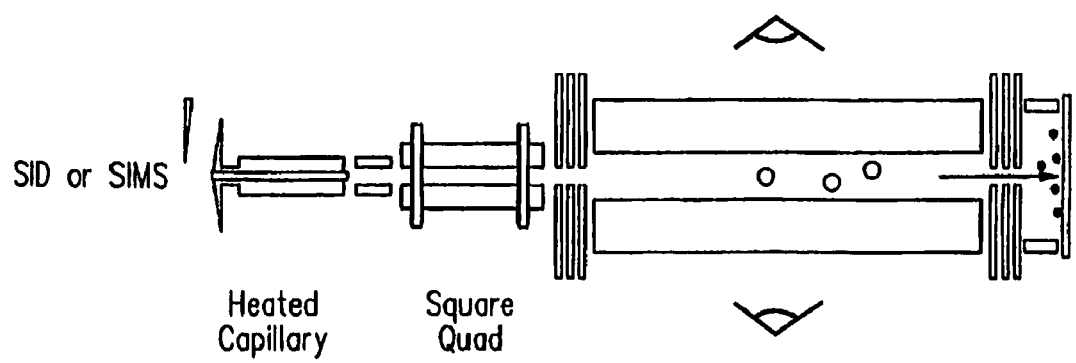
FIG. 19 shows an instrument in which the proteins/peptides are trapped, isolated and then ejected to soft land onto a surface, and after a short delay they may be injected back into the instrument for mass analysis.

Different surfaces are likely to be more or less well suited to successful soft landing. For example, chemically inert surfaces which can efficiently remove vibrational energy during landing may be suitable. The properties of the surfaces will also determine what types of in situ spectroscopic identification are possible. The protein ions can be soft landed directly onto substrates suitable for MALDI. Similarly, soft landing onto SERS-active surfaces should be possible. In situ MALDI and secondary ion mass spectrometry (SIMS) can be performed by using a bi-directional mass analyzer such as a linear trap as the mass analyzer in the ion deposition step and also in the deposited material analysis step. This is illustrated in FIG. 18 which shows a soft-landing instrument as in FIG. 10. The array of soft-landed proteins on the substrate are excited by laser 71 and directed back into the linear ion trap 72 where they are analyzed. The instrument can be applied to protein SID with little modification, as illustrated in FIG. 19. The proteins/peptides are trapped, isolated, and then ejected to collide onto the surface. After a short delay (as in TOF-surface-TOF instruments), the fragments are injected into the linear trap again for mass analysis.

In summary, in the present system and method, sample molecules in a mixture of proteins or other molecules are ionized, separated in the gas phase as ions of different masses and deposited or soft-landed on a substrate where they are stored for later processing or analysis. They can be separated by their m/z (Th) or their mobility or both and collected as charged or neutral, pure or impure species. During the gas phase separation, the species to be separated can be in the form of molecules or clusters of molecules. The species can be soft-landed or collected as a charged species or neutral species, with or without retention of any prior bioactivity. The separated species can be collected on a surface in an array of discrete spots or in a continuous trace. They can be mobile or immobilized on the surface. The separated species can also be collected in a liquid. Various separation mechanisms, some of which have been described, can be employed. These include filtering (quadruple mass spectrometer, selected ion monitoring mode for other devices), separation in time (TOF, Ion trap, IMS, ICR, etc.) and separation in space (sector, IMS, TOF, etc.). The species can be separated and then collected or collected while it is being separated. The present system and method can also be used to carry out micro scale reactions: soft landing onto a small region and then landing a second species on top or soft landing onto a small region of a chemically active surface or soft landing followed by addition of a reagent to some or all of the collected material in the assay of spots.

This is a unique method that uses mass spectrometry instead of chromatography for preparative-scale separation. It is also an alternative to methods in which arrays are built up synthetically by jet micro-drop or related methods in which reagents are mixed in combinations that allow deposition of specific compounds (typically oligonucleotides) at certain points in the array. Many potentially important applications for the soft-landing instrument should emerge. These include the creation of micro-arrays of proteins (and other compounds) from complex biological mixtures without isolation of pure proteins or even knowledge of their structures. These separated proteins on the array could be interrogated using standard affinity binding and other tests of biological or pharmacological activity.

In general, soft landing offers new ways of interrogating and recognizing biomolecules in pure form with the possibility of storage and later re-measurement of samples. These experiments will lead to highly sensitive detection/identification, e.g. activity assays, using surface-based spectroscopic methods, including Raman spectroscopy. Note that separation by mass spectrometry of proteins from complex mixtures (e.g. serum, plasma) is orthogonal to other separation methods and most likely advantageous when closely related groups of compounds (e.g. glycosylated forms of proteins) are to be separated. The advantages of soft landing extend to minor protein constituents of mixtures, especially when used in conjunction with chromatographic methods like capillary electrochromatography (CEC). It is possible to foresee related-substance analysis on recombinant and post-translationally modified proteins as well as high-throughput experiments, including drug receptor screenings.

Other potential applications include: a. Reactions of extremely pure proteins with affinity and other reagents can be carried out, including enzyme/substrate and receptor/ligand reactions; b. Binding experiments: ligand/receptor identification, small molecule drug/target pair identification; c. Resolution of multiple modified forms of a protein; d. Effective analysis of biopsy materials; and e. Determination of effects of post-translational modifications on protein function.

Specific areas of application and comments on related methods:

Alternative methods of making protein chips require large amounts of highly purified proteins and are very focused on specific applications. Conventional purification techniques are not efficient. Chips with catalytically active proteins (i.e. kinases) use tagged binding, which is time consuming due to individual expression and purification steps.

Current technology makes the identification of the specific interactions of proteins in a cell with a potential drug time consuming, expensive, and difficult. Soft landing could be used to deposit proteins from a cell individually onto a surface, incubate the surface with a drug candidate, and then analyze the spots to determine which proteins interact with the potential drug.

Soft landing can be used to separate a large number of proteins of very similar mass (e.g. separating glycoforms or insulin from oxidized insulin), which is not allowed by conventional forms of chromatography. As a separation method, soft landing is mass spectrometry based and hence "orthogonal" to chromatographic separations.

Soft landing can be used to make a protein chip array of an entire cell's proteome and examine both low and high abundance proteins in one experiment. Conditions could be manipulated (deposition time) to produce spots of low-cellular abundance proteins from cells which have equal quantities to those of their cellularly abundant analogs (normalization).

Currently cases exist where a protein can be purified to only approximately 90% pure; the question exists as to whether the activity of the 90% purified form is due to the protein itself or contaminants. Soft landing could be used to make extremely pure proteins which could then be tested for activity.

Enzymes might be mass selectively separated and immobilized on a surface in arrays, leaving the active sites accessible. This kind of array could be reused for biological assays.

It might be possible to deliver both the analyte and the reagent to a localized region by soft landing, facilitating ultra-small scale reactions. Examples could include studies of kinases and their substrates, RNA pairing, etc.

There is provided a system and method in which sample molecules in a mixture of proteins or other biochemical molecules are ionized, separated in the gas phase as ions of different masses, and deposited or soft landed on a substrate where they are stored for later processing or analysis. More particularly, the molecules of the biological compounds, including proteins and oligonucleotides are ionized by, for example, electrospray ionization, matrix assisted laser desorption ionization or other ionizing method. The ionized molecules of the mixture are separated by a mass analyzer according to mass, mobility or both, and then soft landed at separate positions on a substrate to form an array. The collected biomolecules at each position can then be identified and analyzed by affinity bonding or other biochemical specific processes and by laser based techniques such as surface enhanced Raman spectroscopy (SERS), fluorescence, or matrix assisted laser desorption/ionization (MALDI) analysis. They might already be known compounds (as a result of analysis by mass spectrometry for example) and could then be used as reagents in subsequent biochemical tests.

Preparation of microarrays by ion soft landing faces a number of issues: (i) The ionization method chosen should efficiently ionize the compounds of interest while minimizing suppression effects associated with poor ionization efficiency of particular components. (ii) Biological activity should not be lost in the ionization process, in the mass selection step or in the soft-landing step. (iii) Mass spectrometric performance should separate the components of interest from other components and achieve the resolution and mass range necessary for the compounds of interest. Therefore, the mass spectrometer and operating conditions should be such as to minimize the time ions spend in the gas phase, minimize the possibility of collisional activation that might lead to denaturation and yet still maximize the efficiency of ion transport and collection. The surface used for collection controls the amount and the chemical form of the soft-landed material; it either facilitates or inhibits retention of the biological activity of the landed materials, and it limits the types of post-soft-landing characterization experiments. Some surfaces promote the neutralization of charged species while others allow charge to build up, and this has a direct impact on the type and thickness of the layers of proteins that can be soft landed. An extended discussion of surface effects on soft landing is available elsewhere [35], but generally retention of biological activity makes use of appropriate liquid surfaces.

Analysis of the materials landed on/in the surfaces is consistent with the type of surface used, the material being analyzed, and the type of information sought. Such experiments can be performed using in situ or ex situ methods, and in the latter case may involve on-surface experiments or recovery of the collected material from the surface.

A variety of instruments has been utilized for the soft landing of mass-selected ions. These include magnetic sector, time of flight, a triple quadrupole and FT-ICR instruments [13, 21-23, 25-28]. Others [36] have developed a preparative MS instrument based on non-scanning magnetic separation.

Figure 20:
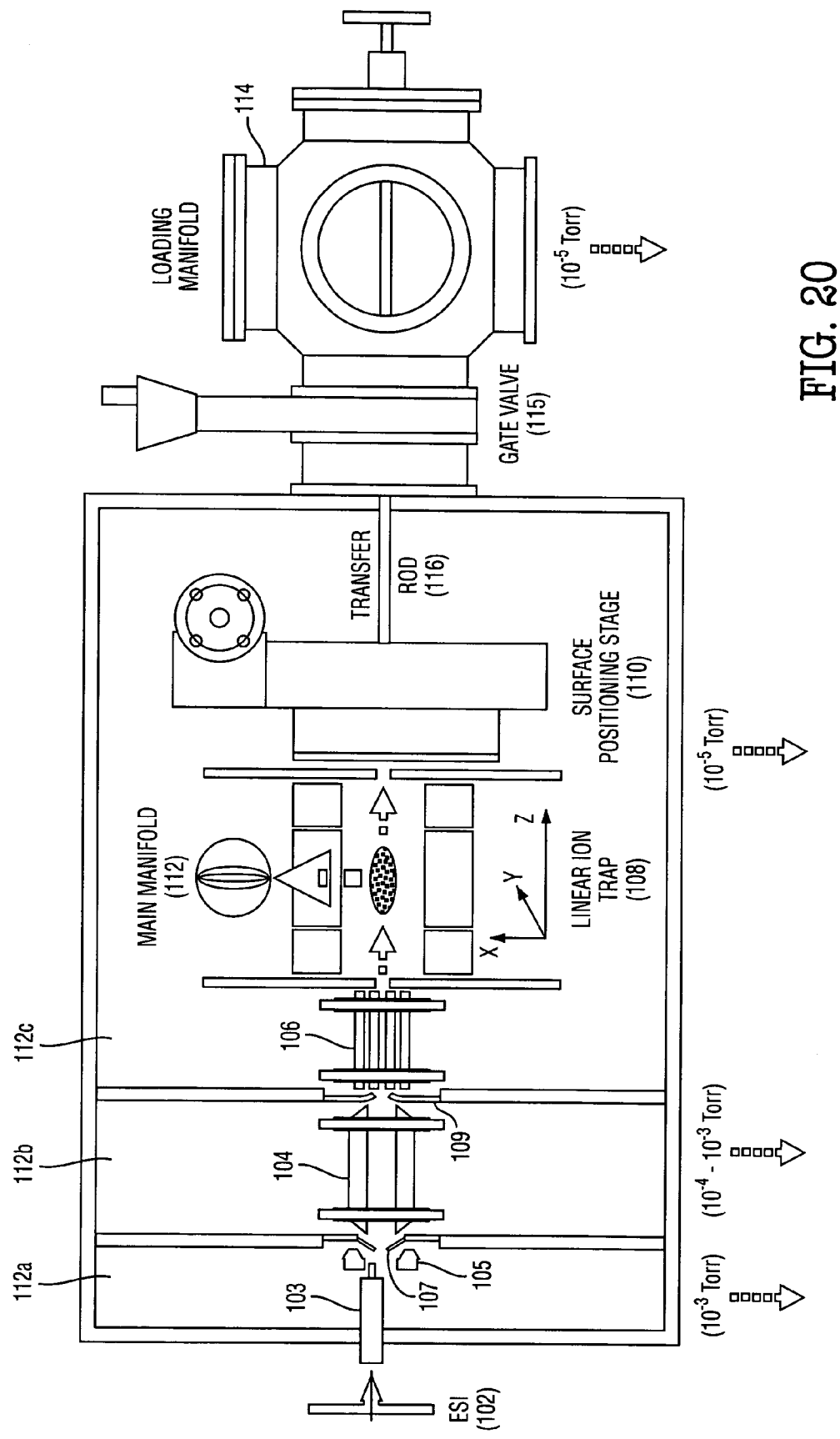
FIG. 20 shows a preparative mass spectrometer system in accordance with an embodiment of the invention.

Referring now to FIG. 20, a preparative mass spectrometer system embodying the principles of the present invention is shown, and is generally designated at 100. The preparative mass spectrometer system 100 may include any of the features of the invention described above. In a particular implementation, the preparative mass spectrometer system 100 includes an atmospheric ionization source 102, and vacuum interface, ion optics, a mass analyzer 108, such as a linear ion trap (LIT), and associated electronics made from the adapted components of a prototype of a commercial LTQ mass spectrometer (Thermo Electron Corp., San Jose, Calif.), as well as a surface positioning system 110, all housed in a single vacuum manifold 112. FIG. 20 depicts ions being ejected radially from the trap 108 along the x-axis for detection purposes and that the surface is aligned along the z-axis such that the y-axis comes out of the plane of the figure. In FIG. 20, the ionization source 102 is an elecrospray ionization (ESI) source, and the preparative mass spectrometer system 100 further includes a heated capillary atmospheric interface 103, tube lens 105, a skimmer 107, a square quadrupole ion guide 104, an inter-multipole gate lens 109, and an octopole ion guide 106.

Figure 21:
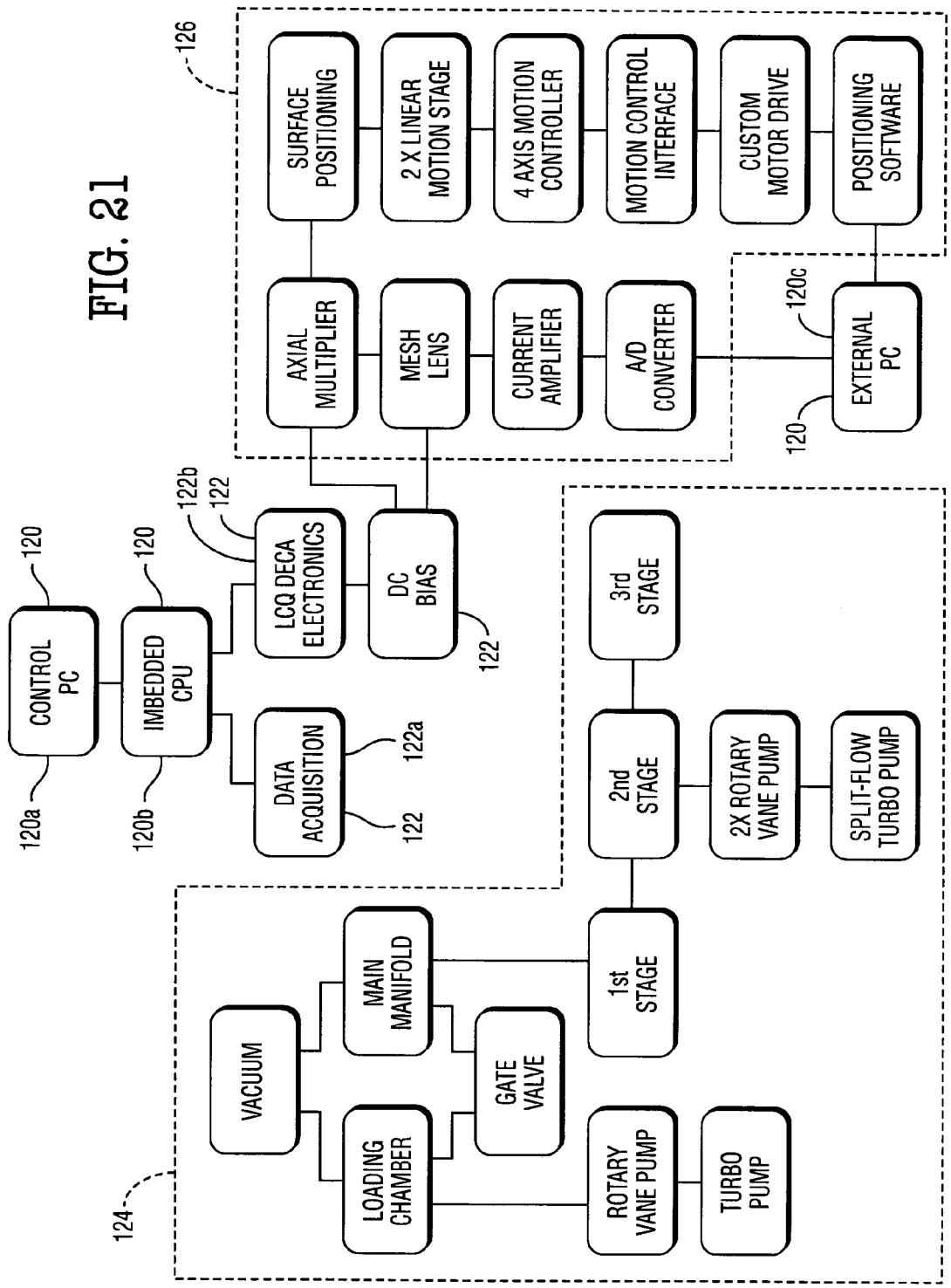
FIG. 21 shows a block diagram of system electronics and components for the instrument shown in FIG. 20.

A diagram of the system electronics and components 119 for the preparative mass spectrometer system 100 is shown in FIG. 21. The system electronics 119 includes instrument control components 120, electronic boards/supplies 122, vacuum components 124, and surface xy positioning components 126.

Soft-landing experiments for separation and collection of biological molecules employ a vacuum system and operating conditions that are compatible with the use of liquid surfaces [35] for soft landing while still maintaining a pressure regime that allows optimum performance of the ion optics and mass analyzer.

The main instrument manifold 112 has three regions of differential pumping 112a, 112b, 112c and utilizes a split flow 265 L/s turbomolecular pump (Pfeiffer Vacuum Technology, Asslar, Germany) backed by two 30 m$^3$/h rotary vane pumps (BOC Edwards, Crawley, West Sussex, UK). The two rotary vane pumps are connected to both the turbo pump and the atmospheric interface 103 in order to share the total pumping load. A loading chamber 114 is connected to the main instrument manifold via a gate valve 115 for the purpose of inserting surfaces into the instrument without venting the entire system. This loading chamber 114 is evacuated using a 400 L/s turbomolecular pump and 16.5 m$^3$/h rotary vane pump (Leybold Vakuum GmbH, Cologne, Germany). By using a separate vacuum system for the loading chamber 114, the array preparation time is reduced. This also helps to maintain constant experimental conditions in the mass analysis portion of the instrument.

Various atmospheric ionization methods including ESI, atmospheric pressure chemical ionization (APCI), and electrosonic spray ionization (ESSI) [40] are implemented. Matrix assisted laser desorption/ionization (MALDI) may also be used. The atmospheric interface 103 is based on a heated capillary design which aids in the desolvation of the electrosprayed ions and brings these ions into the first stage of differential pumping. In a particular implementation, the atmospheric interface and optics are adapted from a Finnigan LCQ (Thermo Electron Corp., San Jose, Calif.). In the first differential pumping region 112a ($10^{-3}$ Torr) ions leave the heated capillary 103 (l=114 mm; $\Phi$=0.5 mm, where $\Phi$ is the diameter of the orifice) and pass through the tube lens 105 (length, l=9 mm; $\Phi$=7.6 mm) followed by the skimmer 107 ($\Phi$=1.0 mm; skimmer alignment with the end of the heated capillary can be adjusted) into the square quadrupole ion guide 104 in the second differential pumping region 112b ($10^{-4}$-$10^{-3}$ Torr). This square quadrupole 104 (l=104 mm; $r_0$=2.86 mm) is followed by the inter-multipole lens 109 ($\Phi$=2.58 mm) in the wall between the second 112a and third 112c differential pumping regions which in turn is followed by the octopole ion guide 106 (l=51 mm; $r_0$=2.86 mm). Multiple differential pumping regions coupled with ion guides allow efficient transport of gaseous ions and removal of charged droplets.

For preparative-scale protein ion soft landing the preparative mass spectrometer system 100 efficiently handles the ionization of large amounts of material with high efficiency while minimizing suppression effects common in some forms of ionization. Further, processes using the preparative mass spectrometer 100 system are soft enough that biological activity is not lost and is able to handle solvent systems that allow the use of solution phases that preserve native conformations including buffered aqueous solutions at neutral pH.

In certain implementations, electrospray ionization (ESI) is selected for its compatibility with standard sample formats (e.g. aqueous protein solutions) and the ability to match the m/z range accessible using the LIT mass analyzer 100. Also, ESI based methods offer the highest probability of preserving biological activity of the ionized proteins.

In particular embodiments, electrospray ionization was implemented in the form of ESSI [40] and nanospray [42], two ESI variants which are known to be compatible with physiological solutions (aqueous medium, neutral pH ) but which also give high ionization efficiencies. The separation power of preparative mass spectrometry is determined by the peak widths and number of different types of ions generated from each analyte (i.e. different charge states, adducts, etc.). ESSI is often able to give substantially one charge state and fully desolvated ions (no solvent adducts). Furthermore, protein ions produced by ESSI from physiological solutions retain their original folded structure in the gas phase which is particularly advantageous for preparative separation of enzymes [40]. Nanospray is also leaves protein structures intact; however it usually gives weaker desolvation efficiency and a few (but more than one) charge states. It also gives one or two orders of magnitude lower ion currents than does ESSI. On the other hand, nanospray provides higher ionization efficiency, or, in other words, it produces more ions which are captured by the instrument than ESSI. This feature is a result of the differences between the diameters of the spray capillaries. While in the case of nanospray, practically the whole spray can be sampled by the 0.5 mm internal diameter sampling orifice, in the case of ESSI, only a small fraction of the ions or nanodroplets are sampled.

For most applications where a higher amount of proteins (or lower overall efficiency) is not an issue of concern, ESSI ionization is used, since it gives higher soft-landing ion currents. In other cases, where either the availability of the protein is limited or demonstration of higher overall efficiencies is attempted, nanospray is the more desirable choice.

Referring again to FIG. 21, the general electronics, vacuum, control, and surface positioning systems 120, 122, 124, 126 are included in the preparative mass spectrometer system 100. In particular, the preparative mass spectrometer system 100 is controlled by a PC 120a (Gateway Model GP7-750; 750 MHz Pentium 3 processor; Microsoft Windows 2000 v. 5.20.2195 SP 2) with a modified version of the Finnigan LCQ Deca user interface and Xcalibur software (v. 1.2 SP1, Thermo Electron Corp., San Jose, Calif.). The control PC 120a sends commands to and receives data from the imbedded CPU 120b (Pentium 133 MHz) in the mass spectrometer. The imbedded CPU 120b manages communications with the control PC 120a and parses commands to the system board and the data acquisition/electrometer 122a through DSP-controlled serial connections. These serial connections have local processors that allow for operations other than communications to be performed. The system board is made up of two Finnigan LCQ Deca control boards 122b (Thermo Electron Corp., San Jose, Calif.) that have been connected to supply the additional DC voltage supplies required to operate the LIT (the second board also supplies the surface bias). This system board supplies the waveforms needed to operate the mass spectrometer. An additional external PC 120c (Dell Precision WorkStation 650; Intel Xeon 2.8 GHz processor; Microsoft Windows XP Professional v. 5.1.2600 SP1) is used to control the surface positioning system 160 and data acquisition from the axial detector.

For micro-array preparation by soft landing, target ions are isolated in the linear ion trap (LIT) mass analyzer 108 and then ejected axially onto an axially positioned surface, which is mounted on the 2D moving stage 110. The choice of the linear ion trap has a number of inherent advantages compared to alternatives: (i) the device ejects ions having low kinetic energy which is desirable for soft landing; (ii) the instrument operates in a pulsed mode with a particular cycle time of which mass isolation and axial ejection do not take more than about 20%, allowing about 80% of the available time to be used for ion accumulation and so optimizing efficiency; (iii) the instrument can be used for the preparation of arrays of soft-landed material with arbitrarily chosen spot positions; (iv) the instrument provides flexibility in experimental design and is easy to use and (v) information on the quantity and range of m/z values of the soft-landed ions is available.

The LIT mass analyzer [43] 108 (prototype device from Thermo Electron Corp., San Jose, Calif.) includes four hyperbolic rods that are each divided into three sections and that comprise the stretched geometry analyzer as used on the commercial LTQ mass spectrometer; the dimensions are $y_0=4$ mm (distance from optical axis to electrode rod along the y-axis of the trap), $x_0=4.375$ mm (distance from optical axis to electrode rod along the x-axis of the trap), $l=61$ mm; rf operating frequency 1.025 MHz. The analyzer 108 has front and back end-cap lenses (front lens $\Phi=3.7$ mm; back lens $\Phi=2.0$ mm). Ions are trapped in the mass analyzer 108 by using an rf field which lies in the x-y plane of the analyzer; note that there is no rf component along the ion optical or z-axis of the LIT mass analyzer 108. Trapping along the z-axis of the analyzer is achieved using a DC potential well established by applying DC biases to the two end-cap lenses and three sections of the trap. To inject ions into the LIT mass analyzer, the front lens, front section, and center section DC biases are typically set to about −6 V, −8 V, and −10 V, respectively, while the back section and back lens are set to about −9 V and +50 V to keep the ion beam from leaving the trap in the wrong direction. The LIT mass analyzer is used similarly to a 3-D Paul trap in the mass instability scan mode, using supplementary dipolar excitation along the x-axis, the ions being ejected radially through a slit (w=0.25 mm; l=30 mm) in one of the center section rods of the trap. The ions are ejected symmetrically with ~50% going in either direction along the x-axis. Half of the total ions are detected since there is only one x-axis rod with a slit in it and only one detector assembly is installed. The detector assembly consists of a conversion dynode typically set to about −15 kV and an electron multiplier set to about −870 V for positive ions. An increase in signal can be gained by installing a second of these detector assemblies on the opposite side of the LIT mass analyzer 108 along the x-axis and a slit in the corresponding x-axis rod.[32] Note that radial ejection is used to record analytical mass spectra; axial ejection is used for ion soft landing.

Figure 22:
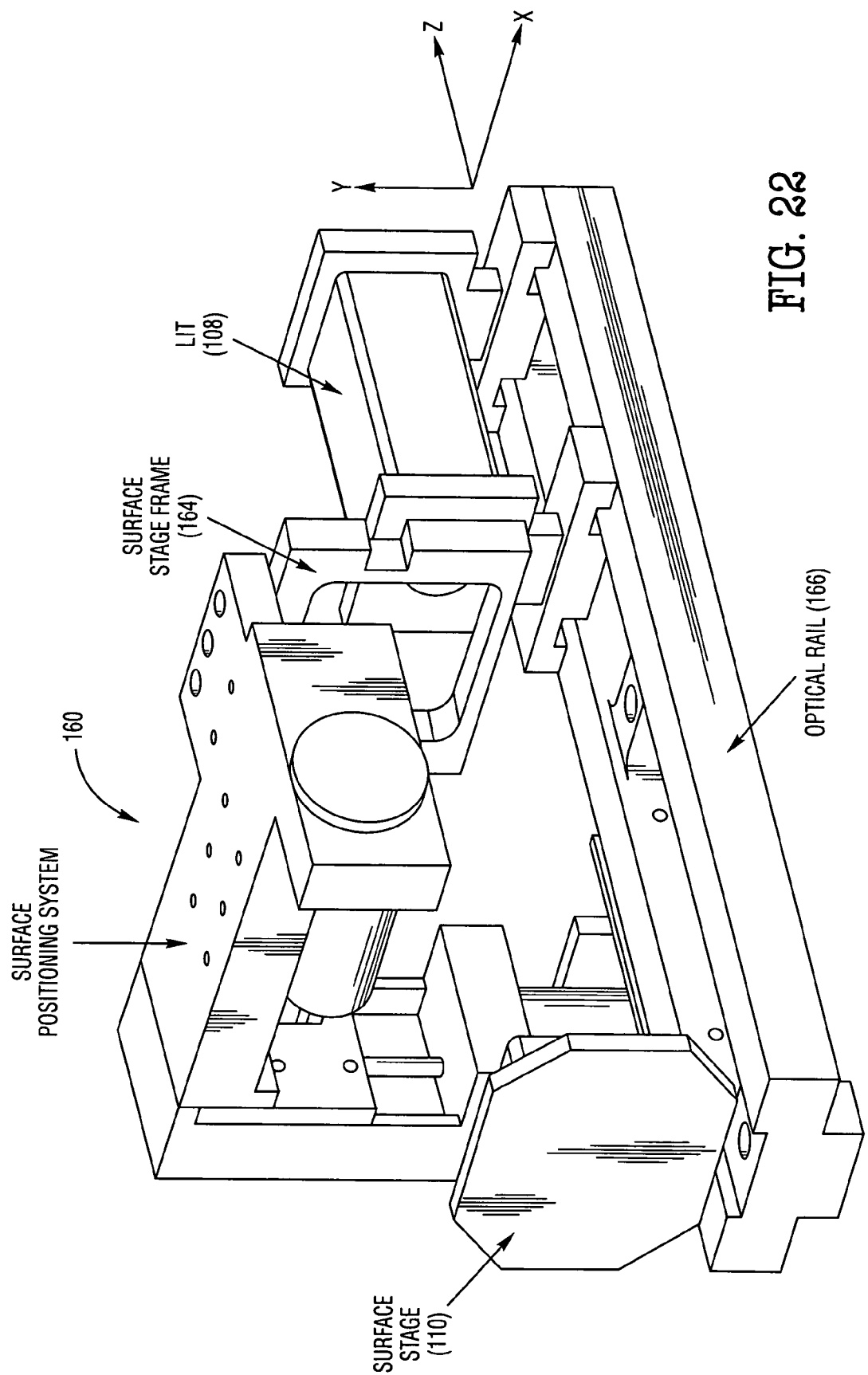
FIG. 22 shows a perspective view of a surface introduction/positioning system for the instrument shown in FIG. 20.

Surfaces are loaded into the main chamber 112 through a vacuum lock 114 or loading manifold. The surface positioning system 160 (FIG. 22) with xy motion is located directly behind the mass analyzer 108 along the z-axis of the trap. This assembly 160 includes the surface stage 110 and a surface-stage frame 164 for transport of a surface from the loading chamber 114 to the positioning system via a transfer rod 116. The surface stage 162 can accommodate surfaces up to about 5.72 cm×5.72 cm (2.25 inch×2.25 inch) in size. The xy-positioning system is constructed from two motorized slides (Princeton Research Instruments, Inc., Princeton, N.J.) mounted an optical rail 166 that operate in vacuum and have 3.3 µm/step (7697 steps/inch) resolution and 5.08 cm×2.54 cm (2 inch×1 inch) xy motion; movement of each slide is controlled independently. Motion control is regulated using a four-axis motion controller (National Instruments, Austin, Tex.), a universal motion control interface (National Instruments, Austin, Tex.), a motor drive, and positioning software. The positioning software is written in Visual Basic, using movement functions supplied with the National Instruments equipment and is based upon making a user-defined number of steps from a home position using Cartesian coordinates. Alignment of the surface with the exit orifice of the LIT is performed by imaging the exit lens hole onto the surface stage 110 by temporarily replacing the atmospheric interface with a fixed-position, white light source. The surface stage 110 is connected to a lens voltage supply on the mass analyzer control electronics to allow a DC bias to be applied to the collection surface. A repelling bias is applied to the surface at all times other than during the axial pulse-out portion of the scan function to ensure that no charged species reach the surface unless they have been mass-selected and axially ejected for soft landing. A similar result can be obtained by using the back lens of the LIT mass analyzer as a repelling gate.

The positioning system 160 allows production of arrays of up to 196 spots that are about 2 mm in diameter and about 4 mm apart (center-to-center) on a single surface (5.72 cm×5.72 cm). The system gives the operator the ability to change ion soft-landing positions while under vacuum and thus the ability to create distinct, chemically different spots from a sample mixture of choice. A miniature channeltron electron multiplier (Detector Technology, Inc., Palmer, Mass.) is incorporated into the surface stage frame 164 using a polycarbonate support to detect axially pulsed out ion packets during the course of an ion collection experiment. The small overall size of this electron multiplier (3 mm diameter×25.8 mm long) allows it to be incorporated permanently into the surface stage frame 164 without diminishing the performance of the surface loading and positioning system. The face of the multiplier (1.6 mm diameter) is much smaller than that of a typical channeltron electron multiplier; this small size improves the spatial resolution with which the ion beam can be characterized. This miniature axial detector can be used before an ion soft-landing experiment to optimize conditions in order to maximize the ion current from the LIT mass analyzer 108. It is advantageous to use an axial detector for this purpose rather than the normal radial detector since the axial multiplier gives a more accurate description of the ion packet that is being soft-landed (the axially ejected ions are not accelerated to keV energies as they are during radial ejection). The electron multiplier signal from the axially pulsed ion packets is amplified using a current amplifier (Keithley Instruments, Inc., Cleveland, Ohio) and recorded using a PCI card analog to digital converter (National Instruments, Austin, Tex.). The axial electron multiplier is typically operated at ~−1700 V for positive ions, and the gain of the current amplifier is typically set to about $10^5$-$10^6$ V/A. In order to shield the multiplier from a capacitive coupling signal as well as to reduce the influence of the electron multiplier bias (−1700 V for positive ions) on ions entering into, trapped within, or leaving the linear ion trap, a fine metallic mesh lens (80 lines/inch; 99.36% transparency) is placed directly in front of the exposed surface of the electron multiplier and connected to the ion collection surface potential.

Surfaces are loaded into the main chamber 112 of the instrument by opening the gate valve 115 that connects the main vacuum manifold 112 to the loading chamber 114 once the pressures in the two vacuum regions are equal. The transfer rod 116 which connects to the surface stage 110 using a quarter-turn fastener is then used to load the surface stage 110 into position behind the LIT mass analyzer 108 by insertion into the surface stage frame 164 on the xy-positioning system. The vacuum seal is maintained by using a vacuum-pumped linear motion feed-through. Total time to attach the surface stage to the transfer rod, evacuate the loading chamber, and load the surface/surface stage into the positioning system is less than about five minutes.

Various surfaces were used as substrates for soft-landing including bare metal surfaces, self-assembled monolayers, and glycerol-based liquids. Fluorinated SAM's provide well-defined surface chemistry [21], even under moderately high pressure conditions, however the complete neutralization of charges is hindered on some of these surface resulting in charge build-up [35] which may be undesirable. These SAM surfaces were also shown to cause disadvantageous conformational changes and loss of biological activity in the protein ions on or after ion soft landing. Other SAM's were also characterized, and both OH— and COOH-terminated SAM's showed better characteristics than F-SAM's. Although a wide variety of surface chemistry is available through SAM's, these surfaces do not provide conditions that mimic the physiological environment for the landed proteins. Furthermore, as landed material accumulates it continuously alters the surface characteristics, thus the original surface gradually changes into a solid protein surface. Glycerol-based liquid surfaces offer a good solution for these problems [35]. Although glycerol is not a physiological environment, it still stabilizes the structure of most of proteins. The vapor pressure of glycerol is too high for high vacuum applications; however it can be decreased by the addition of other polyols or sugars, e.g. fructose without changing its main characteristics. Various glycerol/fructose based mixtures were successfully used as matrices for soft landing, and biological activity was almost fully (>90%) retained in all of experiments where conditions were optimized for highest residual activity [35].

Once the soft-landing technique has been used to collect mass selected ions at a particular position on a surface, there are many surface analysis options for characterization of each spot. Direct surface analysis by one of the desorption ionization (DI) [44,45] techniques is an elegant and straightforward method; however, its application is not always feasible. One advantage of this approach is the possible elimination of further modification of the surface after soft landing. If the chosen method is MALDI, the only required surface modification after landing consists simply of addition of the MALDI matrix (the alternative addition of an insulating matrix layer prior to soft landing does not give a desirable ion collection surface). MALDI can be used effectively with some liquid surfaces which act themselves as matrices or into which matrices can be admixed [35].

Indirect surface analysis methods start with rinsing the surface and continue with the analysis of dissolved soft-landed material. ESI-MS is a convenient method of analysis given its high sensitivity and also its applicability to the samples encountered, including liquid samples containing large amounts of glycerol. A variety of enzymatic methods are available to establish the specific residual activity of enzymes, and they can be used to test each spot in an array. This approach has been tested in a few cases by soft landing a protein and then adding the appropriate substrate to the purified species. After the soft-landed material and substrate are allowed to react, ESI was used to confirm retained activity by identifying the reaction product. This method has been used for the following sets of enzyme/substrate reactions: lysozyme cleaving sugar units from hexa-N-acetyl chitohexaose, trypsin digesting cytochrome c, hexokinase phosphorylating D-fructose, protein kinase A catalytic subunit phosphorylating the oligopeptide LRRASLG [34].

Figure 23:
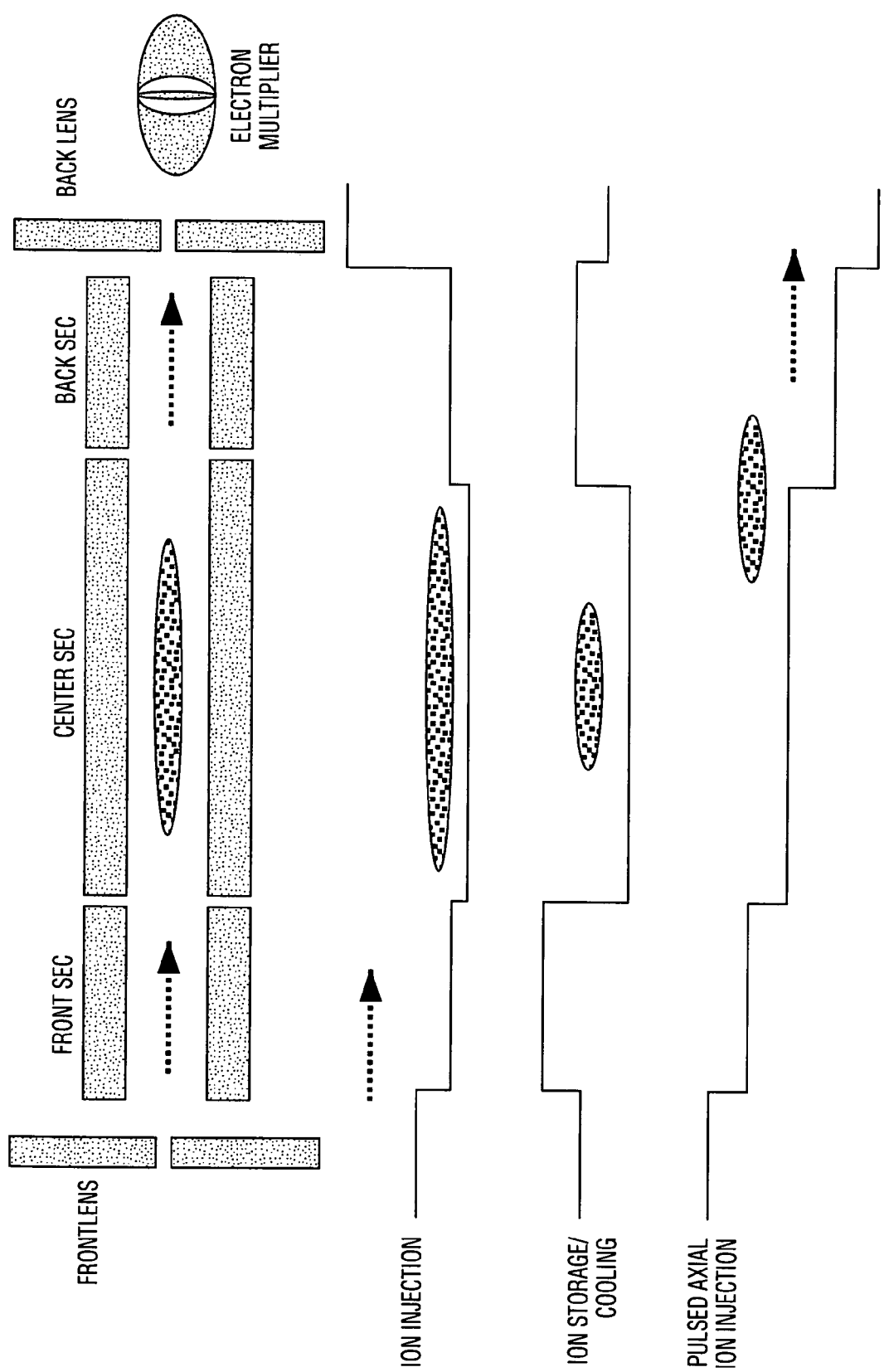
FIG. 23 shows a sequence of DC voltages applied to the lenses and sections of the linear ion trap of FIG. 20 to achieve mass-selective isolation and axial pulse out of trapped ions from the mass analyzer.
Figure 24:
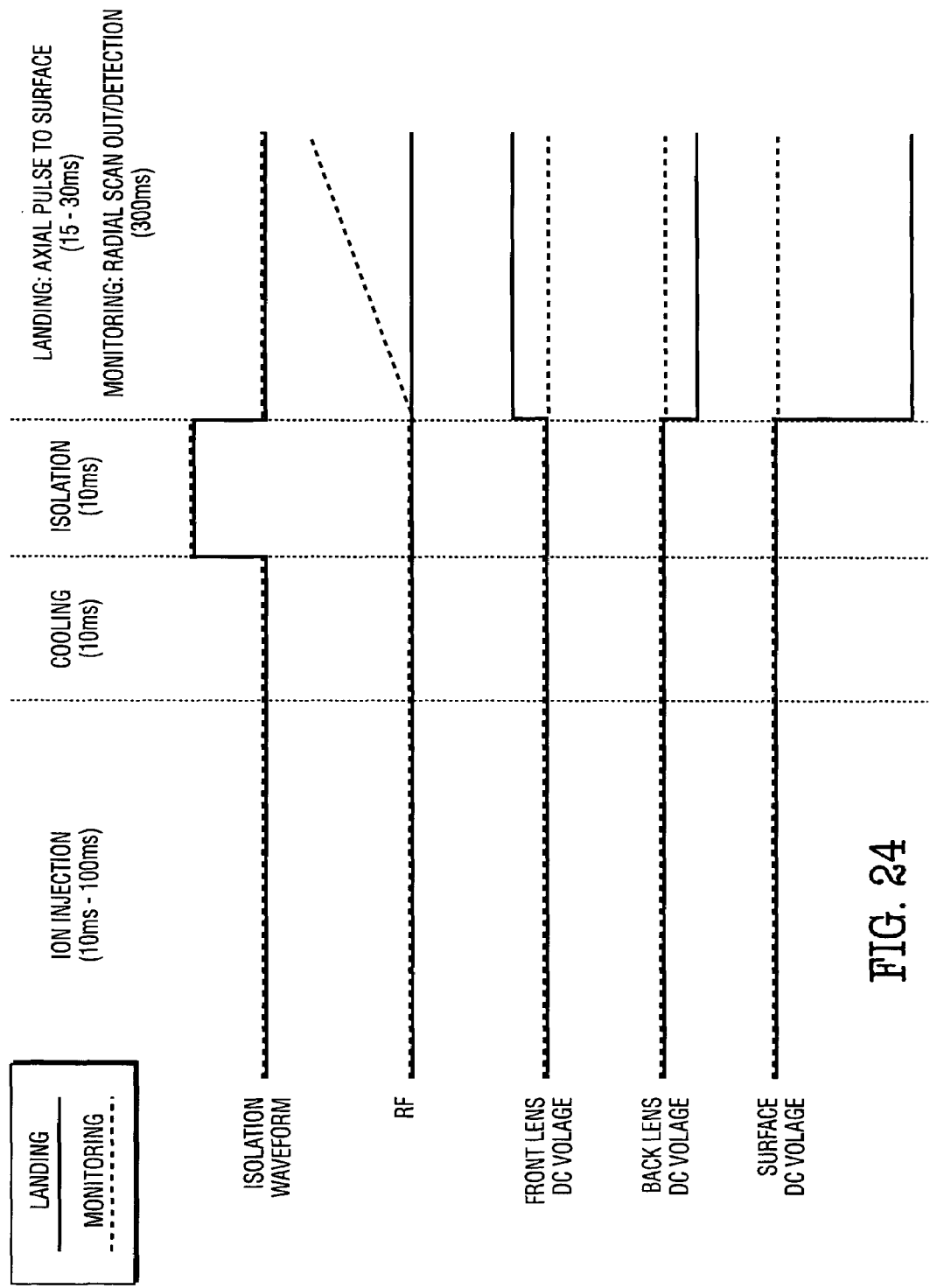
FIG. 24 shows a pulse sequence used in ion soft-landing.
Figure 25B:
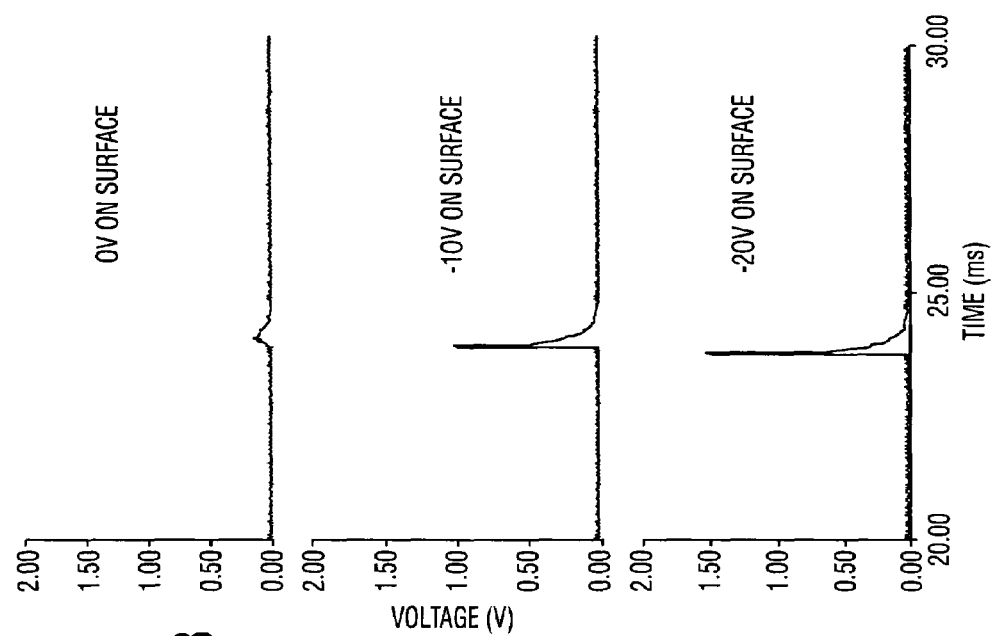
FIG. 25 shows axially pulsed out ions of the mass selected +5 charge state of insulin (1147.6 Th).
Figure 25A:
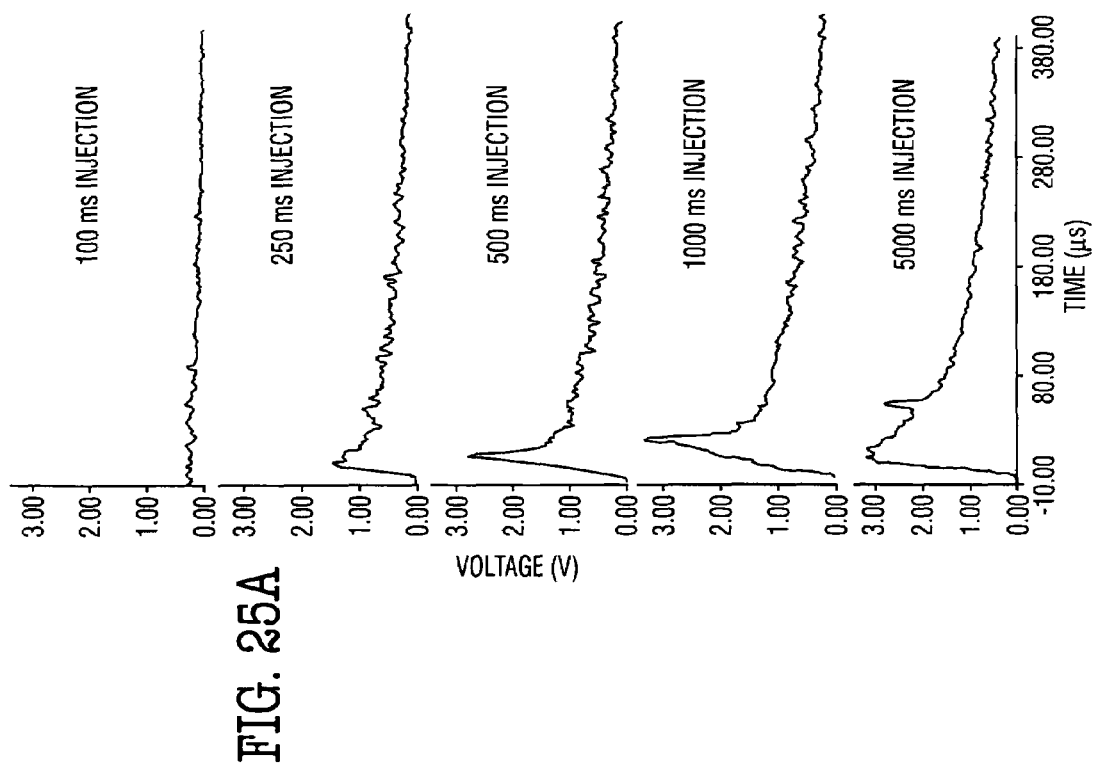

In order to perform soft-landing experiments, a scan function was employed to axially pulse ions out of the LIT mass analyzer by appropriately changing DC voltages on the sections of the trap (FIG. 23). This scan function is based upon waveform isolation of a narrow m/z range, followed by a "tilting" of the DC potential well applied to the LIT so that ions will leave the trap and travel towards the soft-landing surface. The ions leave the trap 108 along the z-axis moving towards a negatively biased surface in the case of positively-charged ions. FIG. 24 shows a timing diagram comparing the analytical monitoring MS/MS scan function and the preparative soft-landing scan function. In particular, FIG. 24 shows ion injection, isolation, and DC settings for soft-landing and also the mass scan out with detection on the radial detector (dashed line) used for monitoring the soft-landing experiment conditions. Note that in the soft-landing scan sequence, the axial pulse out towards the surface is followed by a radial scan towards the detector (not shown) in order to confirm that the ions selected for soft landing are leaving the trap during a collection experiment. Experiments using various proteins have shown that increasing the time allowed for injection of ions into the trap correspondingly increases the intensity of the signal observed on the axial electron multiplier. FIGS. 25a and 25b show data for insulin. In particular, FIG. 25a shows that increasing the length of ion injection time into the mass analyzer correspondingly increases the axially detected ion signal (landing energy set to −25 V), and FIG. 25b shows the effect of surface bias voltage on axially detected ion signal (center section of the trap is set at 0 V in all three spectra). These data also demonstrate that the axial ion pulse can be deflected by applying a DC bias to the surface. Note that a capacitive coupling signal is not present in any of the spectra due to the mesh placed in front of the axial electron multiplier which is held at the same potential as the ion collection surface. Along with confirming that isolated ions are being ejected from the trap during the axial pulse out portion of the scan sequence, ion leakage during the ion injection period is also observed. The axial leakage of positively-charged species from the ion trap during ion injection can be typically stopped by applying a bias of 10 V to 20 V to the back lens. The kinetic energy of ions that are pulsed out along the z-axis towards the soft-landing surface is assumed to be given as the difference in the DC potential between the center section of the trap and the surface itself multiplied by the number of charges on the ions.

Table 1 summarizes many of the factors involved in the selection of a particular mass analyzer for the soft-landing experiment. In accordance with an embodiment of the present invention, a linear quadrupole ion trap was chosen for this experiment. A summary of performance and operating conditions of the preparative mass spectrometer system 100 can be found in Table 2.

TABLE 2-continued

Summary of Operating Conditions and Instrument Performance

| | |
|---|---|
| Procedures | |
| Surfaces | Metals, SAMs, low vapor pressure liquids |
| Ion Current | $10^{-10}$ A |
| Ion collision energy | Typically 5 eV to 30 eV/charge (up to 130 eV/charge) |
| Mass/charge range | 2000 Th ($q_{eject}$ = 0.88); 4000 Th ($q_{eject}$ = 0.45) |
| Mass/charge resolution | 2357 at 1060.5 Th (+16 charge state apomyoglobin) |
| Scan speed/full cycle | ~500 ms-2000 ms/cycle |
| Operating pressure | ~1 × $10^{-5}$ Torr in manifold (measured) ~1 × $10^{-3}$ in LIT (estimated) |

Mass analysis was performed with the LIT mass analyzer 108 using resonance ejection; therefore, lowering the excitation frequency (ω) corresponds to a lower $q_{eject}$ value and allows ions of higher m/z to be scanned out of the trap. This same effect can be achieved by raising the amplitude of the rf voltage, however, the maximum rf voltage that can be supplied by the instrument before breakdown occurs is limited by the rf supply components (~7000 V for this instrument). The mass/charge range for the LIT mass analyzer 108 is 2000 Th using the ejection Mathieu parameter $q_{eject}$ value of 0.88 and 4000 Th using $q_{eject}$ 0.45. The $q_{eject}$ value is chosen for particular experiments bearing in mind the desired mass range and resolution and the disadvantageous effects of low $q_{eject}$ operation (e.g. shallower potential well depth, poorer resolution). Using the 2000 Th range, a resolution of 2357 (m/δ m where δm=FWHM) is demonstrated at 1060.5 Th using apomyoglobin (+16 charge state),

TABLE 1

Comparison of Mass Analyzers used in Ion Soft-Landing

| Mass analyzer | Max/z | Operating pressure | MS$^n$ | m/z resolution | Ion Kinetic Energy | Arraying method |
|---|---|---|---|---|---|---|
| Quadrupole mass filter[a] | 4,000 Th | $10^{-4}$-$10^{-6}$ Torr | no; need analyzers in series | $10^3$ | eV | moving stage or electrical deflection[b] |
| 3-D ion trap | 6,000 Th | $10^{-3}$ Torr | yes | $10^4$ | eV | moving stage |
| Linear ion trap[c] | 4,000 Th | $10^{-3}$ Torr | yes | $10^4$ | eV | moving stage |
| Time-of-flight | >100,000 Th | $10^{-7}$ Torr | no; need analyzers in series | $10^4$ | keV | electrical deflection |
| Magnetic sector[d] | 50,000 Th | $10^{-7}$ Torr | no; need analyzers in series | $10^5$ | keV | simultaneous deposition[e] |
| Ion cyclotron resonance[f,g] | 30,000 Th | $10^{-9}$ Torr | yes | very high | eV | not done |

[a]See ref. [21, 25, 27, 28]
[b]See ref. [48]
[c]See ref. [34]
[d]See ref. [22-24, 36]
[e]See ref. [36]
[f]See ref. [26]
[g]Used as product ion analyzer only, precursor is mass selected using a quadrupole mass filter [20].

TABLE 2

Summary of Operating Conditions and Instrument Performance

Figure 26A:
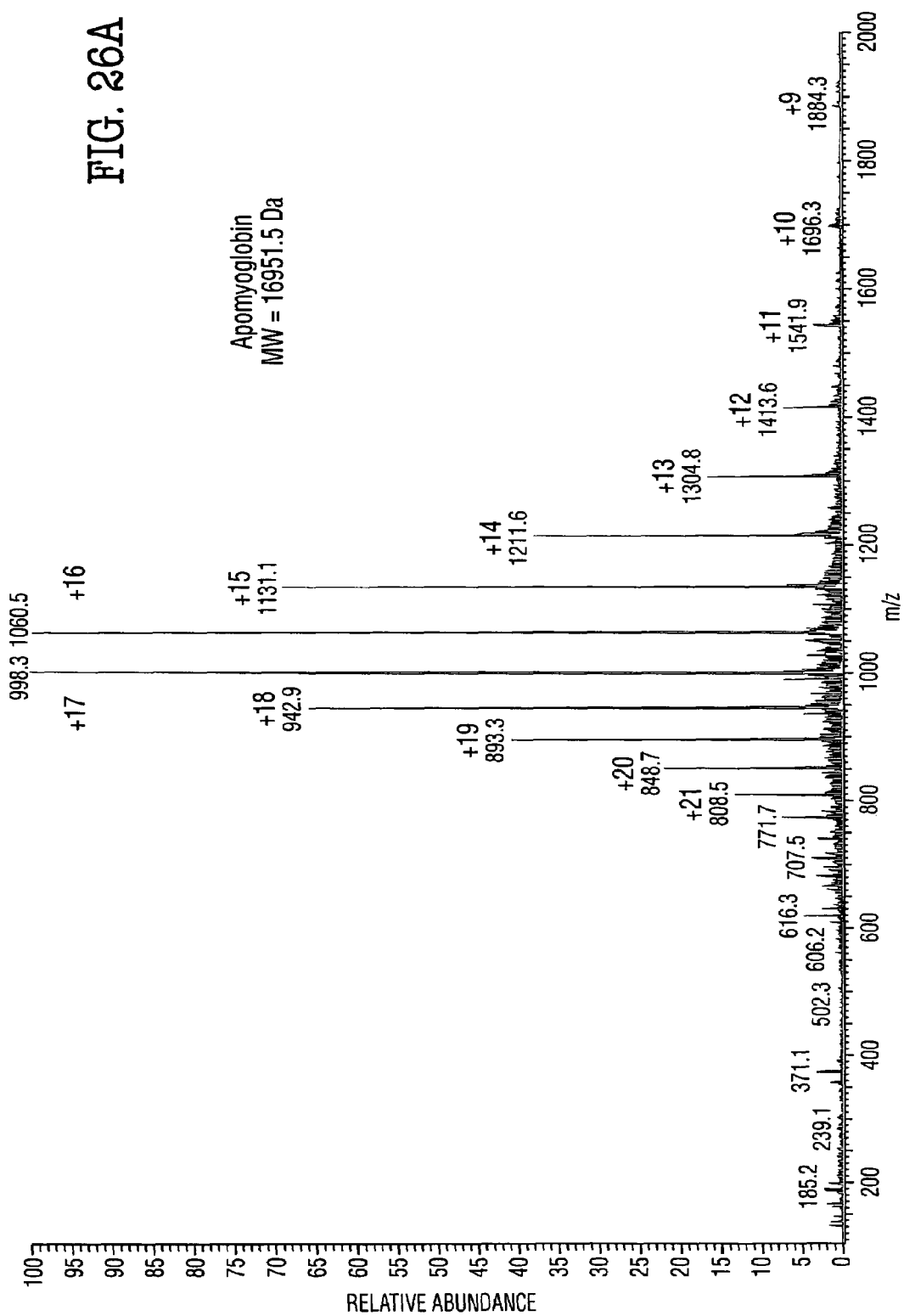
FIG. 26 shows resolution at 1060.5 Th from the electrosonic spray ionization (ESSI) mass spectrum of apomyoglobin.
Figure 26B:
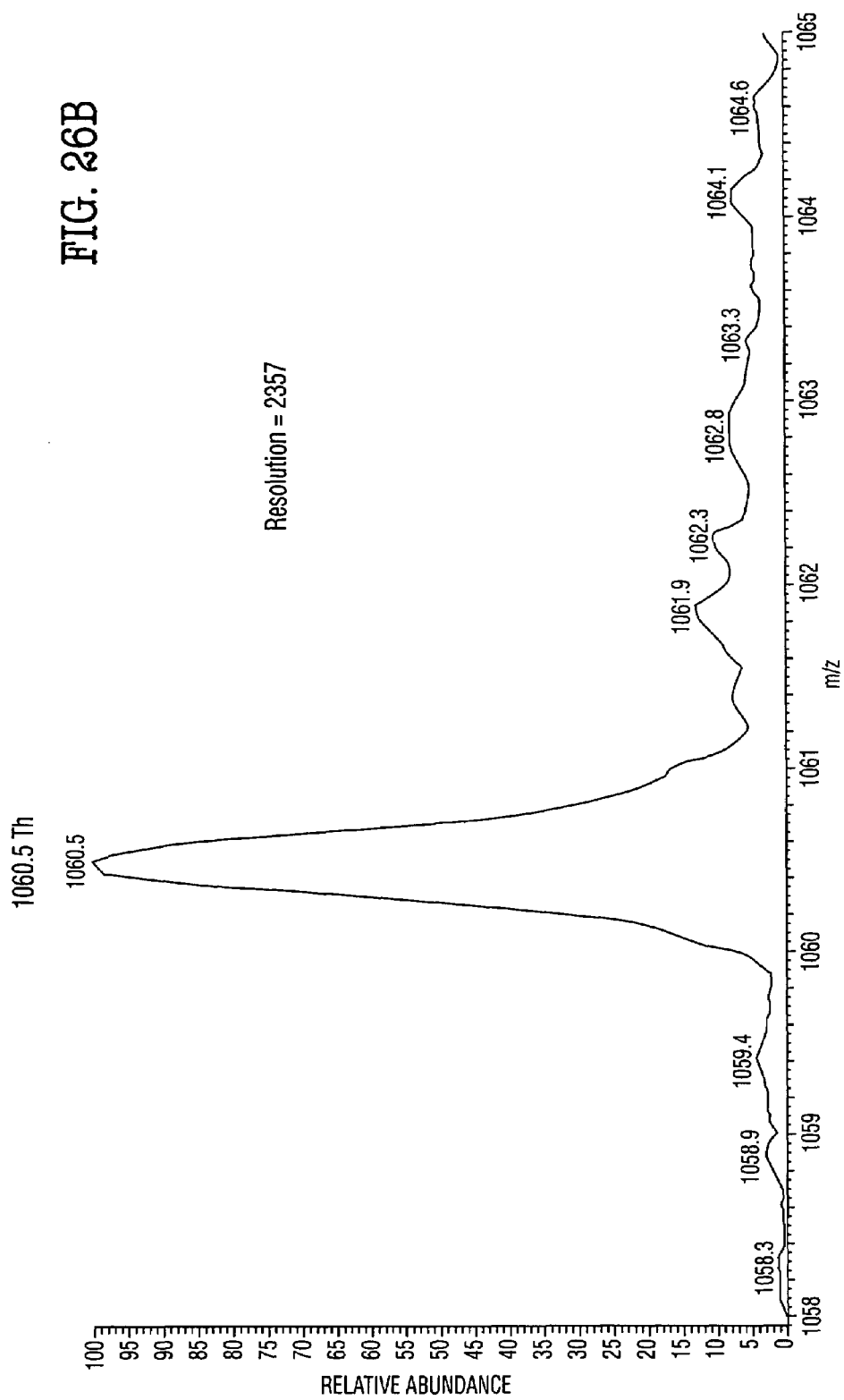

| | |
|---|---|
| Ionization Methods | ESI, nESI, SSI, ESSI |
| Mass Analysis | full scans, SIM, MS$^n$ | as shown in FIG. 26, for an ion intensity=4.20×$10^6$; 1 scan; solvent 1:1 acetonitrile:water (v/v) 0.1% acetic acid.

Figure 27A:
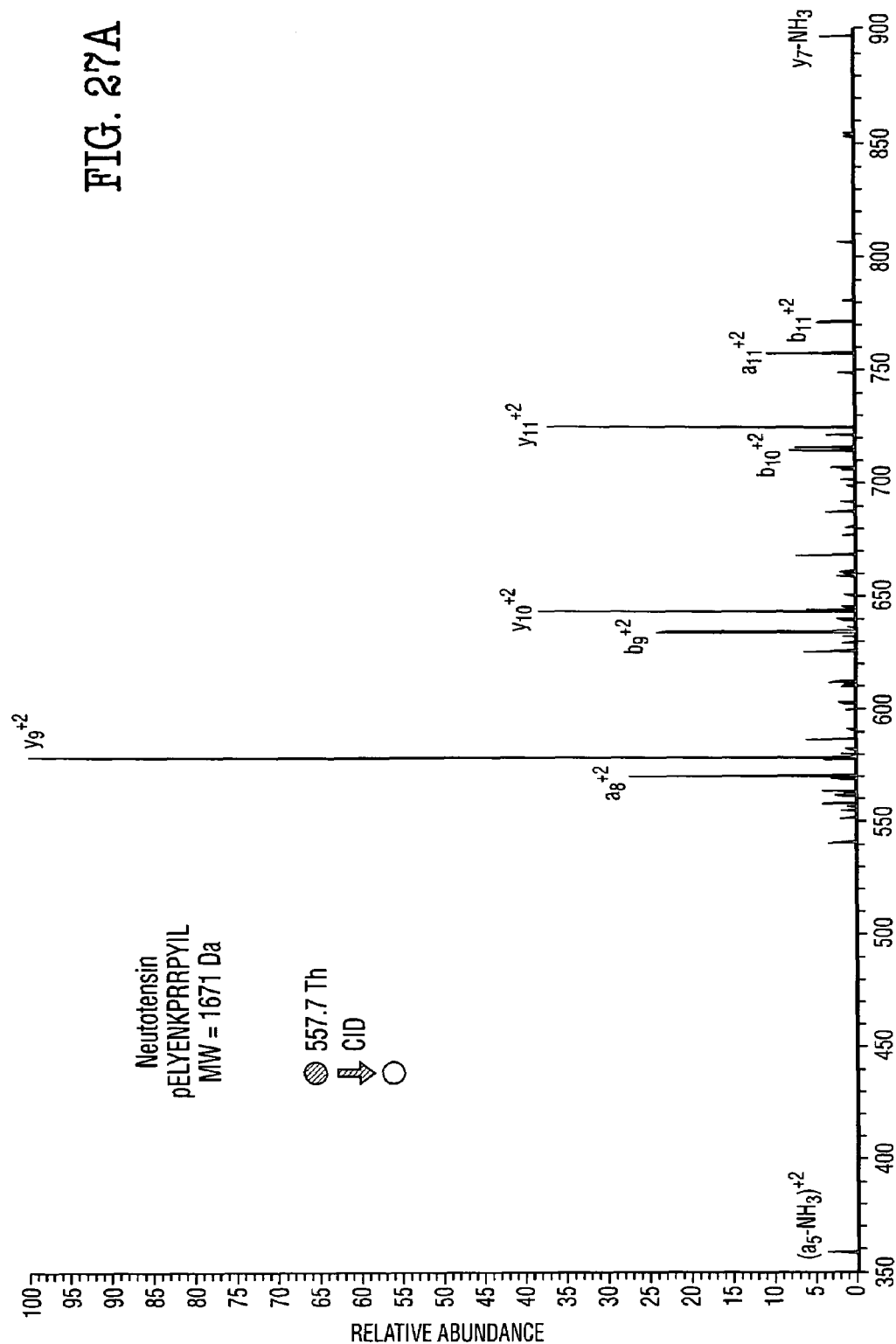
FIG. 27 shows isolation of 557.7 Th (+3 charge state) from an ESI spectrum of neurotensin.
Figure 27B:
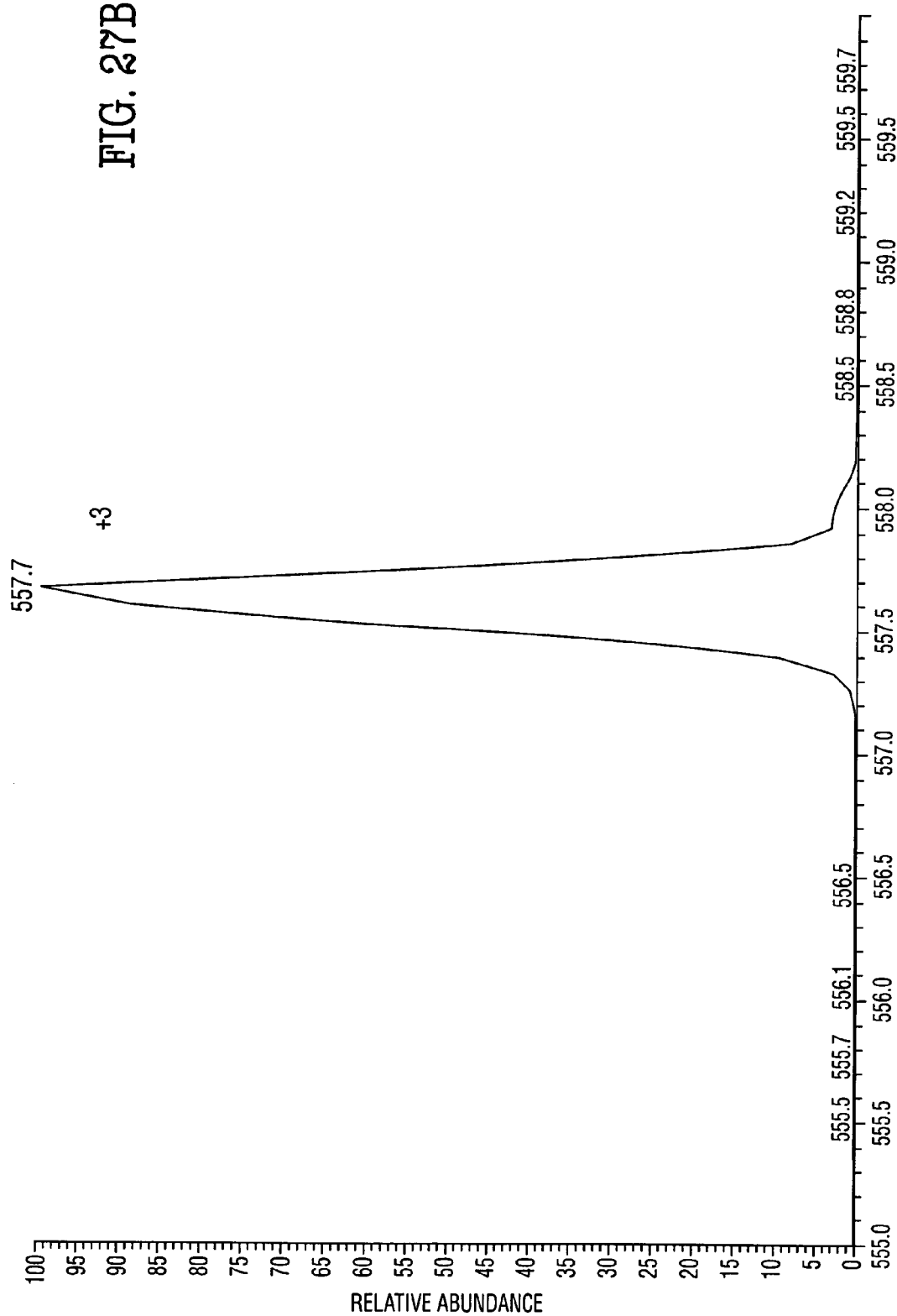

The mass analyzer 108 can perform typical analytical functions including selected ion monitoring (SIM) experiments using a single-notched waveform and MS$^n$ experiments. FIG. 27 demonstrates the ability to perform an MS/MS experiment by selectively isolating triply-protonated neurotensin (557.7 Th, 10 Th isolation window, $q_{activation}$=0.25, activation energy=50%, activation time=500 ms. In particular, for 0.01 mg/mL solution in 1:1 methanol: water (v/v) 1% acetic acid; ion intensity=4.09×10$^6$; average of 7 scans and the product ion MS/MS spectrum of the selected ion (557.7 Th); CID conditions: $q_{activation}$=0.25, activation energy=50%, activation time=500 ms, isolation width=10 Th; ion intensity=2.27×10$^6$; average of 5 scans. Collision-induced dissociation (CID) of the selected ion produces a fragmentation spectrum which contains multiply-charged fragment ions that match predicted fragments for the selected peptide (mainly b and y ions using the standard labeling procedure for peptide fragmentation [46]). Such CID fragments could then themselves be isolated and soft-landed if ion currents are high enough. Recently Syka and coworkers [37] have further demonstrated the versatility of a linear ion trap for peptide/protein sequence analysis by means of gas-phase ion/ion chemistry combined with tandem mass spectrometry.

The spot size produced by ion soft-landed material was measured as 2 mm and is determined by the orifice in the back lens (2 mm). Based on deposits of material on the inside of the back lens of the trap 108 the ion beam appears to be up to twice this size. In order to allow more ions to leave the trap through the back lens during the axial pulse out event, the amplitude of the rf trapping voltage was increased during the soft-landing experiments to more effectively squeeze the ion cloud towards the center axis of the trap. This has been accomplished by raising the low mass/charge cutoff during ion injection (e.g. from 98 Th to 165 Th for an ion at 1430 Th). A gain in axially ejected signal of up to an order of magnitude was observed. The size of the landed spots in principal can be further reduced by introducing additional focusing optics between the back lens of the ion trap and the surface. Note that the array density that can be created is limited by the size of the ion beam and not by the step size of the stepper motor driven actuators that make up the xy-moving system (3.3 μm /step).

Figure 28:
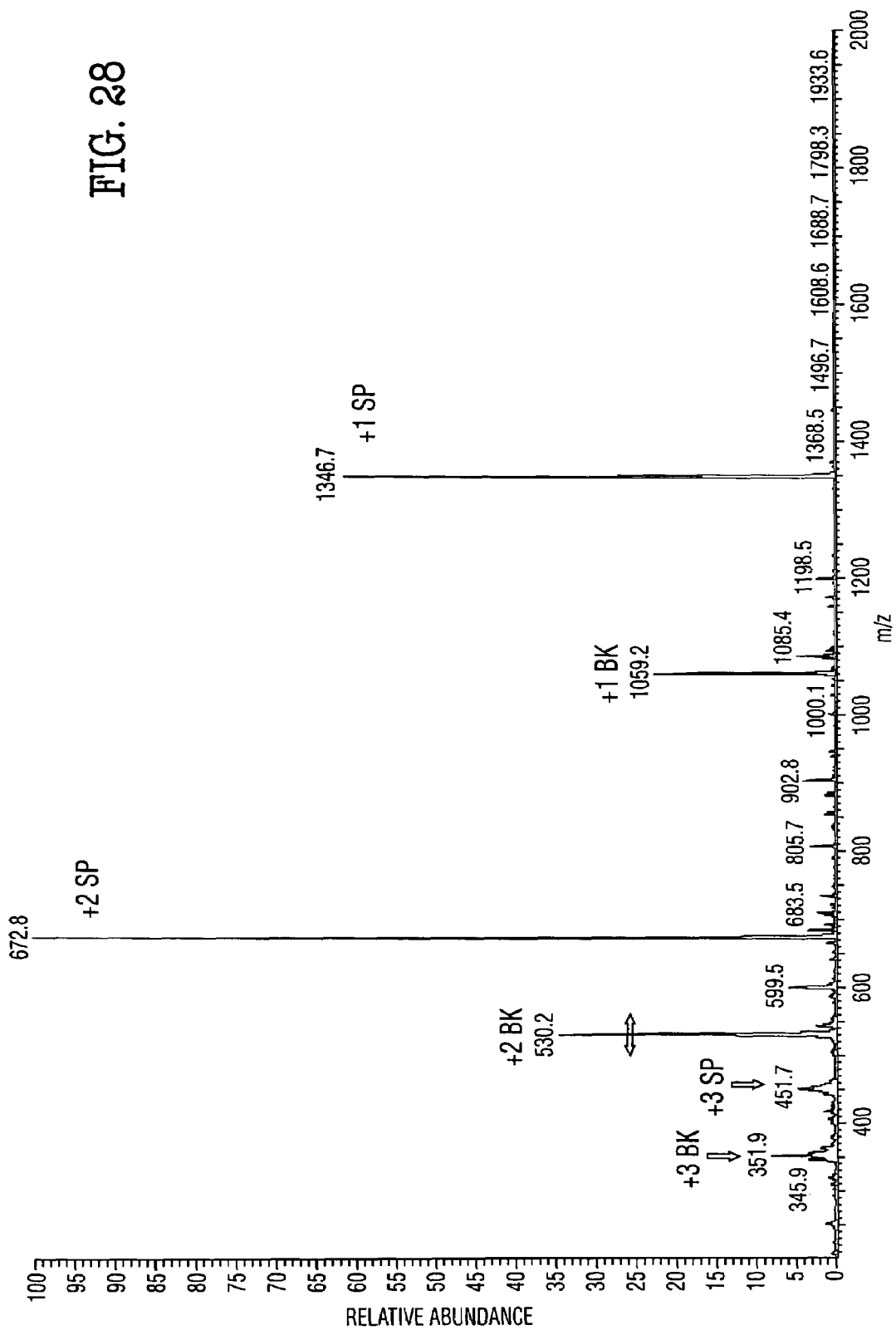
FIG. 28 shows a peptide mixture spectrum of bradykinin (BK) and substance P (SP) used for a soft-landing characterization experiment.
Figure 29:
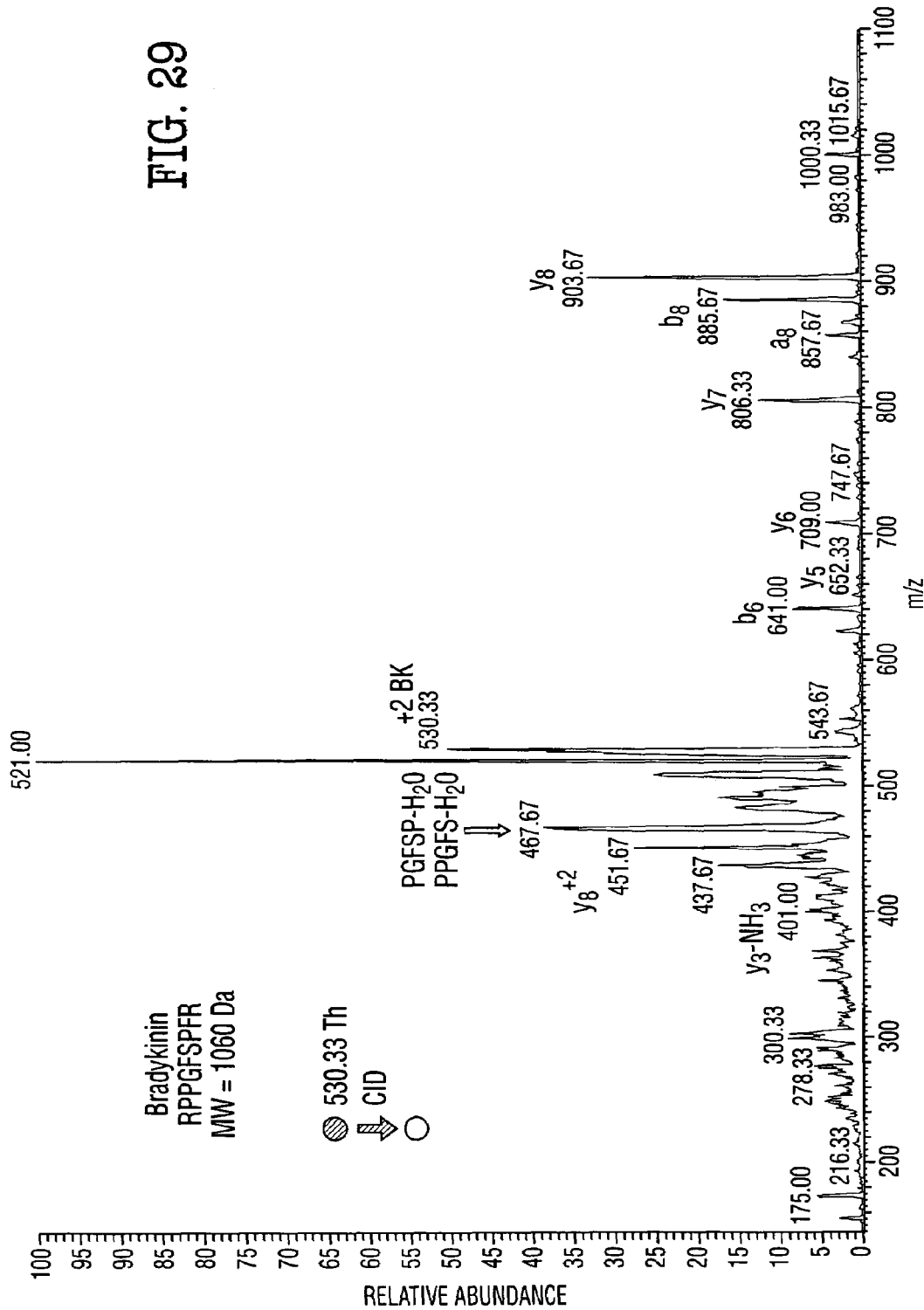
FIG. 29 shows an analysis of bradykinin collected using ion soft landing.

As an example of the functionality of the soft-landing instrument, the mass spectrum of a typical mixture of bradykinin and substance P used for soft-landing experiments is shown FIG. 28, as well as the confirmatory product ion MS/MS spectrum of soft-landed bradykinin after recovery (FIG. 29). Conditions for the experiment were 0.05 mg/mL each bradykinin and substance P in 1:1 methanol: water (v/v) 2% acetic acid; ion intensity=1.24×10$^7$; average of 6 scans. The ion selected (+2 charge state of bradykinin, 530 Th) is indicated with the double-headed arrow showing the 10 Th window which was mass-selectively isolated and collected on a surface.

FIG. 29 shows the MS/MS spectrum for the +2 charge state of bradykinin, as well as its characteristic peptide fragment ions. The analysis of the landed sample was performed using a Finnigan LTQ (Thermo Electron Corp., San Jose, Calif.) using flow injection analysis-ESI. Sample was collected from the surface in 50 μL of 1:1 methanol: water (v/v) 2% acetic acid following the soft-landing experiment. CID was performed to confirm identity of peak at 530.33 Th as the +2 charge state of bradykinin using 15% collision energy. Several of the characteristic fragments for bradykinin are noted in the spectrum (ion intensity=7.12× 10$^1$; 1 scan).

An example of the ability to create arrays of chemically different spots from a mixture of proteins is illustrated in FIG. 30. The data are summarized in Table 3 which also includes ions used in other ion soft-landing experiments.

TABLE 3

Compounds used for Ion Soft-Landing Experiments

| Molecule | Expected MW (Da) | Observed MW (Da) | Ion used for soft landing (Th) | Charge state |
|---|---|---|---|---|
| apomyoglobin | 16951 | 16951 | N/A | N/A |
| cytochrome c | 12327[a] | 12229[a] | 1748 | +7 |
| insulin | 5733 | 5733 | 1434 | +4 |
| lysozyme | 14305 | 14305 | 1789 | +8 |
| trypsin | 23300 | 23300 | 2589 | +9 |
| trypsin inhibitor | 6513 | 6513 | 1627 | +4 |
| bradykinin | 1060 | 1060 | 530 | +2 |
| neurotensin | 1672 | 1672 | N/A | N/A |
| substance P | 1347 | 1347 | N/A | N/A |

[a]The discrepancy between the manufacturer reported MW for cytochrome c and that measured in our lab using ESI-MS is most likely due to some modification of the protein that occurs during preparation by the manufacturer. The mass that is reported by the manufacturer corresponds to the mass calculated from the protein sequence and not to a directly measured mass.

Figure 30A:
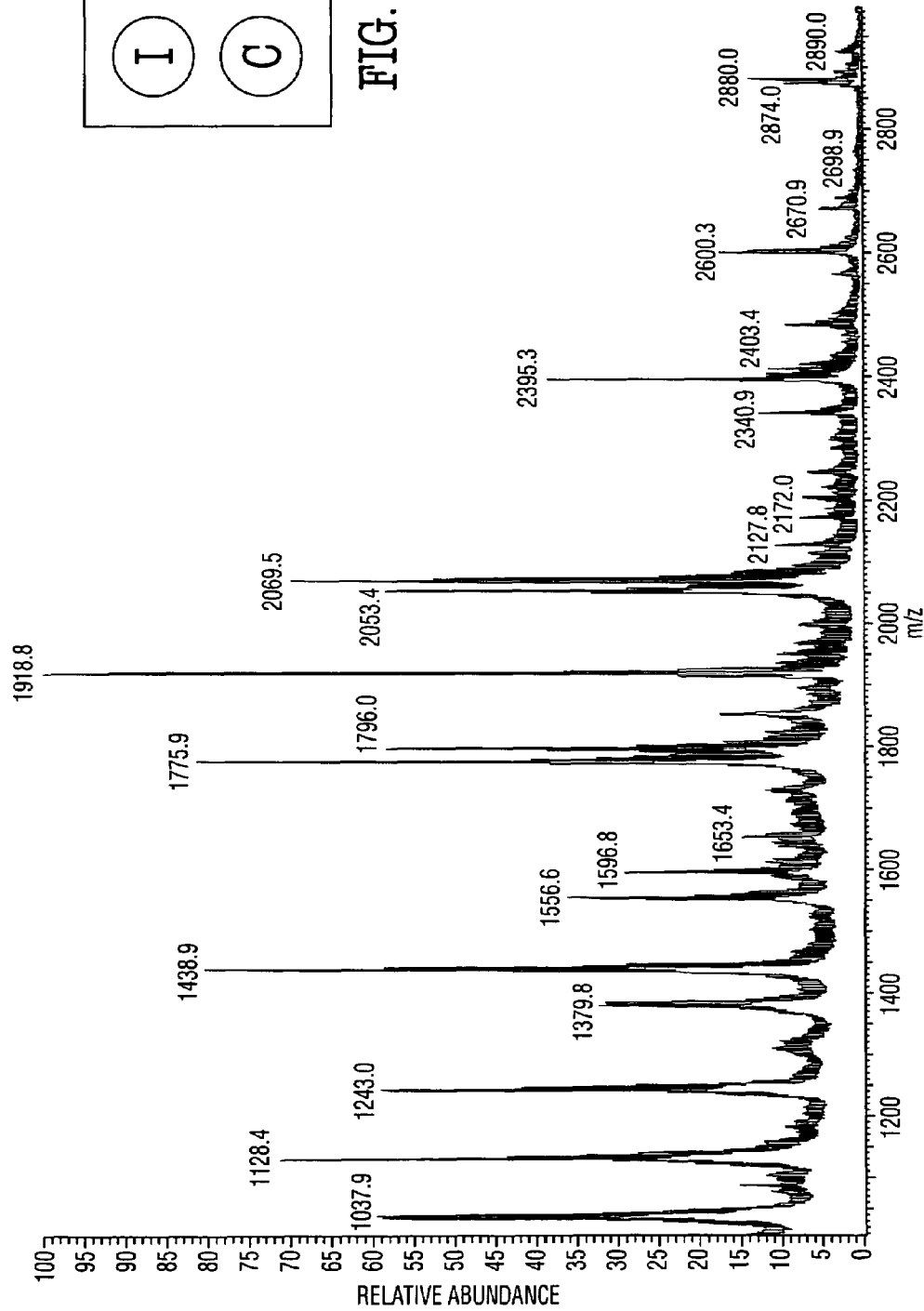
FIG. 30 shows an array of chemically different spots prepared on an OH-SAM surface using mass-selective isolation and ion soft landing from a protein mixture.
Figure 30B:
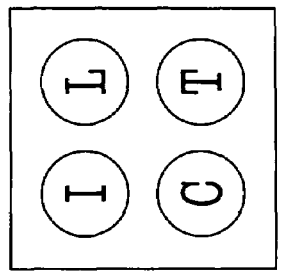
Figure 30D:
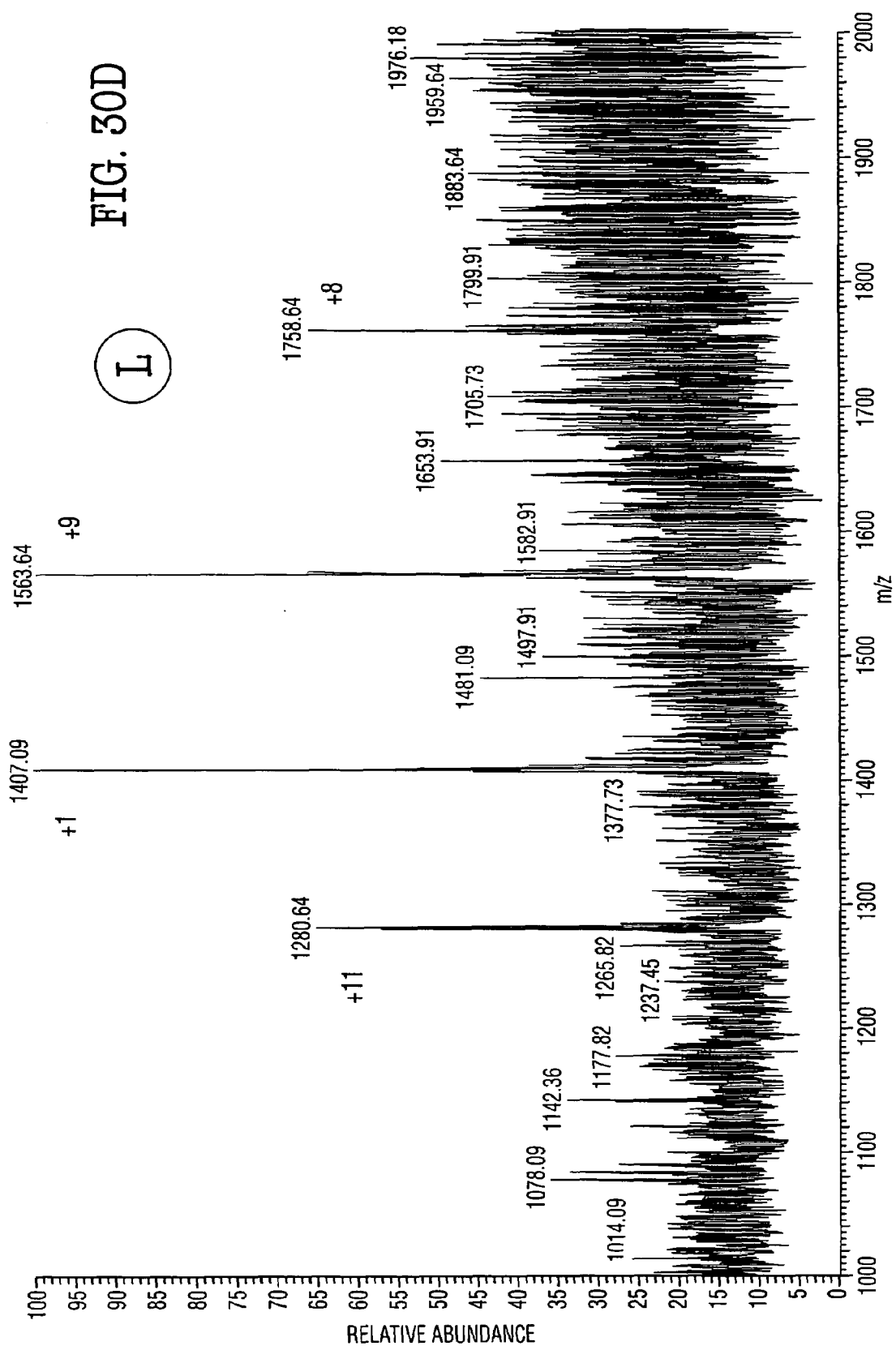
Figure 30E:
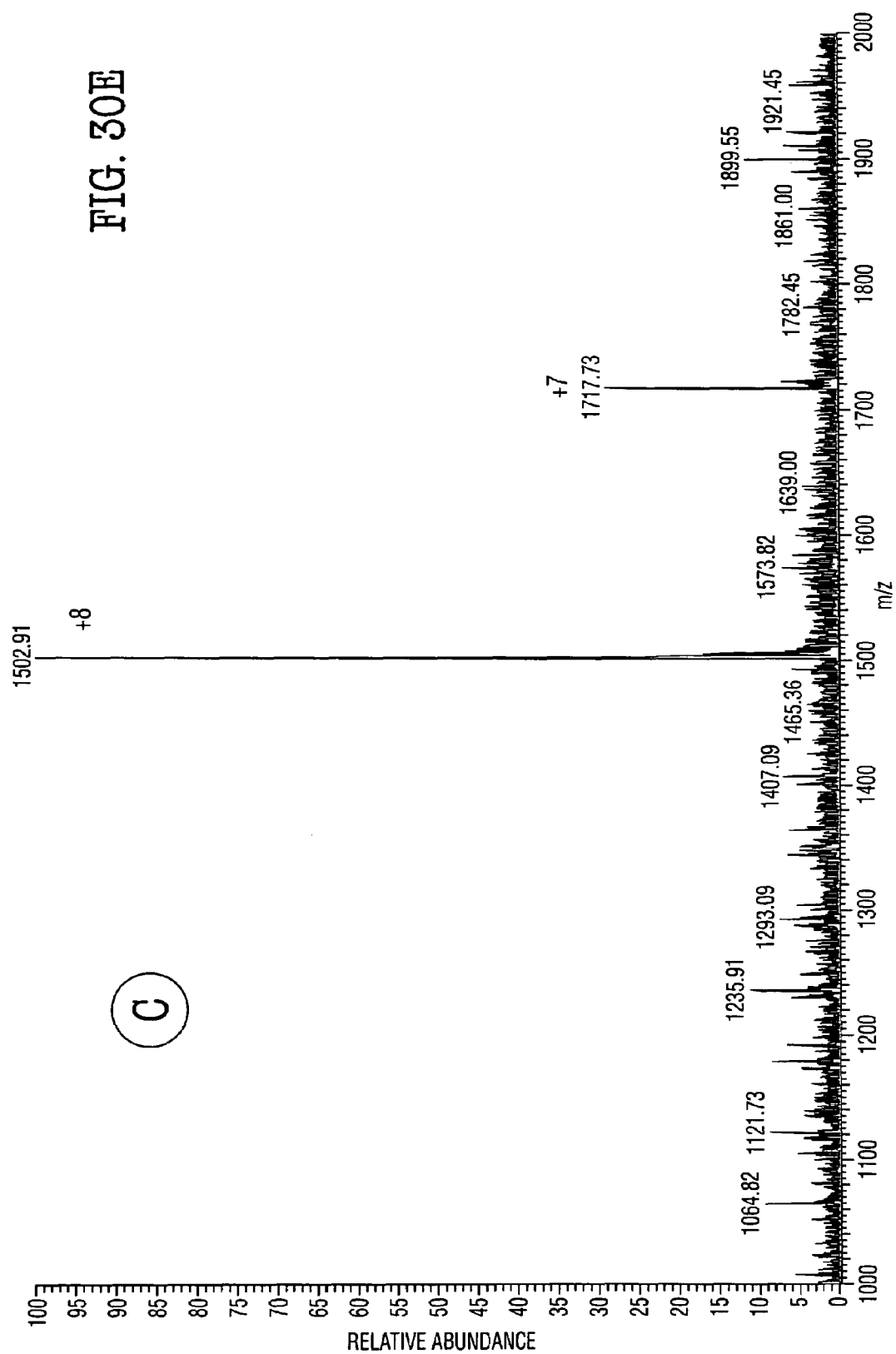

In particular, FIG. 30a shows the mixture spectrum of the four proteins insulin (I), lysozyme (L), trypsin (T), and cytochrome c (C); FIG. 30b depicts the arrangement of spots in the prepared array; spots are spaced 5 mm apart (center to center). Rinse analysis nESI-MS spectra showing characteristic charge states of insulin (FIG. 30c), lysozyme (FIG. 30d), cytochrome c (FIG. 30e), and f trypsin peaks (FIG. 30f (autolysis peaks for [Trypsin-QTIASN]$^{+9}$ at 2520 Th; [Trypsin-QTIASN]$^{+8}$ at 2831 Th are also present).

Analysis of the surface by nESI analysis of the recovered individual spots confirmed the success of the mass-selective ion soft landing of the mixture components into an array. This success included the lack of cross-contamination, i.e. none of the spectra contain ions of more than one protein. This feature excludes the possibility of spray-through, ion leakage during injection, or spot overlap. The presence of autolysis peaks ([Trypsin-QTIASN]$^{+9}$ at 2520 Th; [Trypsin-QTIASN]$^{+8}$ at 2831 Th) in soft-landed trypsin spectrum is a clear sign of residual enzymatic activity.

To summarize, detailed descriptions have been provided [37-39] for preparation of SAM surfaces with various chemical functionalities. The type of SAM surface used is indicated by the abbreviated name, which refers to the nature of the terminal functionality of the surface-bound, long-chain hydrocarbon, e.g. F-SAM denotes a poly-fluorinated alkanethiol, etc. Gold surfaces were cleaned with a mixture of $H_2SO_4$ and $H_2O_2$ in 3:1 ratio, rinsed thoroughly with deionized water followed by absolute ethanol, and allowed to air dry. All proteins and peptides were used as purchased from the manufacturers without any further purification unless otherwise noted; equine apomyoglobin, bovine cytochrome c, bovine insulin, chicken egg white lysozyme, bovine pancreatic trypsin inhibitor, bradykinin, neurotensin, and substance P were purchased from Sigma-Aldrich (St. Louis, Mo.). Bovine trypsin was purchased from Worthington Biochemical Corp. (Lakewood, N.J.).

Typical ESI conditions used 1:1 methanol:water (v/v) 0.1%-2% acetic acid, 3-5 kV applied to the syringe for spray formation, and 0.5-5 μL/min sample flow (no nebulizing gas is used). Electrosonic spray (ESSI) [40] conditions allow for a wider variety of solvent systems including 1:1 methanol: water (v/v) 0.1%-2% acetic acid, 0.1%-2% acetic acid in water, and aqueous systems at neutral pH in ammonium acetate buffer (to mimic physiological/biological conditions). Typically sample flows of 0.5-50 μL/min, spray voltages of 0-4 kV, and nebulizing gas pressures of 8-25 bar $N_2$ were used.

Peptide soft-landing experiments were performed for characterization of the instrument; one example is a set of experiments using a standard binary mixture of 0.05 mg/mL each of bradykinin and substance P in 1:1 methanol:water (v/v) 2% acetic acid. Bare gold and F-SAM on gold surfaces were used for soft landing of the mass-selected +2 charge state of bradykinin (530 Th). The soft-landed samples were analyzed ex situ using a Finnigan LTQ mass spectrometer (Thermo Electron Corp., San Jose, Calif.) after rinsing the ion collection surfaces with 2×25 μL portions of the same solvent as used for the soft-landing experiment; product ion MS/MS scans were used to confirm the presence of bradykinin. This method of detection has consistently allowed detection of low pg amounts of the bradykinin using 2 μL injections of sample into a 10 μL/min flow of 1:1 methanol:water (v/v) 2% acetic acid.

A protein mixture containing equal parts insulin, lysozyme, cytochrome c, and trypsin (0.1 mg/mL total protein content) in 1:1 acetonitrile: water (v/v) 0.1% TFA was ionized using ESSI (3 kV, 1.5 μL/min sample flow, 120 psi $N_2$,) and used to prepare a four-spot array on an OH-SAM surface (9 mm×10 mm, 3 h soft-landing/spot, 25 Th isolation window where one Thomson [Th] is equal to one Dalton/unit charge [41]). The individual soft-landed spots were arranged in a square with a center to center spacing of 5 mm between adjacent spots. After production of the array, each spot was rinsed with 5 μL 1:1 acetonitrile/water (v/v) 0.1% TFA. These surface rinse solutions were then analyzed using nESI (2 μm tip, 1.2 kV) in a commercial linear ion trap mass spectrometer (Finnigan LTQ, Thermo Electron Corp., San Jose, Calif.).

In different experiments, the amount of soft-landed material was estimated to be in the low nanogram range. This corresponds to an estimated overall efficiency (from starting solution to recovered solution) of 0.1-0.001%.

Soft-landing is a unique method that uses mass spectrometry instead of chromatography for preparative scale separation. It is also an alternative to methods in which arrays are built up synthetically by jet micro-drop or related methods in which reagents are mixed in combinations that allow deposition of specific compounds at certain points in the array. Many potentially important applications may even include the creation of micro-arrays of proteins (and other compounds) from complex biological mixtures without isolation of pure proteins or knowledge of their structures (i.e. soft-landing collection of "ion fractions" from the mass spectrum). These separated proteins on the array can be interrogated conveniently using standard affinity binding and other tests of biological or pharmacological activity.

In general, soft landing offers new ways of interrogating and recognizing biomolecules in pure form with the possibility of storage and further analysis of samples. These experiments will lead to highly sensitive detection/identification, e.g. activity assays, using surface-based spectroscopic methods, including Raman spectroscopy. Note that separation by mass spectrometry from complex mixtures (e.g. serum, plasma) is particularly advantageous for closely related groups of compounds (e.g. glycosylated forms of proteins. The advantages of soft landing extend to minor protein/peptide constituents of mixtures, especially when used in conjunction with separation methods like capillary electrochromatography (CEC) [49] and ion mobility spectrometry [50]. It is possible to foresee related substance analysis on recombinant and post-translationally modified proteins as well as high-throughput experiments, including drug receptor screening.

Other potential applications include the following: reactions of extremely pure proteins with affinity and other reagents (including enzyme/substrate and receptor/ligand reactions); binding experiments (ligand/receptor identification, small molecule drug/target pair identification); resolution of multiple modified forms of a protein; effective analysis of biopsy materials; determination of effects of post-translational modifications on protein function.

REFERENCES (1) Liu, H.; Felten, C,; Xue, Q.; Zhang, B.; Jedrzejewski, P.; Karger, B. L.; Foret, F., Anal. Chem, 2060, 72, 3303-3310.

(2) Wells, J. M.; Badman, E. R.; Cooks, R. G., Anal. Chem., 1998, 70, 438-444.

(3) Schwartz, J. C.; Senko, M. W.; Syka, J. E. P., J. Am. Soc. Mass Spectrom, 2002, 13, 659-669.

(4), Franchefti, V.; Solka, B. H.; Baitinger, W. E.; Amy, J. W.; Cooks, R. G., Int J. Mass Spectrom, Ion Phys., 1977, 23, 29-35.

(5) Miller, S. A.; Luo, H.; Pachuta, S.; Cooks, R. G., Science, 1997, 275, 1447.

(6) Luo, H.; Miller, S. A.; Cooks, R. G.; Panchuta, S., J. Int. J. of Mass Spectrom, Ion Processes, 1998, 174, 193-217.

(7) Geiger, R. J.; Melnyk, M. C.; Busch, K. L.; Bartlett, M. G., Int. J. of Mass Spectrom, 1999, 182/183, 415-422.

(8) Feng, B.; Wunschel, D. S.; Masselon, C. D.; Pasa-Tolic, L.; Smith, R. D., J. Am. Chem. Soc., 1999, 121, 8961-8962.

(9) Bromann, K.; Felix, C.; Brune, H.; Harbich, W.; Monot, R.; Buffet, J.; Kern, K., Science, 1996, 274, 956-958.

(10) Cooks, R. G.; Rockwood, A. L., Rapid Commun. Mass Spectrom, 1991, 5, 93-93.

(11) Siuzdak, G., Bothner, B., Yeager, M., Brugidou, C., Fauquet, C., Hoey, K., Chang, C., Chemistry and Biology, 1996, 3, 45-48.

(12) Burns, F. B.; Morton, T. H. *J. Am. Chem. Soc.* 1976, 98, 7308-7313.

(13) Franchetti, V.; Solka, B. H.; Baitinger, W. E.; Amy, J. W.; Cooks, R. G. *Int. J. Mass Spectrom. Ion Phys.* 1977, 23, 29-35.

(14) Hanley, L.; Sinnott, S. B. *Surface Science* 2002, 500, 500-522.

(15) Williams, E. R.; Henry, K. D.; McLafferty, F. W.; Shabanowitz, J.; Hunt, D. F. *J. Am. Soc. Mass Spectrom* 1990, 1, 413-416.

(16) Dongre, A. R.; Somogyi, A.; Wysocki, V. H. *J. Mass Spectrom.* 1996, 31, 339-350.

(17) Stone, E.; Gillig, K. J.; Ruotolo, B.; Fuhrer, K.; Gonin, M.; Schultz, A.; Russell, D. H. *Anal. Chem.* 2001, 73, 2233-2238.

(18) Laskin, J.; Futrell, J. H. *Journal of Chemical Physics* 2003, 119, 3413-3420.

(19) Laskin, J.; Bailey, T. H.; Futrell, J. H. *Journal of the American Chemical Society* 2003, 125, 1625-1632.

(20) Laskin, J.; Alvarez, J.; Cooks, R. G.; Barlow, S. E.; Futrell, J. H., *52nd American Society for Mass Spectrometry Conference on Mass Spectrometry and Allied Topics*, Nashville, Tenn., May 23-27, 2004.

(21) Miller, S. A.; Luo, H.; Pachuta, S. J.; Cooks, R. G. *Science* 1997, 275, 1447-1450.

(22) Luo, H.; Miller, S. A.; Cooks, R. G.; Pachuta, S. J. *Int. J. of Mass Spectrom. Ion Processes* 1998, 174, 193-217.

(23) Geiger, R. J.; Melnyk, M. C.; Busch, K. L.; Bartlett, M. G. *Int J. of Mass Spectrom.* 1999, 182/183, 415-422.

(24) Tepavcevic, S.; Choi, Y.; Hanley, L. *J. Am. Chem. Soc.* 2003, 125, 2396-2397.

(25) Siuzdak, G.; Hollenbeck, T.; Bothner, B. *J. Mass Spectrom.* 1999, 34, 1087-1088.

(26) Feng, B.; Wunschel, D. S.; Masselon, C. D.; Pasa-Tolic, L.; Smith, R. D. *J. Am. Chem. Soc.* 1999, 121, 8961-8962.

(27) Bromann, K.; Felix, C.; Brune, H.; Harbich, W.; Monot, R.; Buttet, J.; Kern, K. *Science* 1996, 274, 956-958.

(28) Siuzdak, G.; Bothner, B.; Yeager, M.; Brugidou, C.; Fauquet, C. M.; Hoey, K.; Chang, C.-M. *Chemistry & Biology* 1996, 3, 45-48.

(29) Laurell, T.; Wallman, L.; Nilsson, J. *J. Micromech. Microeng.* 1999, 9, 369-376.

(30) Morozov, V. N.; Morozova, T. Y. *Anal. Chem.* 1999, 71, 3110-3117.

(31) MacBeath, G.; Schreiber, S. L. *Science* 2000, 289, 1760-1763.

(32) Martin, B. D.; Gaber, B. P.; Patterson, C. H.; Turner, D. C. *Langmuir* 1998, 14, 3971-3975.

(33) Roda, A.; Guardigli, M.; Russo, C.; Pasini, P.; Baraldini, M. *Biotechniques* 2000, 28, 492.

(34) Ouyang, Z.; Takáts, Z.; Blake, T. A.; Gologan, B.; Guymon, A. J.; Wiseman, J. M.; Oliver, J. C.; Davisson, V. J.; Cooks, R. G. *Science* 2003, 301, 1351-1354.

(35) Gologan, B.; Takáts, Z.; Alvarez, J.; Wiseman, J. M.; Talaty, N.; Ouyang, Z.; Cooks, R. G. 2004, manuscript in preparation.

(36) Mayer, P. S.; Turecek, F.; Lee, H.-N.; Scheidemann, A. A.; Olney, T. A.; Schumacher, F.; Strop, P.; Smrcina, M.; Patek, M.; Schirlin, D., *51st American Society for Mass Spectrometry Conference on Mass Spectrometry and Allied Topics*, Montreal, QC, Canada, Jun. 8-12, 2003.

(37) Chidsey, C. E. D.; Loiacono, D. M. *Langmuir* 1990, 6, 682-691.

(38) Shen, J.; Yim, Y. H.; Feng, B.; Grill, V.; Evans, C.; Cooks, R. G. *Int. J. Mass Spec.* 1999, 182/183, 423-435.

(39) Wade, N.; Jo, S.-C.; Gologan, B.; Cooks, R. G. *Int. J. Mass Spec.* 2003, 230, 151-159.

(40) Takáts, Z.; Wiseman, J. M.; Gologan, B.; Cooks, R. G. *Anal. Chem.* 2004, in press.

(41) Cooks, R. G.; Rockwood, A. L. *Rapid Commun. Mass Spectrom.* 1991, 5, 93.

(42) Wilm, M.; Mann, M. *Anal. Chem.* 1996, 68, 1-8.

(43) Schwartz, J. C.; Senko, M. W.; Syka, J. E. P. *J. Am. Soc. Mass Spectrom.* 2002, 13, 659-669.

(44) Busch, K. L. *J. Mass Spectrom.* 1995, 30, 233-240.

(45) Benninghoven, A. *Angew. Chem. Int. Ed.* 1994, 33, 1023-1043.

(46) Roepstorff, P.; Fohlman, J. *Biomed. Mass Spectrom.* 1984, 11, 601-601.

(47) Syka, J. E. P.; Coon, J. J.; Schroeder, M. J.; Shabanowitz, J.; Hunt, D. F. *PNAS* 2004, 101, 9528-9533.

(48) Cooks, R. G.; Ouyang, Z.: U.S. Patent Application Publication No. 2003/0226963.

(49) Que, A. H.; Mechref, Y.; Huang, Y.; Taraszka, J. A.; Clemmer, D. E.; Novotny, M. V. *Anal. Chem.* 2003, 75, 1684-1690.

(50) Hoaglund-Hyzer, C. S.; Lee, Y. J.; Counterman, A. E.; Clemmer, D. E. *AnaL Chem.* 2002, 74, 992-1006.

(51) Zhou, L.; Yue, B.; Dearden, D. V.; Lee, E. D.; Rockwood, A. L.; Lee, M. L. *Anal. Chem.* 2003, 75, 5978-5983.

(52) Hawkridge, A. M.; Zhou, L.; Lee, M. L.; Muddiman, D. C. *Anal. Chem.* 2004, in press.

(53) Kim, T.; Tolmachev, A. V.; Harkewicz, R.; Prior, D. C.; Anderson, G.; Udseth, H. R.; Smith, R. D. *Anal. Chem.* 2000, 72, 2247-2255.

(54) Kim, T.; Udseth, H. R.; Smith, R. D. *Anal. Chem.* 2000, 72, 5014-5019.

(55) Kim, T.; Tang, K.; Udseth, H. R.; Smith, R. D. *Anal. Chem.* 2001, 73, 4162-4170.

(56) Londry, F. A.; Hager, J. W. *J. Am. Soc. Mass Spectrom* 2003, 14, 1130-1147.

(57) Hager, J. W.: U.S. Pat. No. 6,177,668.

Other embodiments are within the following claims.

What is claimed is:

1. A preparative mass spectrometer system for forming arrays of bioactive molecules having a characteristic biological or pharmaceutical activity from a mixture of molecules comprising:

an ionizer which converts the mixture into gas phase ions of the molecules in the mixture;

a separator which separates the ions according to their mobility, the separator being a linear ion trap mass analyzer; and a wet surface in cooperative relationship with the separator, the separated molecules being soft landed onto the wet surface at different locations, wherein separated molecules retain solution phase properties.

2. The system of claim 1, further comprising a PC computer in cooperative relationship with the preparative mass spectrometer system, the PC computer having a processor configured to execute a computer readable computer program, the program implementing a waveform inverse Fourier transformation (SWIFT) isolation algorithm to separates ions.

3. The system of claim 1 wherein the ionizer is an electrospray ionizer.

4. The system of claim 1 wherein the ionizer is an atmospheric pressure chemical ionizer.

5. The system of claim 1 wherein the ionizer is a matrix assisted laser desorption ionizer.

6. The system of claim 1 wherein the surface is mounted on an adjustable position stage.

7. The system of claim 6 wherein the position of the stage is electronically controlled.

8. A preparative mass spectrometer system for forming arrays of bioactive molecules having a characteristic biological or pharmaceutical activity from a mixture of molecules comprising:

an ionizer which converts the mixture into gas phase ions of the molecules in the mixture;

a separator which separates the ions according to their mass to charge ratio; and a wet surface in cooperative relationship with the separator, the separated molecules being soft landed onto the wet surface at different locations, wherein separated molecules retain solution phase properties.

* * * * *